US012436896B1

(12) United States Patent
Goldman et al.

(10) Patent No.: US 12,436,896 B1
(45) Date of Patent: Oct. 7, 2025

(54) AI ACCELERATOR INTEGRATED CIRCUIT CHIP WITH INTEGRATED CELL-BASED FABRIC ADAPTER

(71) Applicant: Recogni Inc., San Jose, CA (US)

(72) Inventors: Gary S. Goldman, Los Altos, CA (US); Ramalingam K. Anand, Los Altos Hills, CA (US); Kalyana S. Venkataraman, San Jose, CA (US); Berend Ozceri, Los Gatos, CA (US); Pradeep R. Joginipally, San Jose, CA (US); Chung Y. Lau, Milpitas, CA (US); Jigar K. Savla, San Jose, CA (US); Ashwin Radhakrishnan, Fremont, CA (US); Michael Davie, St Augustine, FL (US); Shijun Li, Southborough, MA (US)

(73) Assignee: Recogni Inc., San Jose, CA (US)

( * ) Notice: Subject to any disclaimer, the term of this patent is extended or adjusted under 35 U.S.C. 154(b) by 0 days.

(21) Appl. No.: 18/989,492

(22) Filed: Dec. 20, 2024

Related U.S. Application Data

(60) Provisional application No. 63/694,397, filed on Sep. 13, 2024.

(51) Int. Cl.
*G06F 13/36* (2006.01)
*G06F 12/1081* (2016.01)
*G06F 13/40* (2006.01)

(52) U.S. Cl.
CPC ...... *G06F 12/1081* (2013.01); *G06F 13/4068* (2013.01); *G06F 13/409* (2013.01)

(58) Field of Classification Search
CPC . G06F 12/1081; G06F 13/4068; G06F 13/409
See application file for complete search history.

(56) References Cited

U.S. PATENT DOCUMENTS

| | | | | |
|---|---|---|---|---|
| 8,145,785 B1 * | 3/2012 | Finkelstein | ........... | H04L 49/602 |
| | | | | 709/224 |
| 10,721,187 B1 * | 7/2020 | Goldman | .............. | H04L 47/566 |
| | (Continued) | | | |

OTHER PUBLICATIONS

"AI Networking", ARISTA, White Paper, Jun. 5, 2024, 14 pgs.
(Continued)

*Primary Examiner* — Henry Tsai
*Assistant Examiner* — Kim T Huynh
(74) *Attorney, Agent, or Firm* — Ascenda Law Group, PC

(57) ABSTRACT

An integrated circuit formed on (i) a single semiconductor die or (ii) a plurality semiconductor dies that are integrated into a single package. The integrated circuit may include a communication interface including a serializer/deserializer (SerDes) interface; a fabric adapter communicatively coupled to the communication interface; a plurality of inference engine clusters, each inference engine cluster including a respective memory element and/or memory interface; and a data interconnect communicatively coupling each respective memory element and/or memory interfaces of the plurality of inference engine clusters to the fabric adapter. The fabric adapter may be configured to facilitate remote direct memory access (RDMA) read and write services and/or datagram communication over a cell-based switch fabric to and from the respective memory elements and/or memory interfaces of the plurality of inference engine clusters via the data interconnect.

20 Claims, 27 Drawing Sheets

(56) References Cited

U.S. PATENT DOCUMENTS

| | | | |
|---|---|---|---|
| 11,025,544 | B2 | 6/2021 | Marolia et al. |
| 11,194,753 | B2 | 12/2021 | Marolia et al. |
| 11,916,800 | B2 | 2/2024 | Arditti Ilitzky et al. |
| 2002/0006110 | A1 | 1/2002 | Brezzo et al. |
| 2011/0219208 | A1 | 9/2011 | Asaad et al. |
| 2013/0117766 | A1* | 5/2013 | Bax .................. G06F 9/4401 719/323 |
| 2015/0055649 | A1 | 2/2015 | DeCasatis et al. |
| 2019/0042518 | A1 | 2/2019 | Marolia et al. |
| 2020/0304427 | A1 | 9/2020 | Sandler et al. |
| 2020/0387564 | A1* | 12/2020 | Simpson .................. G06F 17/16 |
| 2020/0412659 | A1 | 12/2020 | Arditti Ilitzky et al. |
| 2021/0117246 | A1 | 4/2021 | Lal et al. |
| 2021/0117360 | A1 | 4/2021 | Kutch et al. |
| 2021/0334184 | A1* | 10/2021 | Menon ................ H03M 13/154 |
| 2022/0276973 | A1 | 9/2022 | Wei et al. |
| 2023/0231811 | A1 | 7/2023 | Dalal |

OTHER PUBLICATIONS

Biglari; et al., "Designing Reconfigurable Interconnection Network of Heterogeneous Chiplets Using Kalman Filter", Cornell University, arXiv:2406.00568v1 [cs.AR] Jun. 1, 2024, 6 pgs.

Gao; et al., "Customized High Performance and Energy Efficient Communication Networks for AI Chips", IEEE Access, May 17, 2019 (revised Jun. 10, 2019), vol. 7, 69434-69446.

Mabavinejad; et al., "An Overview of Efficient Interconnection Networks for Deep Neural Network Accelerators", IEEE Journal on Emerging and Selected Topics in Circuits and Systems, Sep. 2020, 10(3):268-282.

Rettkowski, Jens, M.Sc., "Design and Programming Methods for Reconfigurable Multi-Core Architectures using a Network-on-Chip-Centric Approach", Technische Universitat Dresden, dissertation, Sep. 9, 2021, pp. 1-246.

"Season 3 Ep 11: Cell-based AI Fabric", DriveNets, CloudNets Video accessed Jul. 1, 2024, transcription, 4 pgs.

Final Office Action dated Jul. 2, 2025, for U.S. Appl. No. 18/989,525, filed Dec. 20, 2024, 23 pgs.

Notice of Allowance mailed Jul. 22, 2025, for U.S. Appl. No. 18/989,508, filed Dec. 20, 2024, 9 pgs.

Non-Final Office Action dated May 2, 2025, for U.S. Appl. No. 18/989,508, filed Dec. 20, 2024, 19 pgs.

Amendment filed May 27, 2025, for U.S. Appl. No. 18/989,525, filed Dec. 20, 2024, 10 pgs.

Amendment filed Jul. 3, 2025, for U.S. Appl. No. 18/989,508, filed Dec. 20, 2024, 9 pgs.

Non-Final Office Action dated Feb. 27, 2025, for U.S. Appl. No. 18/989,525, filed Dec. 20, 2024, 26 pgs.

* cited by examiner

AI ACCELERATOR INTEGRATED CIRCUIT CHIP WITH INTEGRATED CELL-BASED FABRIC ADAPTER

RELATED APPLICATIONS

This application is a nonprovisional of, claims priority to, and incorporates by reference U.S. Provisional Application No. 63/694,397, filed 13 Sep. 2024.

FIELD OF THE INVENTION

The present invention relates to an artificial intelligence (AI) accelerator integrated circuit (IC) chip (hereinafter, "AI chip") with an integrated cell-based fabric adapter (hereinafter, "fabric adapter"), and more particularly relates to the fabric adapter configured to interface the AI chip with a cell-based switch fabric.

BACKGROUND

With the increasing number of parameters that form a neural network, the mathematical operations (e.g., matrix multiplication operations) may be divided up among a plurality of AI chips. In order for the AI chips to work together, high speed communication is needed between the AI chips. The description hereinbelow provides a hardware architecture to enable high-speed communication between the plurality of AI chips.

SUMMARY OF THE INVENTION

In accordance with one embodiment of the invention, an integrated circuit may be formed on (i) a single semiconductor die or (ii) a plurality semiconductor dies that are integrated into a single package. The integrated circuit may include a communication interface; a fabric adapter communicatively coupled to the communication interface; a plurality of inference engine clusters, each inference engine cluster including a respective memory element; and a data interconnect communicatively coupling each respective memory element of the plurality of inference engine clusters to the fabric adapter. The fabric adapter may be configured to facilitate remote direct memory access (RDMA) read and write services (and/or datagram communication) over a cell-based switch fabric to and from the respective memory elements of the plurality of inference engine clusters via the data interconnect.

In accordance with one embodiment of the invention, an integrated circuit may be formed on (i) a single semiconductor die or (ii) a plurality semiconductor dies that are integrated into a single package. The integrated circuit may include a communication interface; a fabric adapter communicatively coupled to the communication interface; a plurality of inference engine clusters, each inference engine cluster including a respective memory interface; and a data interconnect communicatively coupling each respective memory interface of the plurality of inference engine clusters to the fabric adapter. The fabric adapter may be configured to facilitate RDMA read and write services (and/or datagram communication) over a cell-based switch fabric to and from the respective memory interfaces of the plurality of inference engine clusters via the data interconnect.

In accordance with one embodiment of the invention, an integrated circuit may be formed on (i) a single semiconductor die or (ii) a plurality semiconductor dies that are integrated into a single package. The integrated circuit may include a communication interface; a first inference engine cluster including a first memory element; a second inference engine cluster including a second memory element; a first fabric adapter communicatively coupled to the communication interface and the first memory element; and a second fabric adapter communicatively coupled to the communication interface and the second memory element. The first fabric adapter may be configured to facilitate RDMA read and write services over a cell-based switch fabric to and from the first memory element of the first inference engine cluster. The second fabric adapter may be configured to facilitate RDMA read and write services over the cell-based switch fabric to and from the second memory element of the second inference engine cluster.

In accordance with one embodiment of the invention, an integrated circuit may be formed on (i) a single semiconductor die or (ii) a plurality semiconductor dies that are integrated into a single package. The integrated circuit may include a communication interface; a first inference engine cluster including a first memory interface; a second inference engine cluster including a second memory interface; a first fabric adapter communicatively coupled to the communication interface and the first memory interface; and a second fabric adapter communicatively coupled to the communication interface and the second memory interface. The first fabric adapter may be configured to facilitate RDMA read and write services over a cell-based switch fabric to and from the first memory interface of the first inference engine cluster. The second fabric adapter may be configured to facilitate RDMA read and write services over the cell-based switch fabric to and from the second memory interface of the second inference engine cluster.

In accordance with one embodiment of the invention, a method is provided for transmitting data from a first artificial intelligence (AI) chip to a second AI chip, the first AI chip comprising a virtual output queue (VOQ) subsystem with a plurality of VOQs. The method may include dividing the data into packets and for each of the packets, (i) determining a respective one of the VOQs to assign to the packet, (ii) attaching a packet header to the packet, (iii) enqueuing the packet to the respective one of the VOQs assigned to the packet, (iv) determining a destination output queue (OQ) of a second AI chip to which the packet should be transmitted; and (v) when selected for transport, dequeuing the packet from the respective one of the VOQs, cellifying the packet, attaching a cell header to each cell to indicate the destination OQ, and transmitting the cells to one or more cell-fabric switch chips.

In accordance with one embodiment of the invention, a method is provided for receiving data at a first artificial intelligence (AI) chip comprising an output queue (OQ) subsystem with a plurality of output queues (OQs). The method may include receiving a plurality of packets from a second AI chip via one or more cell-fabric switch chips; enqueueing the plurality of packets to the OQs; dequeuing one or more of the packets from the OQs according to a scheduling policy based on a class of service assigned to each of the OQs; and for each of the packets, (i) decellifying respective cells of the packet to reconstitute packet data, (ii) examining the packet header to identify the data and determine its appropriate processing, (iii) removing the packet header, and (iv) storing the packet data to one or more memory elements.

These and other embodiments of the invention are more fully described in association with the drawings below.

BRIEF DESCRIPTION OF THE DRAWINGS

The invention is now described, by way of example and without limiting the scope of the invention, with reference to the accompanying drawings which illustrate embodiments of it, in which.

DETAILED DESCRIPTION OF THE INVENTION

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention. Descriptions associated with any one of the figures may be applied to different figures containing like or similar components/ steps.

Figure 1:
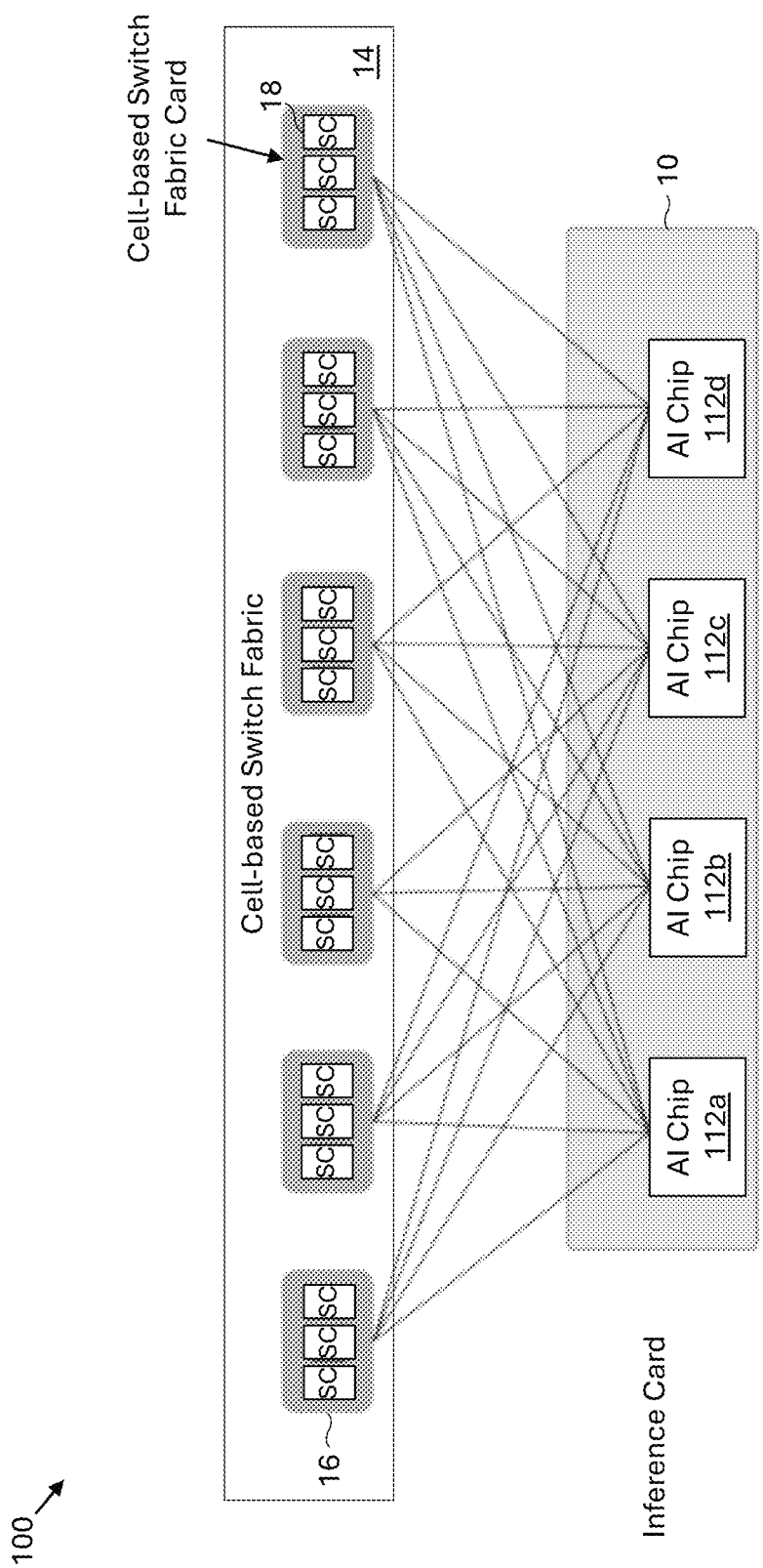
FIG. 1 depicts a schematic diagram of an inference card communicatively coupled to a plurality of cell-based fabric cards, in accordance with one embodiment of the invention.
Figure 2B:
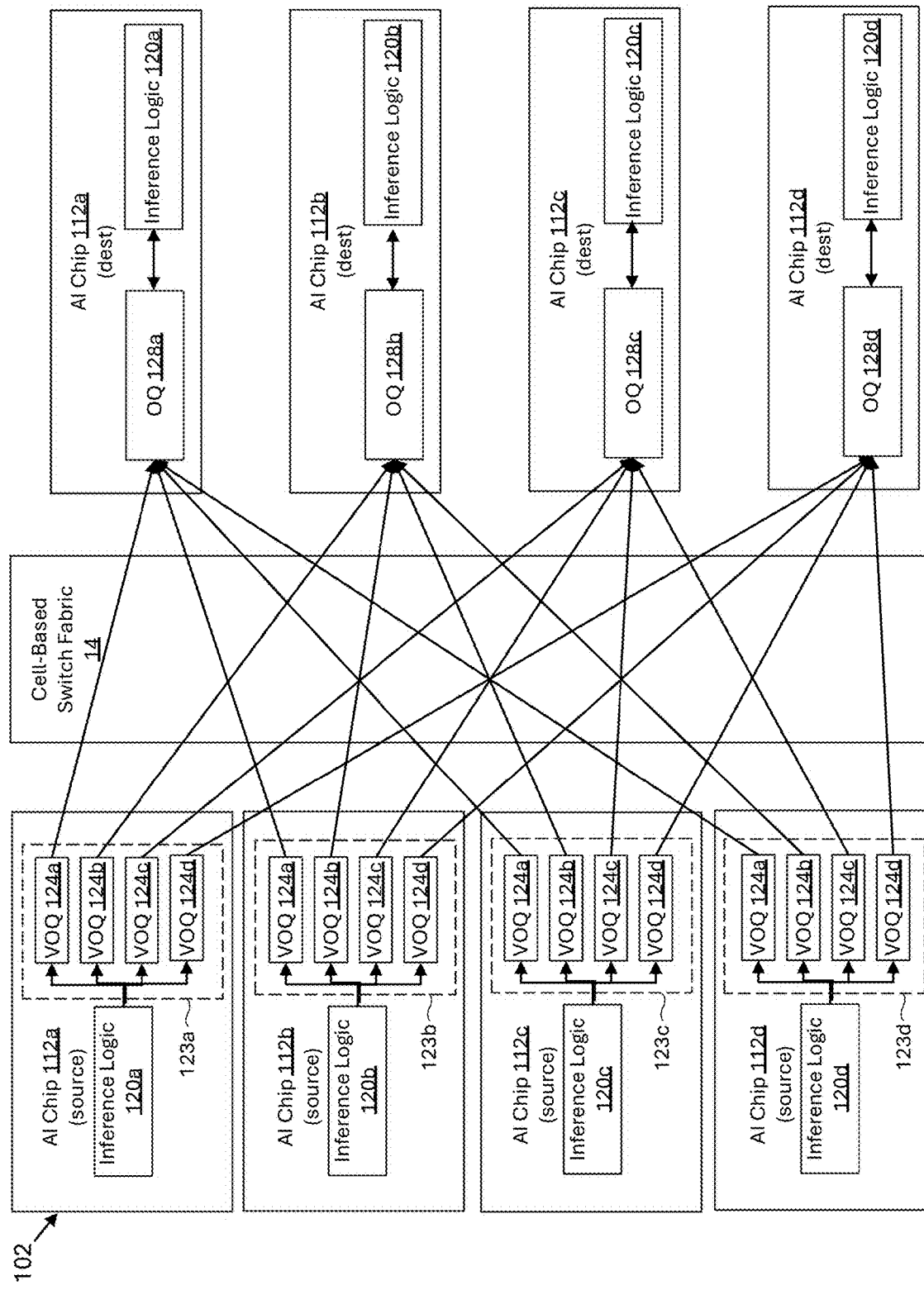
FIG. 2B depicts a system with embedded packet switching on the source and destination AI chips, in accordance with one embodiment of the invention.
Figure 3A:
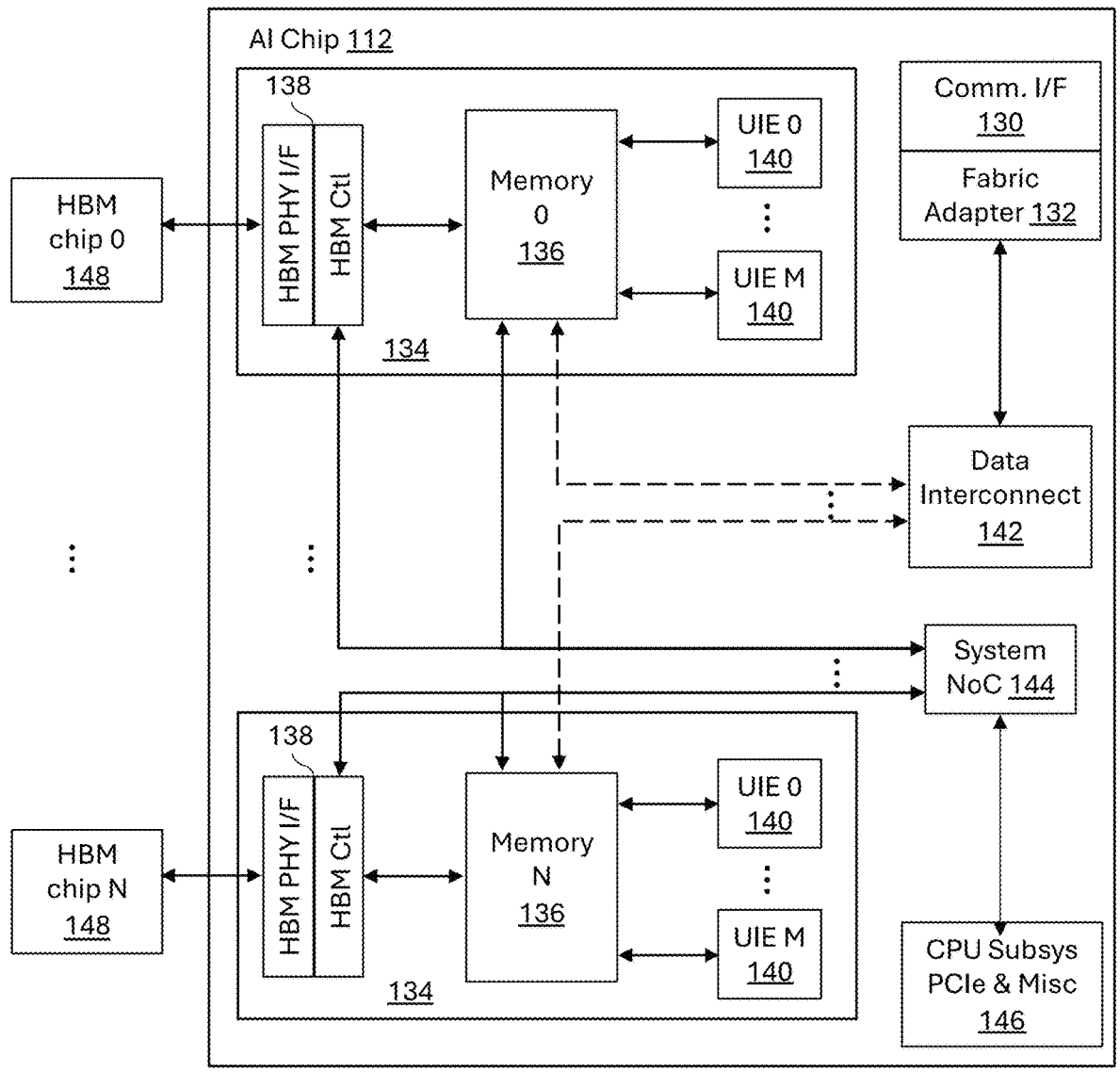
FIG. 3A depicts a block diagram of an integrated circuit with a communication interface including a serializer/deserializer (SerDes) interface, a fabric adapter communicatively coupled to the communication interface, a plurality of inference engine clusters, each inference engine cluster including a respective memory element, and a data interconnect communicatively coupling each respective memory element of the plurality of inference engine clusters to the fabric adapter, in accordance with one embodiment of the invention.
Figure 3B:
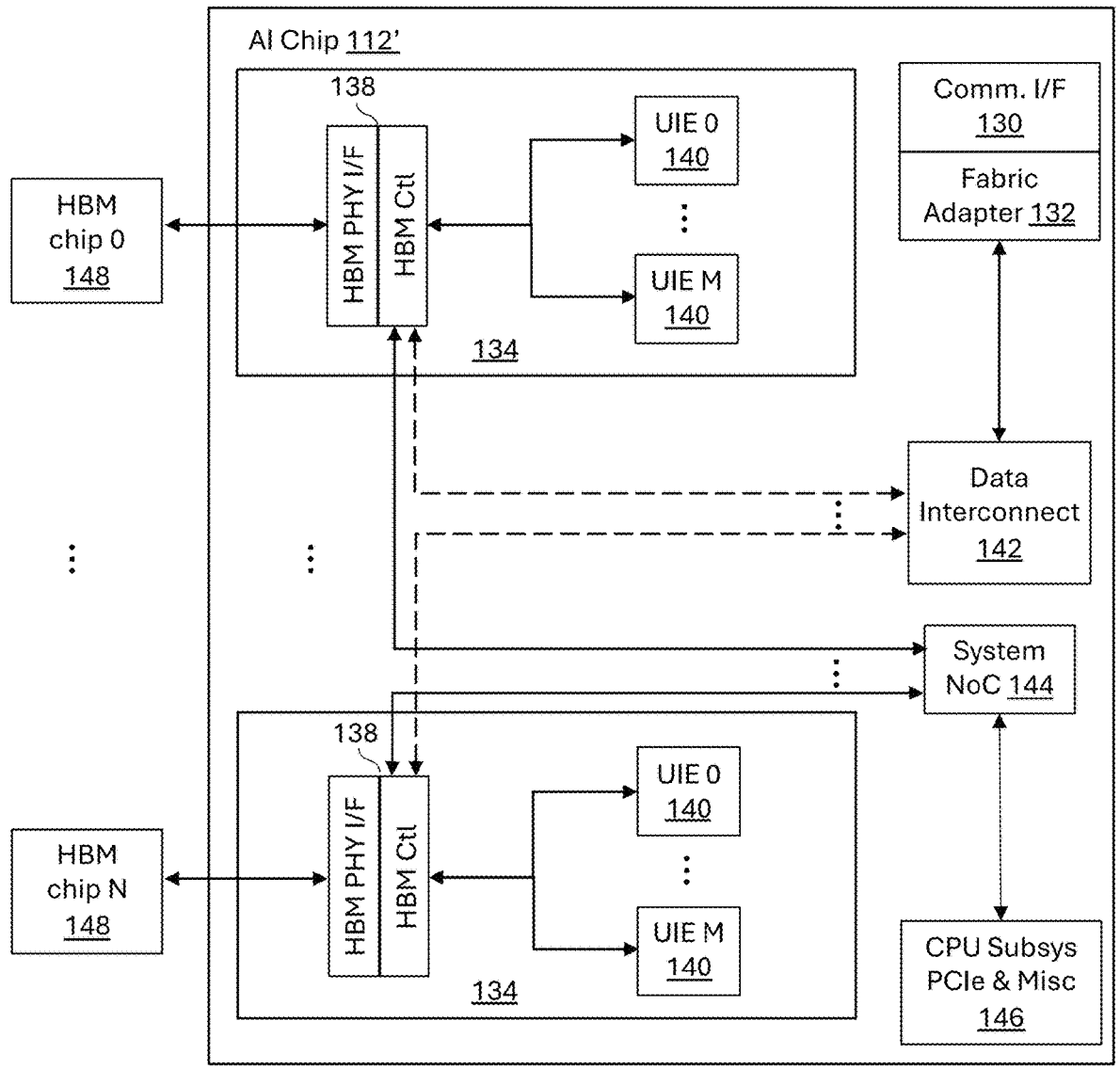
FIG. 3B depicts a block diagram of an integrated circuit with a communication interface including a serializer/deserializer (SerDes) interface, a fabric adapter communicatively coupled to the communication interface, a plurality of inference engine clusters, each inference engine cluster including a respective memory interface, and a data interconnect communicatively coupling each respective memory interface of the plurality of inference engine clusters to the fabric adapter, in accordance with one embodiment of the invention.

FIG. 1 depicts a schematic diagram 100 of an inference card 10 communicatively coupled to a plurality of cell-based switch fabric cards 16 that are part of a cell-based switch fabric 14. The inference card 10 may include a plurality of AI chips 112a-112d, the details of each of which are depicted in FIGS. 2B, 3A and 3B below. The cell-based fabric cards 16 may be disposed a short physical distance from the inference card 10, resulting in a sub-microsecond latency in communication between respective pairs of the AI chips 112a-112d.

The plurality of cell-based fabric cards 16 may form the spine of a Clos network. Each cell-based fabric card 16 may include a plurality of cell-fabric switch chips 18 (abbreviated as "SC" in FIG. 1). In conventional systems, the leaves of the Clos network may be formed by line cards, and line cards may be connected to AI accelerators through Ethernet, Infiniband or other high speed communication network. However, in the instant case, the leaves of the Clos network may be formed by fabric adapters that are directly integrated into respective AI chips 112a-112d.

Figure 2A:
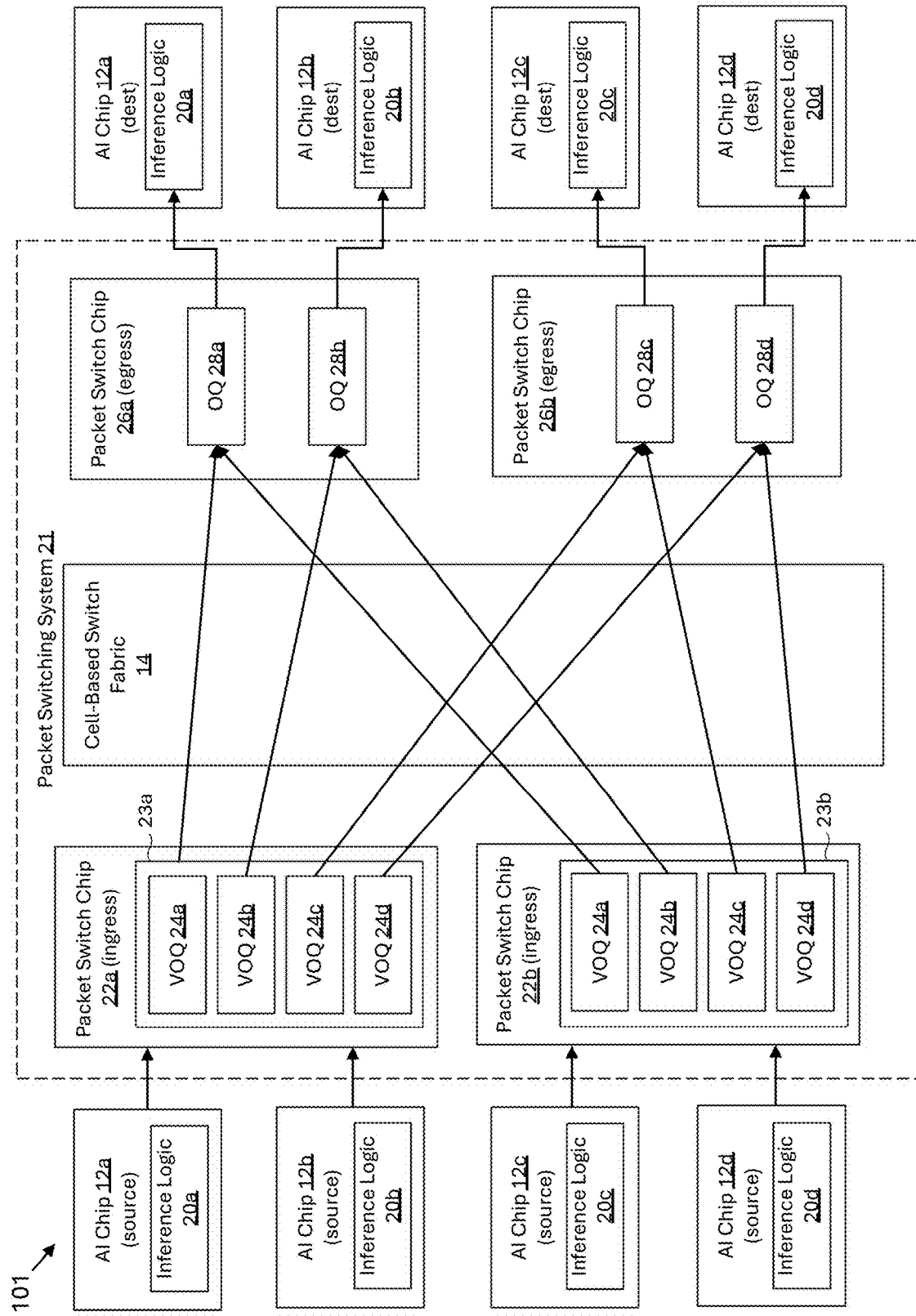
FIG. 2A depicts a system with multiple AI chips connected to a conventional packet switching system for the purpose of transmitting data between the source and destination AI chips.

FIG. 2A depicts a system 101 with multiple AI chips 12a-12d connected to a conventional packet switching system 21 for the purpose of transmitting data between the source and destination AI chips 12a-12d. Each of the AI chips 12a-12d may include inference logic 20a-20d. The packet switching system 21 may comprise one or more ingress packet switch chips 22a, 22b, a cell-based switch fabric 14 comprising one or more cell-based switch chips, and one or more egress packet switch chips 26a, 26b. In some cases, the ingress and egress packet switch chip functionality may be implemented on the same device. The source and destination AI chips 12a-12d may communicate with the packet switch chips 22a, 22b, 26a, 26b via one or more ethernet links or other similar high speed communication links suitable for transferring data packets. For simplicity, two instances of AI chip 12a have been depicted, one labeled as a source and the other as the destination. These two instances of AI chip 12a are intended to correspond to the same physical instance of AI chip 12a, with the source instance indicating that AI chip 12a is configured to transmit data and the destination instance indicating that AI chip 12a is configured to receive data. Similar comments apply to AI chips 12b-12d. The number of AI chips need not be exactly equal to four and could be greater or fewer than four in other examples.

Each ingress packet switch chip (e.g., ingress packet switch chip 22a, ingress packet switch chip 22b) may include a virtual output queue (VOQ) subsystem 23a, 23b, which provides one or more virtual output queues (e.g., VOQs 24a-24d) for each destination AI chip 12a-12d across the cell-based switch fabric 14. While two ingress packet switch chips 22a, 22b have been depicted, it is understood that a greater or fewer number of ingress packet switch chips may be present in other examples. Further, while four VOQs 24a-24d per ingress packet switch chip 22a, 22b have been depicted, it is understood that a greater or fewer number of VOQs 24a-24d per ingress packet switch chip 22a, 22b may be present in other examples.

In the illustrated example, each destination AI chip 12a-12d represents a single destination to the packet switching system 21. However, in other examples (not depicted), each destination AI chip 12a-12d may appear as multiple destinations to the packet switching system 21, and the ingress and egress packet switch chips 22a, 22b, 26a, 26b may assign multiple independent ethernet "ports" to each destination AI chip 12a-12d. There may be multiple VOQs 24a-24d for each destination AI chip 12a-12d to support multiple ports to each destination AI chip 12a-12d as well as for multiple classes of service for each port. Stated differently, in the illustrated example, there is a one-to-one mapping between virtual output queues 24a-24d and destination AI chips 12a-12d (e.g., VOQ 24a mapped to destination AI chip 12a, VOQ 24b mapped to AI chip 12b, VOQ 24c mapped to AI chip 12c, VOQ 24d mapped to AI chip 12d). However, in other examples (not depicted), there could be a many-to-one mapping between virtual output queues 24a-24d and destination AI chips 12a-12d (e.g., VOQs 24a and 24b mapped to AI chip 12a, VOQs 24c and 24d mapped to AI chip 2, other not depicted VOQs mapped to AI chip 3, . . . ). Further, in the illustrated example, ingress packet switch chip 22a may be configured to connect AI chips 12a and 12b to the cell-based switch fabric 14, and ingress packet switch chip 22b may be configured to connect AI chips 12c and 12d to the cell-based switch fabric 14. However, such pairing of AI chips 12a-12d and packet switching chips 22a, 22b is only an example, and in another example (not depicted), ingress packet switch chip 22a could be used connect AI chips 12a-12d to the cell-based switch fabric 14.

To transfer data to a destination AI chip 12a-12d, a source AI chip 12a-12d may read data from its memory elements 136, divide the data into packets, and attach a header to each packet to indicate the destination AI chip 12a-12d, port, and (optionally) class of service. The packet header may also include information needed by the destination AI chip 12a-12d to identify the data in the packet. These packets may then be relayed across the high speed communication link to one of the ingress packet switch chips 22a, 22b. The ingress packet switch chip 22a, 22b may then examine the header to identify the destination information, and determine the VOQ 24a-24d needed to route the data accordingly.

The ingress and egress packet switch chips 22a, 22b, 26a, 26b, and the cell-fabric switch chips (not depicted within the cell-based switch fabric) may then coordinate the transfer of the packets from VOQs 24a-24d on the ingress packet switch chip 22a, 22b to an output queue (OQ) (e.g., OQs 28a-28d) on the egress packet switch chips 26a-26b. While four OQs 28a-28d have been depicted, it is understood that a greater or fewer number of OQs may be present in other examples. Each of the OQs 28a-28d may receive packets for one class of service and port for one destination AI chip 12a-12d. Since multiple ingress packet switch chips 22a, 22b may have data to send to the same OQ (on the egress packet switch chip 26a, 26b), the ingress packet switch chip 22a, 22b, egress packet switch chip 28a-28d and cell-fabric switch chips may negotiate as to which ingress packet switch chip 22a, 22b is permitted to send packets to any particular OQ 28a-28d at any given point in time. When this negotiation indicates that an ingress packet switch chip 22a, 22b may send data from a particular VOQ 24a-24d, the ingress packet switch chip 22a, 22b may dequeue one or more packets from that VOQ 24a-24d and "cellify" each packet by dividing the packet data into regular sized blocks of data (known as cells), attach a header to each cell to indicate the destination OQ 28a-28d, and deliver the cells to one or more cell-fabric switch chips 18. While two egress packet switch chips 26a, 26b have been depicted, it is understood that a greater or fewer number of egress packet switch chips 26a, 26b may be present. Further, in the illustrated example, OQs 28a, 28b are instantiated in egress packet switch chip 26a and OQs 28c, 28d are instantiated in egress packet switch chip 26b. However, such an arrangement is only an example, and in another embodiment (not depicted), OQs 28a-28d could all be instantiated in a single egress packet switch chip (e.g., egress packet switch chip 26a).

It is noted that the cell-fabric switch chips contained within the cell-based switch fabric 14 have been omitted (i.e., abstracted away), as these details were previously depicted in FIG. 1. For simplicity, a single communication path (i.e., an arrow) is depicted between VOQ 24a and OQ 28a, VOQ 24b and OQ 28b, VOQ 24c and OQ 28c, and VOQ 24d and OQ 28d. However, it is understood that such communication path may be formed by the one or more cell-fabric switch chips of the cell-based switch fabric 14. For completeness, it is noted that the links between the ingress switch chips 22a, 22b and the one or more cell-fabric switch chips may include a serializer/deserializer (SerDes) link which is terminated at each end by a SerDes interface. Likewise, the links between the one or more cell-fabric switch chips and the egress switch chips 26a, 26b may include a SerDes link.

FIG. 2B depicts a system 102 with embedded packet switching on the source and destination AI chips 112a-112d. Each of the AI chips 112a-112d may include inference logic 120a-120d, described in more detail below in FIG. 5. In this system 104, the source (destination) AI chip 112a-112d may incorporate parts of the functionality of the ingress (egress) packet switch chips 22a, 22b, 26a, 26b depicted in FIG. 2A, respectively. Further, in this system 104, each of the source AI chips 112a-112d may divide the data to be transferred into packets, directly determine the appropriate VOQ 124a-124d for each packet, and attach a packet header to each packet including information needed by the destination AI chips 112a-112d to identify the data in the packet. Each of the source AI chips 112a-112d may then enqueue the packets to a VOQ system 123a-123d implemented on each of the source AI chips 112a-112d. The source AI chips 112a-112d, destination AI chips 112a-112d, and cell-fabric switching chips may then jointly negotiate for each packet to be transmitted to a given OQ 128a-128d. When selected for transport, the packets may be dequeued from the respective VOQs 124a-124d. Each of the source AI chips 112a-112d may "cellify" the packet, attach a header to each cell to indicate the destination OQ 128a-128d, and then deliver the cells to one or more of the cell-fabric switch chips (not depicted in the cell-based switch fabric 14).

The cell-fabric switch chips may then route the cells to the appropriate destination AI chips 112a-112d. The destination AI chips 112a-112d may collect the cells of each packet and enqueue the packet to one or more of the OQs 128a-128d, which may be implemented directly on the destination AI chips 112a-112d. In the simplified example, there is a one-to-one mapping between the OQs 128a-128d and the destination AI chips 112a-112d (e.g., OQ 128a is present in destination AI chip 112a, . . . , OQ 128d is present in destination AI chip 112d). However, in a more general example, multiple OQs may be instantiated within each of the destination AI chips 112a-112d. In this more general example, each of the destination AI chips 112a-112d may select packets from OQs according to a scheduling policy based on the class of service assigned to each OQ. The cells of each packet may be decellified to reconstitute the packet data, either before enqueueing the packet to the OQ 128a-128d, or after the packet has been dequeued from the OQ 128a-128d. Each destination AI chip 112a-112d may then examine the packet header, which was attached by one of the source AI chips 112a-112d, to identify the data and determine its appropriate processing. Each destination AI chip 112a-112d may remove that header and store the packet data to one or more of its memory elements. For completeness, it is noted that the links between the source AI chip and the one or more cell-fabric switch chips may include a SerDes link. Likewise, the links between the one or more cell-fabric switch chips and the one or more destination AI chips may include a SerDes link.

FIG. 3A depicts a block diagram of an AI chip 112. In one embodiment, the AI chip 112 may be formed on a single semiconductor die. In another embodiment, the AI chip 112 may be formed on a plurality of semiconductor dies that are integrated into a single package. The AI chip 112 may include a communication interface including a serializer/deserializer (SerDes) interface 130 or other high speed interface. In one embodiment, the communication interface 130 may convert $\alpha$ parallel output data links, each at 112 Gbps or higher, into $\alpha$ serial output data links, and convert $\alpha$ serial input data link into $\alpha$ parallel input data links, each at 112 Gbps or higher. Possible values for $\alpha$ include 32, 36, 64, 72 or higher values.

The AI chip 112 may also include a fabric adapter 132 communicatively coupled to the communication interface. The fabric adapter 132 may be configured to interface other components of the AI chip 112 with a cell-based switch fabric 14. The fabric adapter 132 is described below in more detail in connection with FIGS. 7, 14, 15, 18, 19 and 21-24. The AI chip 112 may include a plurality of inference engine clusters 134, with a single cluster depicted in more detail in FIG. 4.

Each inference engine cluster 132 may include a respective memory element 136 (e.g., static random-access memory (SRAM), dynamic-random access memory (DRAM), etc.). The memory elements 136 are labeled as Memory 0, . . . , Memory N (for N≥1) in FIG. 3A, each corresponding to a respective inference engine cluster 134. In one embodiment, the memory element 136 may be an accelerator memory (AMEM), and may be a multi-banked, multi-ported SRAM structure providing high bandwidth to the interference engines 134 and a memory interface 138, as well as supporting inter-cluster and inter-chip communication.

Each inference engine cluster 134 may include a plurality of inference engines 140, also called universal inference engines (abbreviated as UIEs in the figures). An inference engine 140 is described below in more detail connection with FIG. 5.

The AI chip 112 may include a data interconnect 142 and a system network on chip (NoC) 144 communicatively coupled to each respective memory element 136 of the plurality of inference engine clusters 134 and to the memory interface 138. Examples of the data interconnect 142 include one or more of a core switch (which is a type of centralized crossbar switch), a ring, a mesh, a torus interconnect or other interconnecting/switching topology. The core switch is described below in more detail in connection with FIG. 6. As described in detail below, the fabric adapter 132 may be configured to facilitate remote direct memory access (RDMA) read and write services over the cell-based switch fabric 14 to and from the respective memory element 136 of the plurality of inference engine clusters 134 via the data interconnect 142.

The memory interface 138 may also include one or more HBM (e.g., HBM3E, HBM3v2) DRAM interface and controllers (e.g., labeled as HBM PHY I/F and HBM Ctl) to interface the AI chip 112 with one or more HBM IC chips 148. HBM PHY I/F is an abbreviation for the physical layer interface of the HBM stack and HBM Ctl is an abbreviation for the control logic of the HBM stack. While HBM IC chips 148 are depicted in FIG. 3A, it is understood that other DRAM standards may be employed instead of HBM, and accordingly the HBM DRAM interface and controllers may be, more generally, DRAM interface and controllers that are not specific to HBM.

The AI chip 112 may also include one or more modules 146 (e.g., PCIe Gen5 & Misc IO) to interface the AI chip 112 with an external controller and miscellaneous input/output devices. Misc IO is an abbreviation for a module to interface with miscellaneous input/output devices.

In the embodiment of FIG. 3A, the AI chip 112 may include N+1 inference engine clusters 134, which may be communicatively coupled to one another and to the fabric adapter 132 via the data interconnect 142. Within each of the inference engine clusters 134, the memory interface 138, and each instance of the inference engines 140 (e.g., UIE 0, . . . , UIE M for M≥1)) may be communicatively coupled to the memory element 136 of the inference engine cluster 134. The system network-on-chip (NoC) interface 144 may provide CPU and PCIE access (via the one or more modules 146) to the HBM DRAM 148.

The AI chip 112' depicted in FIG. 3B is a variation of the AI chip 112 depicted in FIG. 3A, in which each cluster of UIEs 134 may include a memory interface 138 which leads to the off-chip HBM chip 148. The memory interface 138 may include the above-described HBM DRAM interface and controllers (e.g., labeled as HBM PHY I/F and HBM Ctl). As mentioned above, other DRAM standards may be employed instead of HBM, and accordingly the HBM DRAM interface and controllers may be, more generally, DRAM interface and controllers that are not specific to HBM. While not depicted, it is understood that each of the UIEs 140 may include a memory cache for temporarily storing values, which may be needed when computing partial sums or other values during an inference operation. The data interconnect 142 may communicatively couple each respective memory interface 138 of the plurality of inference engine clusters 134 to the fabric adapter 132.

Figure 4:
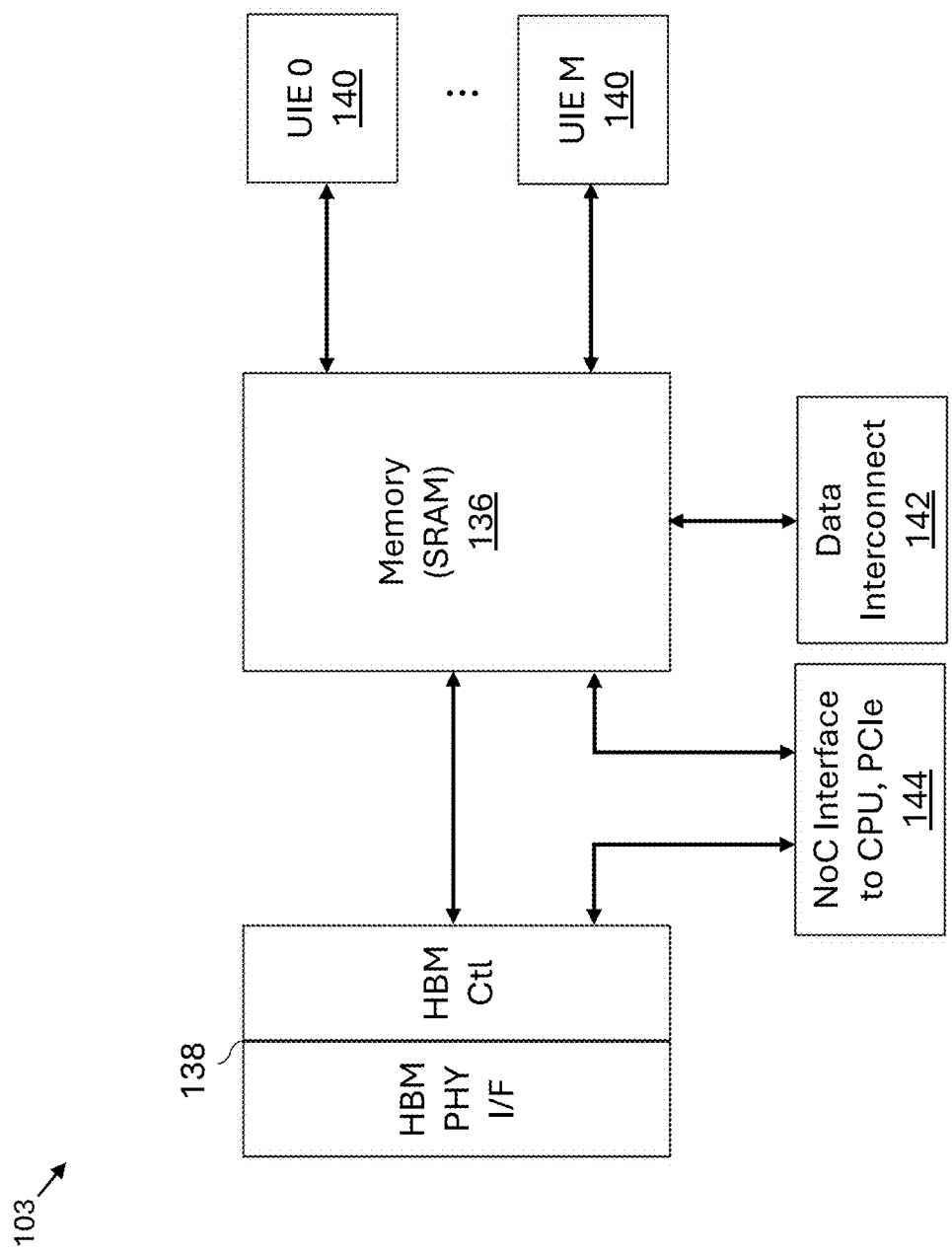
FIG. 4 depicts a block diagram of a universal interference engine (UIE) cluster, in accordance with one embodiment of the invention.

FIG. 4 depicts a data flow diagram 103 of a universal interference engine (UIE) cluster 134. Each UIE cluster 134 may include:
  A plurality of UIEs 140 (e.g., UIE 0, . . . , UIE M)
  A memory element 136, for example 64 Mbytes of SRAM
  An HBM (e.g., HBM3E, HBM3v2) DRAM interface and controller 138
  A data interconnect 142 for inter-cluster and inter-chip DMA transfers
  A system network-on-chip (NoC) interface 144 for CPU and PCIe access to HBM DRAM In one embodiment, the UIEs 140 may be designed to execute neural networks including convolutional neural networks (CNNs), transformers, recurrent neural networks (RNNs), large language models and general matrix-multiplication and vector computation tasks. Execution of a neural network inference may start by transferring weights and input data into HBM memories from outside of the AI chip 112. This transfer may be performed via PCIe or via the cell-based switching fabric. For the first layer of the neural network, input tokens may be converted into token embeddings by embedding lookup-tables in the HBM memories 148. Then, the token embeddings may be transferred into the memory element 136 (e.g., AMEM SRAM). For subsequent layers, the network may compute new token embeddings as the activation data. Once data has been stored in the respective HBM memories 148, the input data (image or token embeddings) and weights may be transferred from the respective HBM memories 148 into the memory element 136 (e.g., AMEM SRAM) via a DMA controller (not depicted). For completeness, it is noted that there may be one DMA controller (not depicted) for managing transfers from the memory element 136 (e.g., AMEM SRAM) to HBM memory 148, and another DMA controller (not depicted) for managing transfers from the HBM memory 148 to the memory element 136 (e.g., AMEM SRAM). Input data may be received from the fabric or PCIe (from outside the cluster) and DMA'ed into the accelerator memory 136 or HBM memory 148. The network layers may be executed as a series of trips (e.g., one round-trip from the cluster's memory element 136 to UIEs 140 and back to the cluster's memory element 136, since the UIEs 140 read from the cluster's memory element 136, do their work, and write the results back to the cluster's memory element 136) through the UIEs 140, where each trip is roughly equivalent to a network layer or node in a network graph. More generally, a trip may refer to a task, job or kernel. The tensor processing may be tiled, and the tiles distributed among the UIEs 140.

Execution of each trip (or network layer) may include loading trip microcode into the UIEs 140, reading the weights and tensor data from the memory element 136, executing the specific task (e.g., matrix multiplication or convolution), and writing the resulting tensor data back to the memory element 136. These tasks may all be executed by hardware under software supervision. A single network can include hundreds of trips in series (per UIE 140) and distributed across the UIEs 140. For parallel operation, data can be shared among the UIEs 140 within a cluster 134 via the shared memory element 136 (e.g., AMEM) or data can be shared among the clusters 134 by transferring the data from one cluster's memory element 136 to another cluster's memory element 136 under DMA control. Data may also be shared from one AI chip 112 to another AI chip 112 by transferring the data from the inference engine cluster 134 to/from the fabric adapter 132.

Figure 5:
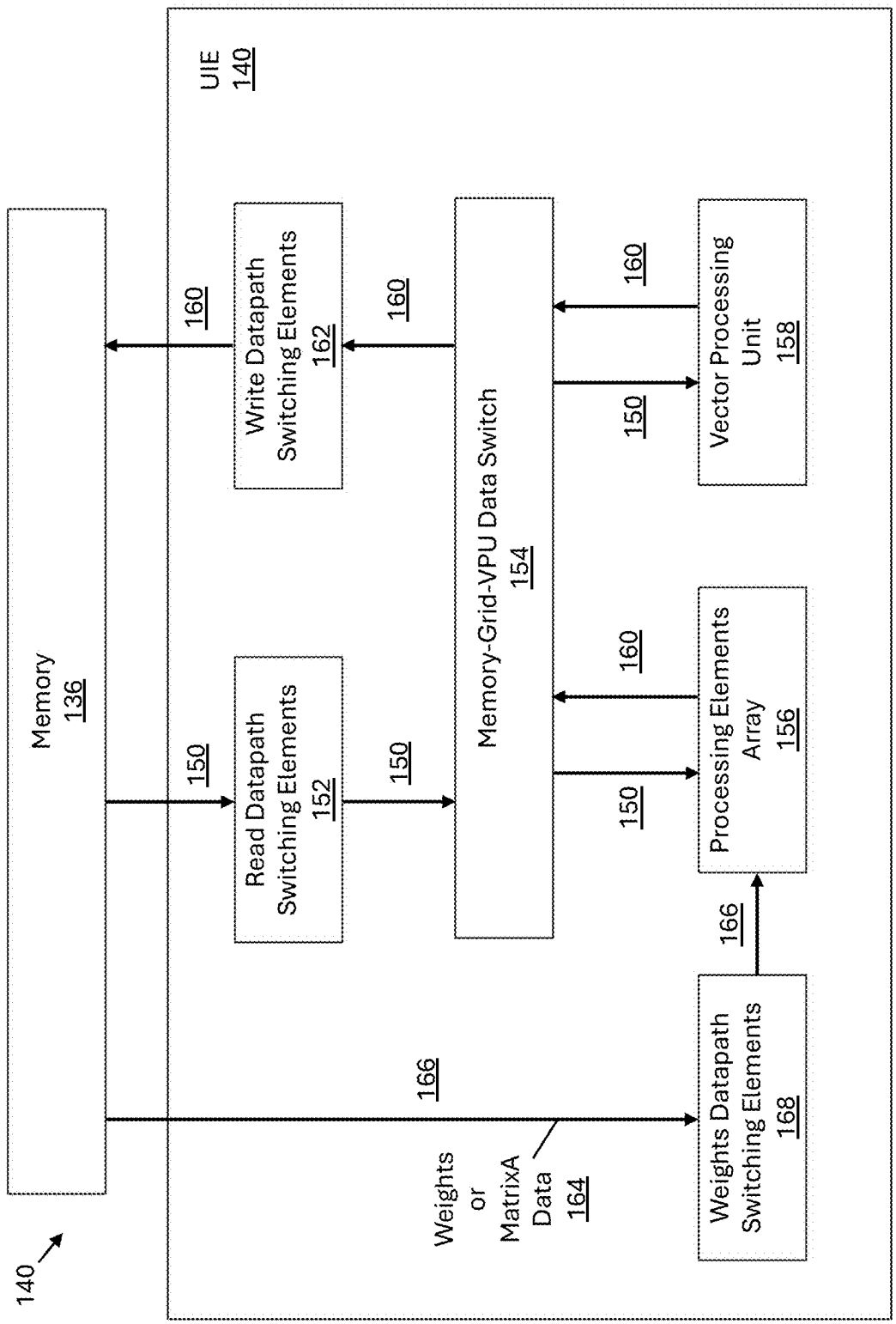
FIG. 5 depicts a block diagram of a universal interference engine, in accordance with one embodiment of the invention.

FIG. 5 depicts a data flow diagram 104 of a UIE 140. In one embodiment, the UIE 140 may be tuned for neural network inference workloads, and may be equally adept at carrying out convolution, matrix-multiplication, or transformer applications, hence the name "universal." In one embodiment, the UIEs 140 may execute neural networks as a sequence of trips, where each trip comprises reading a tensor (or one tile of a tensor) from the memory element 136, executing an operation such as 1×1 convolution or matrix multiplication on that tensor (or tile) and writing the results back to the memory element 136, performing one round-trip from the memory element 136 and back. In the simple case, one trip can correspond to one network layer. For some operations, multiple layers can be fused together in a single trip—the most common case is fusing a convolution of a 2-dimensional input data (Conv2D) or matrix multiplication (MatMul) with an activation function such as a rectified linear unit (ReLU) or a gaussian error linear unit (GeLU) in the same trip. In other cases, a single network layer may require multiple trips.

For each trip, the hardware may be programmed to read each tensor data-row from the memory element 136, stepping through the rows in a prescribed order, at up to the access width of the memory 136 (e.g., 128 bytes/cycle). In the nominal case, one row of a tensor may be stored in each 128-column word of the memory element 136, although for wider tensors, one row of a tensor may be tiled to process only 128 bytes per row, and for narrower tensors, multiple rows may be read concurrently, up to 128 bytes per cycle. The data rows read from the memory element 136 may be streamed through the UIE read datapath 150 to align data to the computational elements. The computation flow may depend on the type of operation being performed.

For 3×3 convolution, data-rows may then be streamed through the processing element array 156. The processing elements may be arrayed in a grid structure referred to as the processing element array 156. Conceptually, the tensor data may enter the processing element array 156 from the "top" (with "top" in reference to the orientation of the processing element array as depicted in the FIG. 5), while the weights may enter on the side. Each row of the processing element array 156 may implement one or more filters to natively execute 3×3 convolutions, with multiple accumulators in each processing element. This arrangement allows for streaming a block of contiguous input tensor-rows for one input channel, and computing a block of contiguous output tensor rows, while holding the 3×3 kernel weights steady for the duration of that block.

For 1×1 convolution or linear layers (which may be performed with matrix multiplication), the data rows may stream through the processing element array 156 from the "top" as with the 3×3 convolution, but the processing elements may first collect one data row from 8 input channels (over 8 cycles). The weights may stream in from the (left) side at an average rate of 8 bytes/cycle/row of the processing element array 156. This delivery of the data value and weights to the processing elements may allow the processing elements to perform a partial vector dot-product between those 8 data values and 8 corresponding weights. Every cycle (for 8 cycles) the processing elements may load 8 new weight values corresponding to a different output channel, and compute the dot-product of the (same) 8 data values with the (new) 8 weight values. In summary, one processing element may compute results for 8 output channels (or, equivalently, 8 output matrix rows) over 8 consecutive clock cycles. In this manner, the processing elements may implement filters for 8 output channels per row of the processing element array 156. In another embodiment, the processing element array could include a 128×128 array of processing elements, and the "horizontal" and "vertical" paths could each deliver 128 data values per cycle to the processing element array 156.

For other types of matrix multiplication, there may be two read ports on the memory element 136 (e.g., the accelerator memory) for each inference engine. One port may read the first matrix operand in blocks of 128 rows×128 bytes/row, and feed these in from the "side" of the processing element array 156 one column at a time. This first matrix operand may be either weights (for weight×data matrix multiplication) or activation data (for data×data matrix multiplication). When the first matrix operand is a plurality of weights, this is identical to a 1×1 convolution described above. The other memory element (e.g., the accelerator memory) port may read the second matrix operand, 1 row per cycle, and feed this data from the "top" of the processing element array 156. This may implement a 128×128 output stationary systolic array, where each processing element computes the dot-product for its respective row and column of the output matrix. Since there may be only 16 rows of the processing element array 156 to compute the 128 output rows of the matrix, each row of the processing element array 156 may be time-multiplexed to operate as 8 virtual rows.

For many types of element-wise tensor operations, data may instead be directed from the inference engine datapath to the vector processing unit 158, a SIMD processing array with 128 arithmetic logic unit (ALU) elements (one per column). This vector processing unit 158 may support a rich set of math operators including addition/subtraction, multi-plication/division, logical operations, and lookup-table based transforms to execute any arbitrary function of one variable. The vector processing unit 158 may also support more complex tasks such as SoftMax or pooling operations through programming. As the results are produced from the processing element array 156 or vector processing unit 158, the results may be streamed through the write datapath to align data to the memory element 136. Data may then be written back to the memory element 136, up to the access width of the memory element 136 (e.g., 128 bytes per cycle).

The read datapath 150 from a cluster's memory element 136 to a UIE 140 is described in association with FIG. 5, in which the read datapath 150 generally concerns the arrows pointing in the "downwards" direction in the schematic depicted in FIG. 5. As shown, a first portion of the read datapath 150 may interconnect the memory element 136 to the read path switching elements 152. A second portion of the read datapath 150 may interconnect the read path switching elements 152 to a data switch 154 (labeled as "Memory-Grid-VPU Data Switch"). A third portion of the read datapath 150 may interconnect the data switch 154 to the processing element array 156. A fourth portion of the read datapath 150 may interconnect the data switch 154 to the vector processing unit 158. For context, the read datapath switching elements 152 may rotate, reorganize or otherwise manipulate the data transferred from the memory element 136 to the data switch 154, in order to align the data into rows as required by the processing element array 156 or vector processing unit 158.

The weights datapath 166 from a cluster's memory element 136 to a UIE 140 is described in association with FIG. 5 for reading weights or matrix data 164 from memory 136 to UIE 140. As shown, a first portion of the weights datapath 166 may interconnect the memory element 136 with the weights datapath switching elements 168. A second portion of the weights datapath 166 may interconnect the weights datapath switching elements 168 with the processing element array 156. Alternatively, for the matrix multiplication mode, the weights datapath 166 may be repurposed as a further part of the read datapath 150 for reading values 164 from the memory element 136 that are not specifically contextualized as "weights." For context, the weights datapath switching elements 168 may rotate, reorganize or otherwise manipulate the data 164 transferred from the memory element 136, in order to align the data 164 into columns as required for the "weights" connection to the processing element array 156.

The write datapath 160 from a UIE 140 to a cluster's memory element 136 is described in association with FIG. 5, which generally concerns the arrows pointing in the "upwards" direction in the schematic depicted in FIG. 5. As shown, a first portion of the write datapath 160 may interconnect the processing element array 156 to the data switch 154. A second portion of the write datapath 160 may interconnect the vector processing unit 158 to the data switch 154. A third portion of the write datapath 160 may interconnect the data switch 154 to the write path switching elements 162. Finally, a fourth portion of the write datapath 160 may interconnect the write datapath switching elements 162 to the memory element 136. For context, the write datapath switching elements 162 may rotate, reorganize or otherwise manipulate the data transferred from the data switch 154 to the memory element 136, in order to align data into memory-words as required for writing to the memory element 136.

While the UIE 140 depicted in FIG. 5 includes a vector processing unit 158, it is noted that such component is optional, and another embodiment of the UIE 140 (not depicted) may not include a vector processing unit 158. Further, while the UIE 140 of FIG. 5 depicted the processing element array 156 and the vector processing unit 158 as two separate modules, this is not necessarily so, and another embodiment (not depicted) may include the processing element array 156 and the vector processing unit 158 as a single module.

Figure 6:
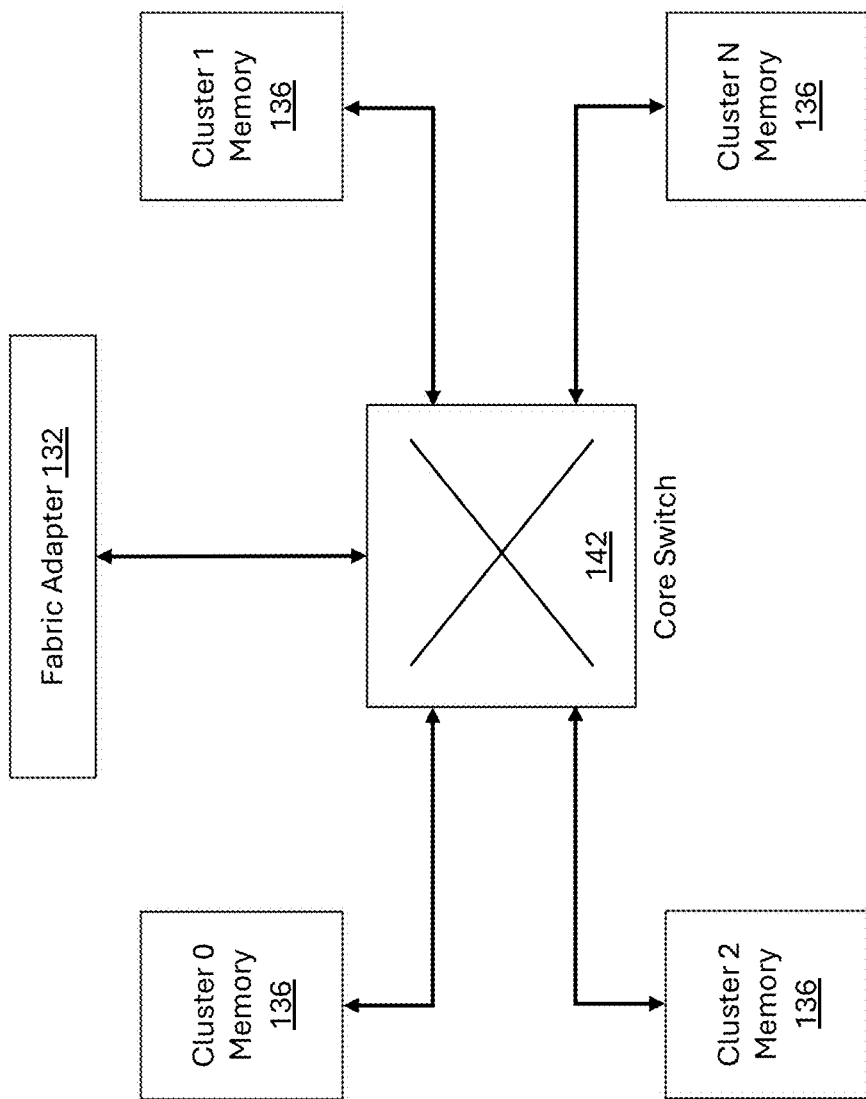
FIG. 6 depicts a schematic diagram with a core switch (i) communicatively coupling a memory element from one cluster to a memory element from any other cluster and (ii) communicatively coupling a memory element from any one of the clusters to the fabric adapter, in accordance with one embodiment of the invention.

In FIG. 6, the data interconnect 142 is implemented as a core switch 142 that is configured to (i) communicatively couple the memory element 136 from one cluster to the memory element 136 from any other cluster and (ii) communicatively couple a memory element 136 from any one of the clusters to the fabric adapter 132. The core switch 142 may include a buffered crossbar. Transfers from cluster-to-cluster may be executed by an Inter-Cluster DMA engine (not depicted), which can be programmed to transfer data blocks from a memory element 136 of one cluster a memory element 136 of another cluster. In one embodiment, a "local memory-copy" function may be provided in which data blocks from a memory element 136 of one cluster 134 can be transferred back to the memory element 136 of the same cluster 134.

Figure 15:
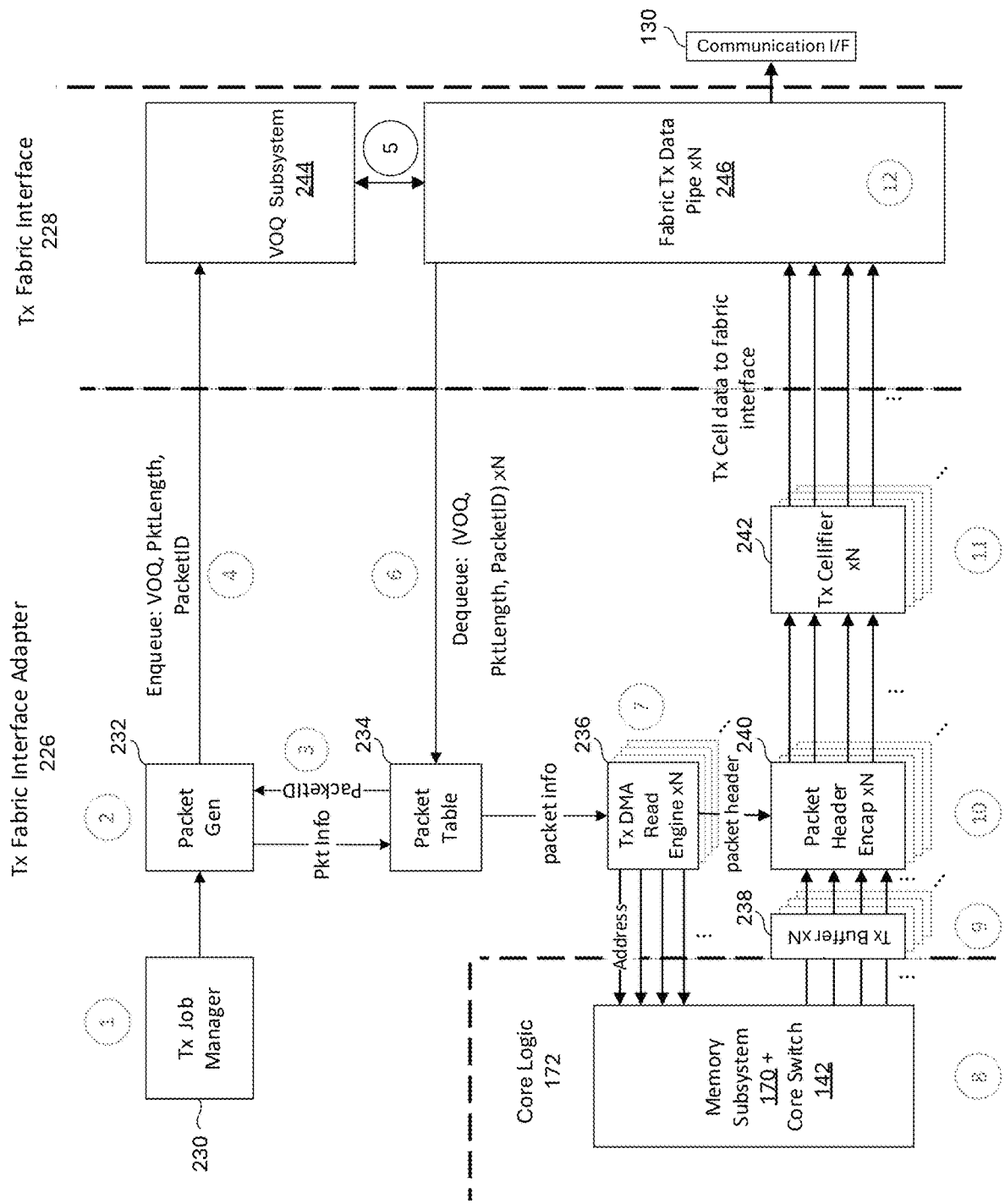
FIG. 15 depicts a block diagram of a first embodiment of the transmit fabric adapter, in accordance with one embodiment of the invention.

Transfers between any memory element 136 of one cluster 134 and the fabric adapter 132 may be controlled by the remote DMA engine (depicted as the "Tx DMA Read" module in FIG. 15).

In one embodiment (not depicted), the core switch 142 may also be connected to the HBM (external DRAM) chips 148. More specifically, the HBM controllers 138 may have a connection to the memory element 136 (e.g., AMEM) and another connection to the core switch 142. For inter-chip RDMA, this architecture would extend the transfer options to either the memory element 136 or HBM chip 148 in each cluster 134. While not depicted, it is understood that the schematic diagram of FIG. 6 could be varied to match the FIG. 3B embodiment in which each of the cluster memories 136 would be replaced with a memory interface 138 that leads to an off-chip DRAM chip (e.g., a HBM chip) 148.

Figure 7:
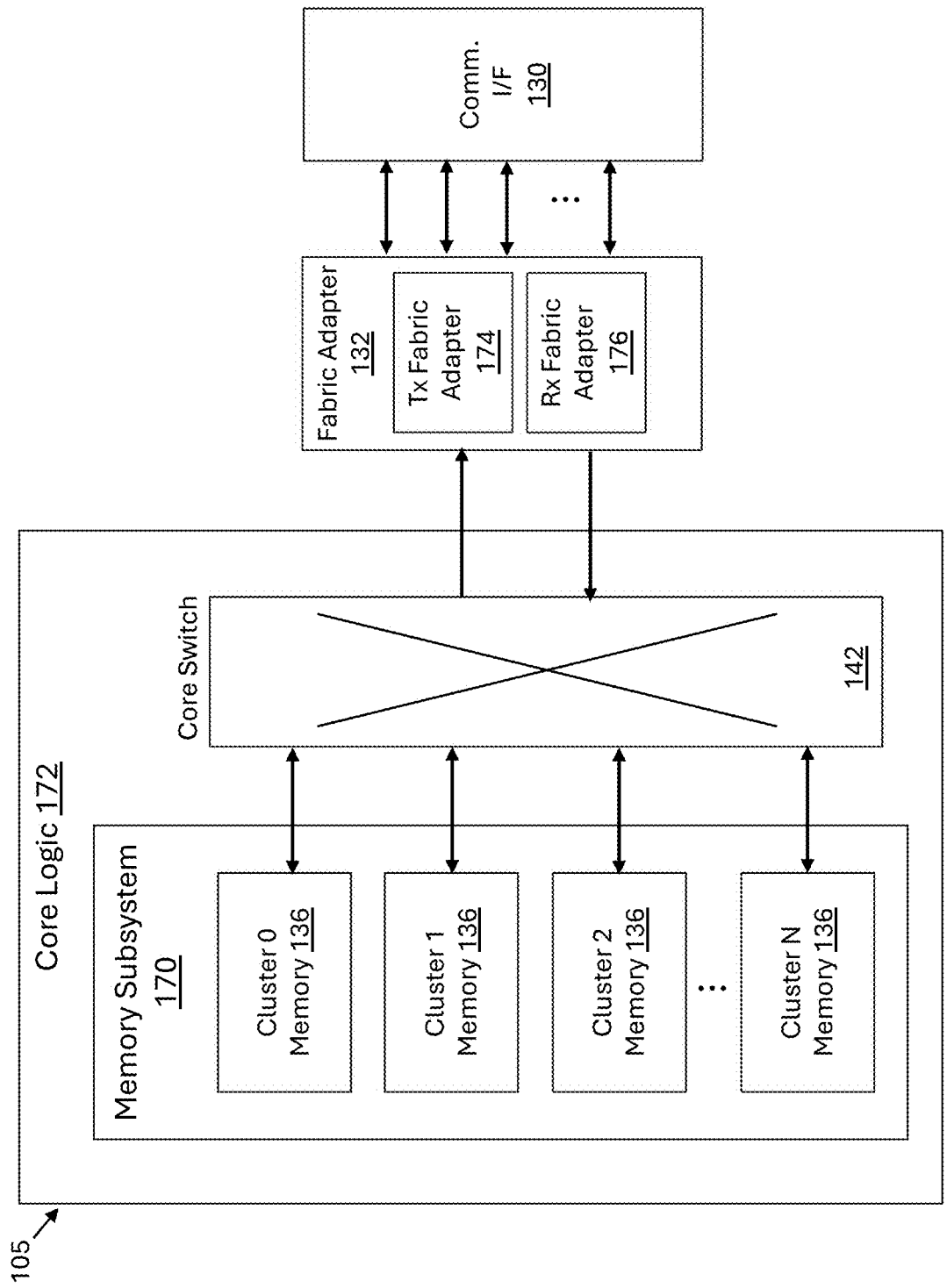
FIG. 7 depicts a schematic diagram with a fabric adapter communicatively coupling the core switch to the SerDes interface, in accordance with one embodiment of the invention.

FIG. 7 depicts a schematic diagram 105 with a fabric adapter 132 communicatively coupling the core switch 142 (or more generally, the data interconnect) to the communication interface 130. The AI chip 112 may include the communication interface 130 to a cell-based switch fabric 14 (see FIG. 1) and the fabric adapter 132 to interoperate with a plurality of cell-fabric switch chips 18 (see FIG. 1). In one embodiment, the fabric adapter 132 can carry payload traffic (in each direction) to and from the cell-based switch fabric 14. The transfers may be divided into n lanes of ~100 GB/s each, with each lane typically corresponding to one inference engine cluster 134. The fabric adapter 132 may include a transmit fabric adapter 174 configured to transmit data to the cell-based switch fabric 14 and a receive fabric adapter 176 configured to receive data from the cell-based switch fabric 14. The transmit fabric adapter 174 is described in more detail below in connection with FIGS. 15 and 21, and the receive fabric adapter 176 is described in more detail below in connection with FIGS. 19 and 22. The core logic 172 may include a memory subsystem 170 that is communicatively coupled to the core switch 142 (or more generally the data interconnect). The memory subsystem 170 may include the previously discussed memory elements 136 from all the clusters (e.g., cluster 0, . . . , cluster N). It is noted that while the communication interface 130 is depicted as a component separate from the fabric adapter 132, it is possible in another embodiment (not depicted) for the communication interface 130 to be part of the fabric adapter 132.

Figure 8:
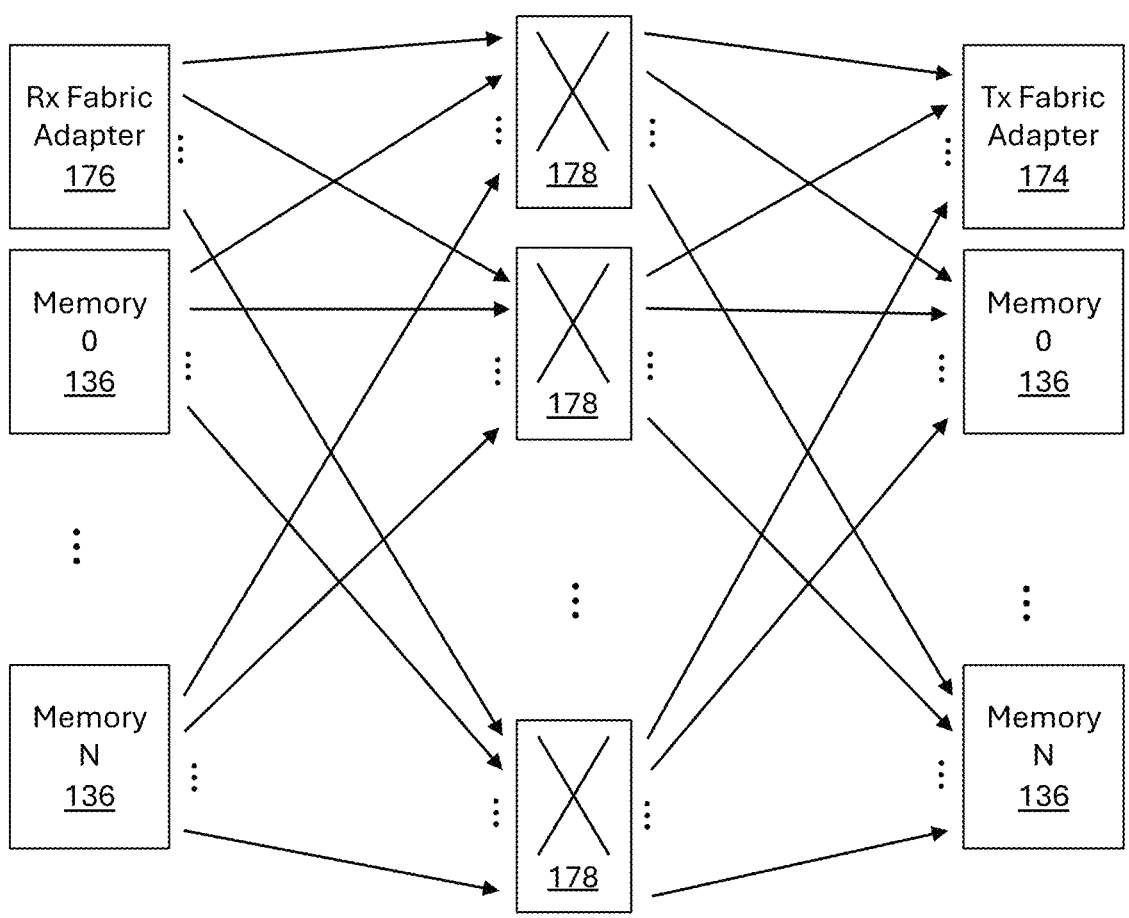
FIG. 8 depicts a schematic diagram of the core switch formed by a plurality of crossbar switches, in accordance with one embodiment of the invention.

FIG. 8 depicts a schematic diagram 106 with a plurality of crossbar switches 178 that form the core switch 142. In FIG. 8, the components on the left side of the schematic may be called "source clients" and the components on the right side of the schematic may be called "destination clients." The source clients may include the receive fabric adapter 176, memory element 0 (136) of cluster 0, . . . , and memory element N (136) of cluster N. The destination clients may include the transmit fabric adapter 174, memory element 0 (136) of cluster 0, . . . , and memory element N (136) of cluster N. For clarity, memory element 0 (136) of cluster 0 has been depicted twice, one instance for the source client and one instance for the destination client; however, it is understood that these two instances correspond to the same physical component. The same comment applies to the other memory elements 136 which have been depicted in a duplicated fashion. Each source client may load-balance across the crossbar switches 178 by "spraying" the requests for each destination client across the crossbar switches 178. In one embodiment, each source client may maintain a "spray pointer" for each destination client, and perform a round-robin selection separately for each destination client.

Figure 9:
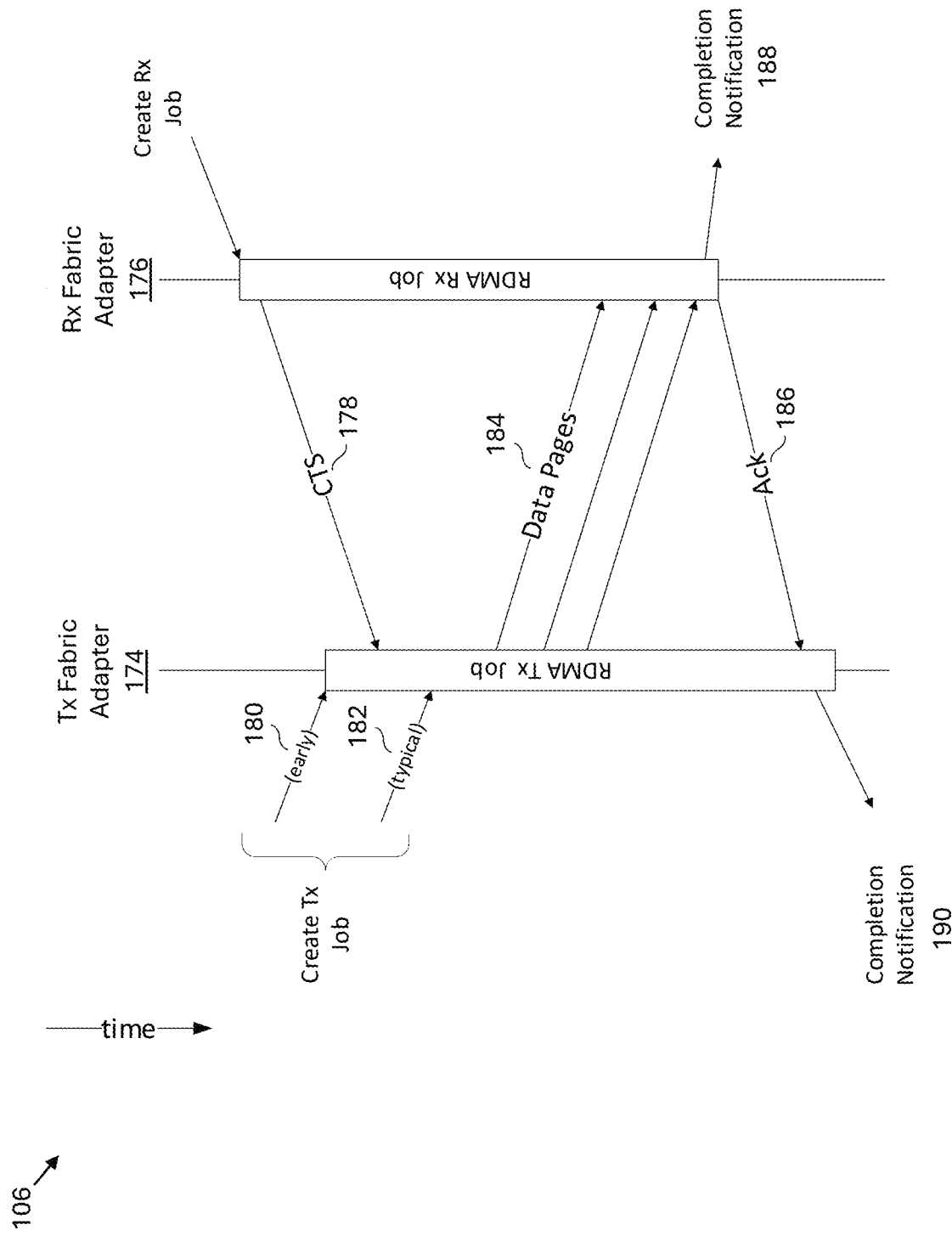
FIG. 9 depicts a sequence diagram of the communication, involving the transmit fabric adapter and the receive fabric adapter, that may occur with remote direct memory access (RDMA) communication, in accordance with one embodiment of the invention.

FIG. 9 depicts a sequence diagram 106 of the communication, involving the transmit fabric adapter 174 and the receive fabric adapter 176, that may occur with remote direct memory access (RDMA) communication. In one embodiment, the RDMA may employ a "solicited write" model. Before a source AI chip 112 (also called a transmitter or a transmit chip) RDMA-writes data into a destination AI chip 112 (also called a receiver or receive chip), the receiver 112 may allocate memory in a destination memory element 136, and assign a receive-job (Rx Job) context. The receive-job context may include a destination address within the destination memory element 136, an inference engine cluster 134 to which the destination memory element 136 belongs, a transfer length, an identification of the transmit chip 112, the source inference engine cluster 134 within the transmit chip 112, and the transmit job identifier (Tx Job ID) associated with the RDMA-write.

Before the source chip RDMA-writes data into the destination chip 112, the transmit chip 112 may be programmed with a transmit job context that includes a source address within the source memory element 136, an inference engine cluster 134 to which the source memory element 136 belongs, a transfer length, an identification of the receiver chip 112, the destination inference engine cluster 134 within the receive chip 112, and the receive job identifier (Rx Job ID) associated with the RDMA-write.

Once the receive job is set up, the receive chip 112 may send a "Clear to Send" (CTS) message 178 to the transmit chip 112. In one embodiment, the CTS message 178 may include the transmit job identifier (Tx Job ID) and the receive job identifier (Rx Job ID) associated with the RDMA-write. It is noted that the CTS message 178 must include the Tx Job ID to steer the message to the correct job. The Tx Job ID may act as the endpoint identifier for messages arriving at the Tx chip 112, analogous to an IP address or TCP port number. The Rx Job ID may also included in the CTS message 178 for consistency checking and debug support, but the Rx Job ID is not strictly required in the CTS message 178 to operate correctly.

FIG. 9 depicts two scenarios. In the first scenario 180, the transmit job (with an associated Tx Job ID) may be initialized before the CTS message 178 is received at the transmit fabric adapter 174. Intuitively, it makes sense that the CTS message 178 can include the Tx Job ID of the transmit job since the Tx Job ID is in existence prior to the CTS message 178 being transmitted. In the second scenario 182, the transmit job may even be initialized after the CTS message 178 is received at the transmit fabric adapter 174. This latter scenario 182 is possible because the RDMA protocol in this embodiment may require a predetermined configuration of the transmit and receive chips for the RDMA transfer. When the Rx job is initialized in the Rx chip, it may send the CTS message 178 without first establishing whether the associated transmit job has been initialized in the transmit chip 112, because the RDMA protocol in this embodiment guarantees that the transmit job will eventually be initialized. Further, the Rx job is configured with the Tx Job ID which will be used when the transmit job is initialized. Therefore, the receipt of a CTS message 178 (on the transmit fabric adapter 174) can set a status indication for that Tx Job ID which will be used once the transmit job has been initialized. After receiving the CTS message 178, and after the transmit job has been initialized, the transmit chip 112 can commence the data transfer 184 across the cell-based switch fabric 14.

Each RDMA job may be from 1000's of bytes up to multiple megabytes. In one embodiment, the transfers may be divided into large packets of up to 16 KBytes, and packets from multiple RDMAs may be interleaved for transmission across the cell-based switch fabric 14. This may be necessary when communicating with multiple AI chips 112 in parallel, so the RDMAs can be parallelized.

Figure 20:
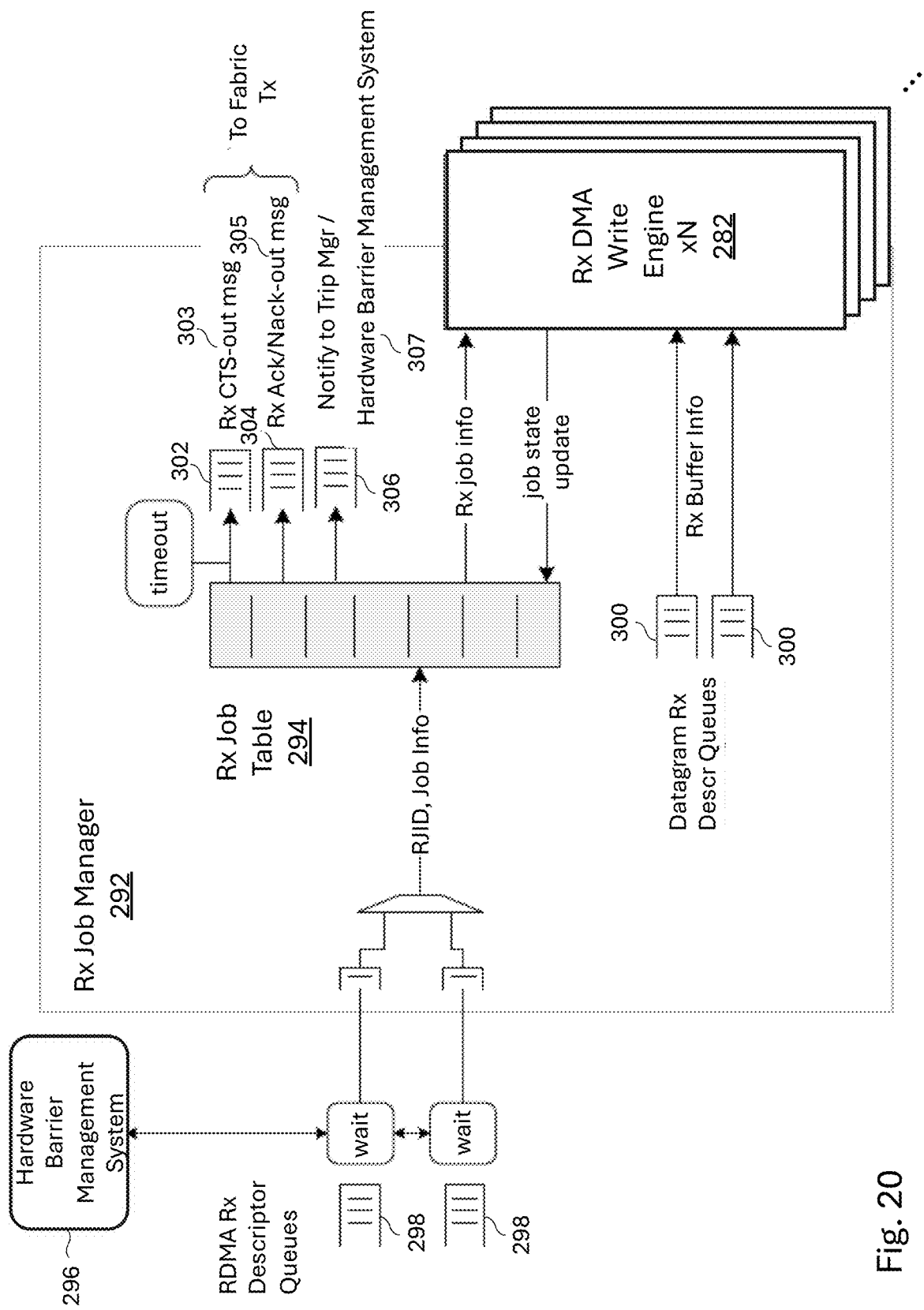
FIG. 20 depicts a schematic diagram of a receive job manager, in accordance with one embodiment of the invention.

After all data is received for a job, the receiver 112 may send an acknowledgement (ACK) message 186, and may also be programmed to issue completion notifications 188 to a hardware barrier management system 296 (that is specific to the receiver chip and cluster instance of the receiver) depicted in FIG. 20 in order to relax hardware barriers (indicating that received data is available, and dependent trips may use the data). At this point, the receive job context may be retired. Upon receiving the ACK message 186, the transmitter 112 may also be programmed to issue completion notifications 190 to its hardware barrier management system 248 (that is specific to the chip and cluster instance of the transmitter) depicted in FIG. 16, indicating that the transmitted data buffers may be re-claimed and reused. At this point, the transmit job context may be retired.

Some background information regarding a hardware barrier management system is now provided. Hardware barriers provide synchronization by enforcing the dependencies between producer threads and consumer threads in hardware. For this discussion, the term "thread" indicates a task or "job" running on a hardware engine such as an UIE 140 or an RDMA job manager. The hardware barriers may ensure that any dependencies have been satisfied before a thread can begin, such as that the data to be consumed has been made available in a memory by a producer. Each thread may have producer and consumer personalities, in which the consumer personality may wait on the producer threads upon which it is dependent, and the producer personality may signal the releasing of dependencies to the consumer threads which are dependent on this thread.

Each (consumer) thread may be assigned to monitor one barrier object from a pool of barrier objects. Each barrier object may implement a count of the outstanding producer dependencies (i.e., the number of producer threads which must "relax" the barrier before all dependencies are resolved). The barrier object may be initialized with a count of the total number of these producer dependencies for each consumer. One or more consumers may be assigned to monitor a single barrier object. Each producer thread may be programmed with a list of one or more barrier objects which are notified when the thread is done. This "notification" may decrement the count in the barrier object, a process also referred to as "relaxing" the barrier. When the count has been decremented to zero, the dependent consumer(s) for that barrier object may become free to execute their tasks.

Figure 10:
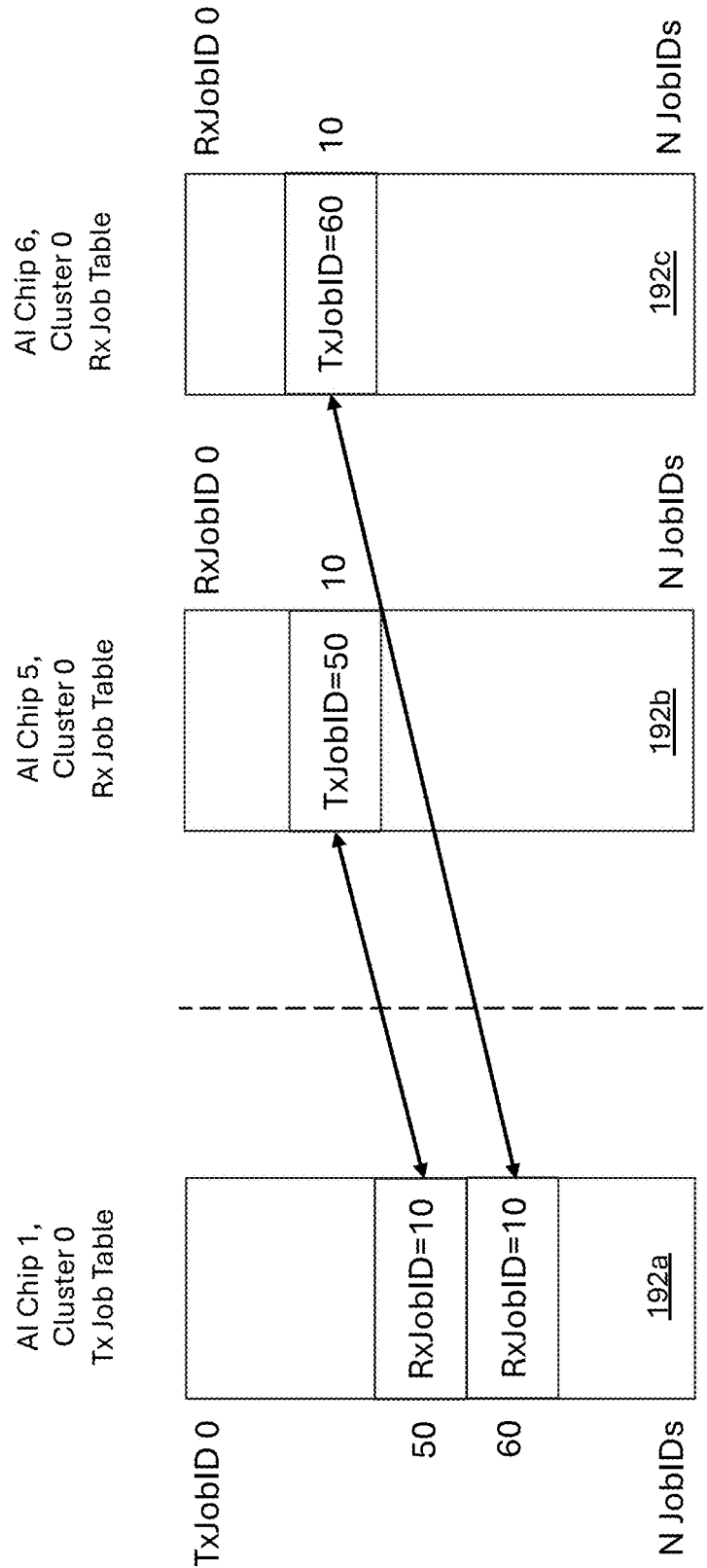
FIG. 10 depicts an example of transmit job identifier (Tx Job ID) and receive job identifier (Rx Job ID) mappings for RDMA communication, in accordance with one embodiment of the invention.

FIG. 10 depicts an example of transmit job identifier (Tx Job ID) and receive job identifier (Rx Job ID) mappings for RDMA communication. In the example of FIG. 10, it is assumed that AI chips 112 are numbered (e.g., AI chip 1, . . . . AI chip 5, AI chip 6, . . . ). Further, it is assumed that each AI chip 112 includes a plurality of clusters 134 (e.g., cluster 0, . . . cluster N). Further, it is assumed that cluster j on one AI chip 112 only communicates with the same cluster j on other AI chips 112, so there is no ambiguity in re-using the same Job IDs for communication between the same (numbered) clusters of each of the AI chips 112. Under such assumptions, the tens digit of the Tx Job ID may be used to indicate the destination AI chip 112, the tens digit of the Rx Job ID may be used to indicate the source AI chip 112, and the ones digit of either the Tx Job ID or Rx Job ID may be used to indicate a channel between the two endpoints (i.e., source AI chip 112 and destination AI chip 112).

Specifically, in the example of FIG. 10, the source chip is AI chip 1, and the destination chips are AI chip 5 and 6. Rx Job ID 10 may be entered into the transmit job table 192a of AI chip 1 using Tx Job ID 50 as the job table index, indicating that AI chip 1 will be sending data to AI chip 5. Rx Job ID 10 may be entered into the transmit job table 192a of AI chip 1 using Tx Job ID 60 as the job table index, indicating that AI chip 1 will also be sending data to AI chip 6.

Tx Job ID 50 may be entered into the Rx job table 192b of AI chip 5 using Rx Job ID 10 as the job table index, indicating that AI chip 5 will be receiving data from AI chip 1 using Tx Job ID 50 and Rx Job ID 10. The VOQ of the AI chip 1 may also be entered into the Rx job table 192b of AI chip 5 using Rx Job ID 10 as the job table index so that AI chip 5 knows which VOQ of AI chip 1 to send messages (e.g., CTS, ACK) back to AI chip 1.

Tx Job ID 60 may be entered into the Rx job table 192c of AI chip 6 using Rx Job ID 10 as the job table index, indicating that AI chip 6 will be receiving data from AI chip 1 using Tx Job ID 60 and Rx Job ID 10. Likewise, the VOQ of the AI chip 1 may also be entered into the Rx job table 192c of AI chip 6 using the Rx Job ID 10 as the job table index so that AI chip 6 knows which VOQ of AI chip 1 to send messages (e.g., CTS, ACK) back to AI chip 1.

All the data in the example of FIG. 10 is communicated via channel 0, as indicated by the one's digit being 0. The cluster number does not factor into the ID in the example of FIG. 10, because it is assumed that only the same numbered clusters can communicate with one another, as described above.

However, a different convention may be used for the Tx Job ID and Rx Job ID when cross-cluster communication is permitted between AI chips 112. In such a scenario, there may be no change in the use of the ten's digit; however, the one's digit may be used to indicate the cluster. For example to link source AI chip 1, cluster 0 to destination AI chip 5, cluster 1, the Tx Job ID may be assigned 51 and the Rx Job ID may be assigned 10. In such a convention, there may no longer be any identifier for the "channel" between two endpoints, and hence only a single channel may exist between two endpoints, in which an endpoint would be represented by the pair of a specific AI accelerator IC and a specific cluster on that AI accelerator IC (e.g., AI chip X, cluster Y).

In yet another embodiment that allows for cross-cluster communication, a table may be used to record a mapping from respective identifier to respective three-tuples containing the chip number, cluster number and channel number. For example, suppose the identifier 23 were mapped to the three-tuple (3, 3, 5) and the identifier 25 were mapped to the three-tuple (1, 2, 4). The Tx Job ID=23 and the Rx Job ID=25 would indicate that AI chip 3, cluster 3, channel 5 would be receiving data from AI chip 1, cluster 2, channel 4. The allocation and management of the above-described identifiers may be under software control.

Figure 11:
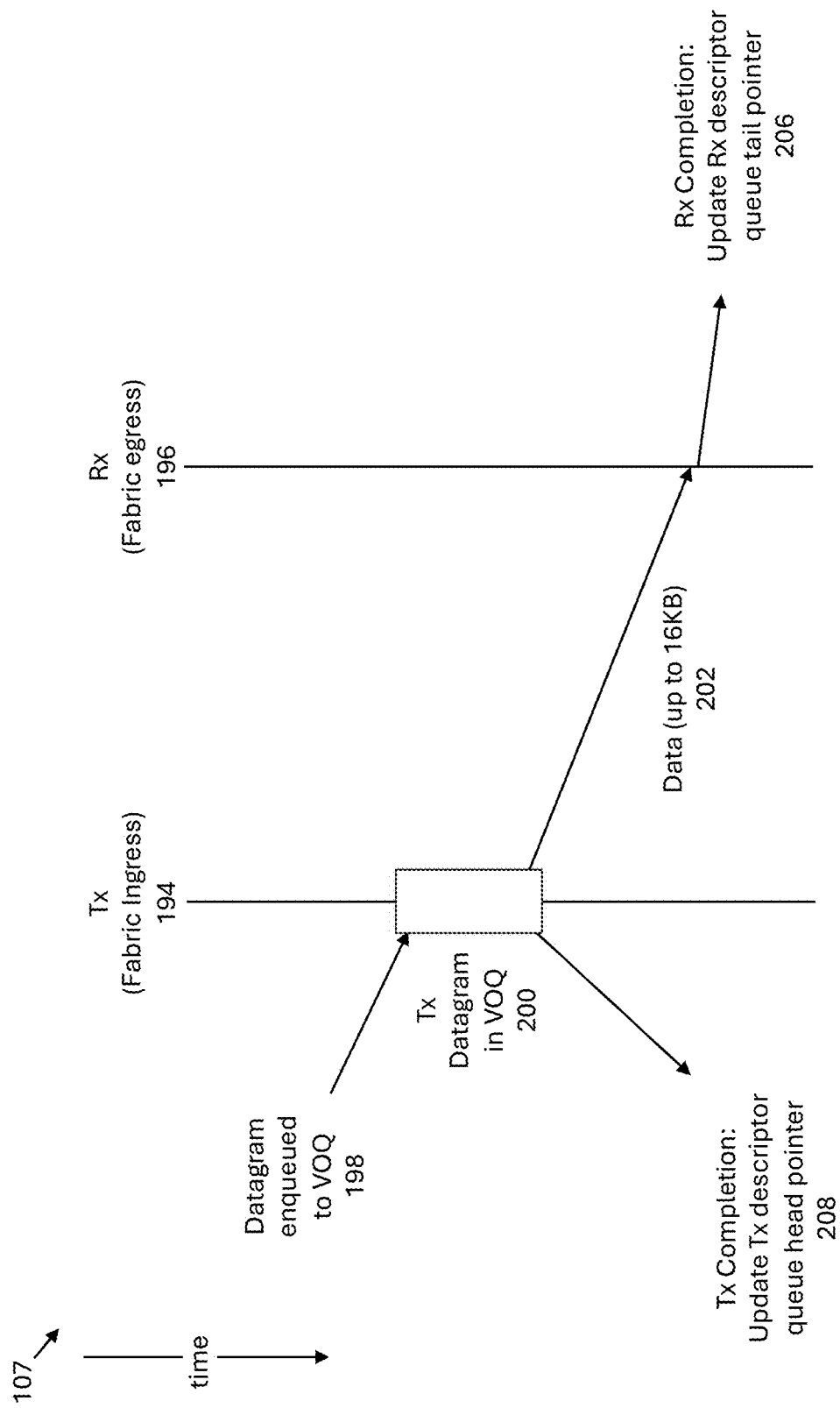
FIG. 11 depicts a sequence diagram illustrating the communication of a datagram from the transmit fabric adapter to the receive fabric adapter over the cell-based switch fabric, in accordance with one embodiment of the invention.

FIG. 11 depicts a sequence diagram 107 illustrating the communication of a datagram (i.e., an unsolicited packet transfer without "reliable transport") from the fabric ingress 194 to the fabric egress 196 over the cell-based switch fabric 14. In this context, "reliable transport" means the end-to-end completion is guaranteed with positive acknowledgement and transmission retry if necessary. While the cell-based switch fabric 14 is not explicitly depicted in FIG. 11, it is understood that the fabric ingress 194 is communicatively coupled to the fabric egress 196 through the cell-based switch fabric 14. As depicted in FIG. 11, a datagram 200 may be enqueued (step 198) to a virtual output queue (VOQ) at the fabric ingress 194. The datagram 200 (which may be one large packet) may be transmitted from the fabric ingress 194 to the fabric egress 196. Upon the completion of the receipt of the datagram 200, the receive descriptor queue tail-pointer may be updated (step 206) at the fabric egress 196. Upon the completion of the transmission of the datagram, the transmit descriptor queue head-pointer may be updated (step 208) at the fabric ingress 194.

A datagram 200 may correspond to a single packet. Data may be transmitted from a Tx queue (on a source chip 112) to an Rx queue (on a target chip 112). Data may be stored on the Tx queue by software, and read from the Rx queue by software, so this configuration may provide a CPU-to-CPU transmission service. The communication of a datagram 200 may not employ RDMA job tables, Clear-to-Send (CTS) messages, timers or job state tracking. Received datagram packets may be dropped if the indicated receive queue (RxQ) ring does not contain any free descriptors. The transmit and receive descriptor processing may not use hardware barriers. Synchronization may be provided by the transmit queue (TxQ) and RxQ head/tail-pointers.

In this context, the synchronization refers to the synchronization between producers and consumers of data: on the transmit side, the TxQ head/tail pointers (and associated descriptor ring) provide synchronization between the CPUs producing data to be transmitted, and the transmit fabric adapter 174 which is consuming the data. The descriptors include pointers to memory buffers which hold the data to be transmitted. Similarly for the receive side: head/tail pointers (and associated descriptor ring) sync the CPU providing free descriptors to the receive fabric adapter 176 consuming the free buffers associated with the descriptors. This provides the memory buffer pointers to the receive fabric adapter 176 so it knows where to store the received datagram packets. Then, the RxQ head/tail pointers sync the receive fabric adapter 176 filling the buffers (as data producer) to the CPU consuming the data from the buffers.

Figure 12:
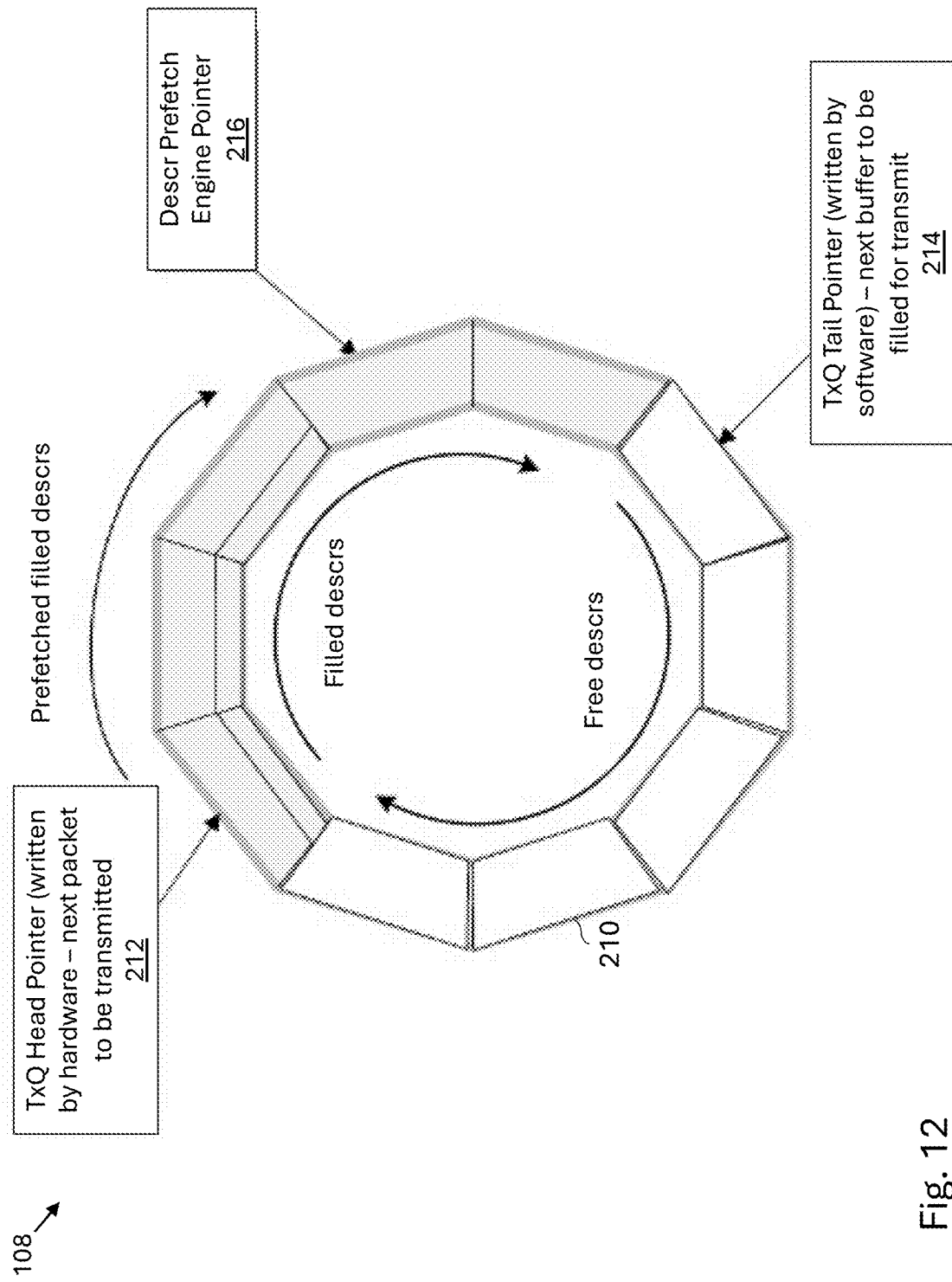
FIG. 12 depicts a schematic diagram of a transmit queue descriptor ring, in accordance with one embodiment of the invention.

FIG. 12 depicts a diagram 108 of a transmit queue descriptor ring 210. In one embodiment, each datagram descriptor transmit queue (TxQ) may be managed by software using a transmit queue descriptor ring 210. TxQ descriptors may be organized in a ring buffer 210 with the tail-pointer 214 written by software and the head-pointer 212 written by hardware. Each descriptor may include a buffer pointer for the transmit data, payload size, and the VOQ to identify the target chip 112, cluster 134 and RxQ at the target chip/cluster. These descriptors may be set up by software. The transmit queue descriptor ring 210 may also have a prefetch pointer 216 between the head-pointer 212 and tail-pointer 214, for the descriptor prefetch engine (not depicted) to move descriptors into the hardware FIFOs for immediate use. Initially, software may set the head-pointer 212 equal to the tail-pointer 214 since the queue 210 is empty. As software fills the buffers, software can advance the tail-pointer 214 to make the descriptors visible to hardware. Software may advance the tail-pointer 214 to the address of the entry just past the last valid descriptor.

This action may trigger the descriptor prefetch engine to move a plurality of descriptors from SRAM-based descriptor rings into the (shallow) hardware FIFOs feeding to the transmit fabric adapter 174. As hardware subsequently transmits the packets, hardware may advance the head-pointer 212 and signal an interrupt to indicate that the buffer has been freed. Hardware may advance the head-pointer 212 to one entry past the last freed descriptor. Software can maintain a shadow-copy of the head-pointer 212, and determine which descriptors' buffers have been freed by comparing the shadow-pointer with the hardware head-pointer 212 (after which software updates the shadow-pointer to match the hardware head-pointer 212). In this scheme, the transmit queue 210 is full when the head-pointer=tail-pointer+1 (modulo the ring size). A ring of L descriptors is full when it holds L−1 entries.

Figure 13:
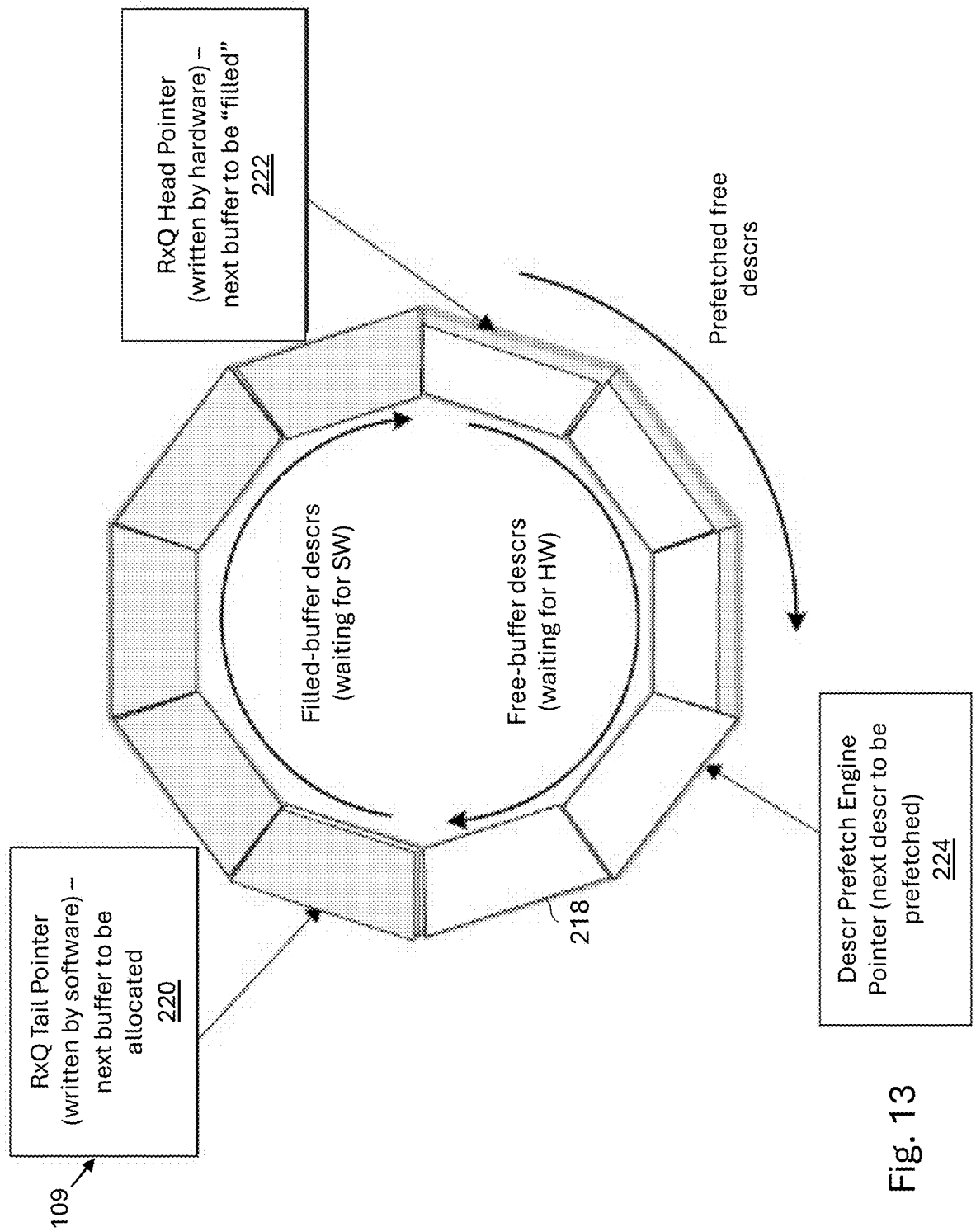
FIG. 13 depicts a schematic diagram of a receive queue descriptor ring, in accordance with one embodiment of the invention.

FIG. 13 depicts a diagram 109 of a receive queue descriptor ring 218. In one embodiment, each datagram descriptor receive queue (RxQ) may be managed by software using a receive queue descriptor ring 218. RxQ descriptors may be organized in a ring buffer 218 with a tail-pointer 220 written by software and head-pointer 222 written by hardware. Each descriptor may include a buffer pointer for the received data (written by software), and the received datagram size (written by hardware). The receive queue descriptor ring 218 may also have a prefetch-pointer 224 between the head-pointer 222 and tail-pointer 220, for the descriptor prefetch engine to move descriptors into the hardware FIFOs for immediate use.

The receive queue descriptor ring 218 may be logically divided into free descriptors, and filled-descriptors which hold the received packets waiting to be processed by software. The free descriptors section may be further divided by the intermediate prefetch-pointer. Initially, software may set the head-pointer 222, tail-pointer 220 and prefetch-pointer 224 all equal to one another to indicate that the receive queue descriptor ring 218 is empty. Software may then prepare descriptors and write them into locations starting from the tail-pointer 220, and then may advance the tail-pointer 220 to make the descriptors visible to hardware. Software may advance the tail-pointer 220 to the address of the entry just past the last valid descriptor.

This action may trigger the descriptor prefetch engine to prefetch a plurality of descriptors which are sent to the receive fabric interface 176 (which effectively caches these descriptors), and advance the prefetch-pointer 224. As each (datagram) packet is received, it may be written to the buffer location for the next (prefetched) descriptor, and hardware may update the descriptor (in memory) to convey the length of the packet and the packet-available status. Hardware may then advance the head-pointer 222 which informs software that the descriptor has been updated (effectively removed from the free-descriptors and added to the filled-descriptors section). This action may signal an interrupt to software in order to indicate that the buffer 218 has been filled. Hardware may then advance the head-pointer 222 to one entry past the last filled descriptor. When software receives the interrupt, it may read the hardware head-pointer 222 to determine how many descriptors have been "filled" since the last time it serviced the receive queue descriptor ring 218. Software may maintain a shadow copy of the hardware head-pointer 222. Software may process the packets between its (shadow) head-pointer and the hardware's head-pointer 222, and then update the shadow-pointer to match the hardware head-pointer 222. After processing the received packet descriptors, software can subsequently prepare those descriptors with fresh buffers. Once that has been completed, software may update (advance) the tail-pointer 220 to resupply the free descriptors, by setting the tail-pointer 220 one entry past the last free descriptor. In this scheme, the receive queue descriptor ring 218 is full when the head-pointer=tail-pointer+1 (modulo the ring size). A ring of L descriptors is full when it holds L−1 entries.

Figure 14:
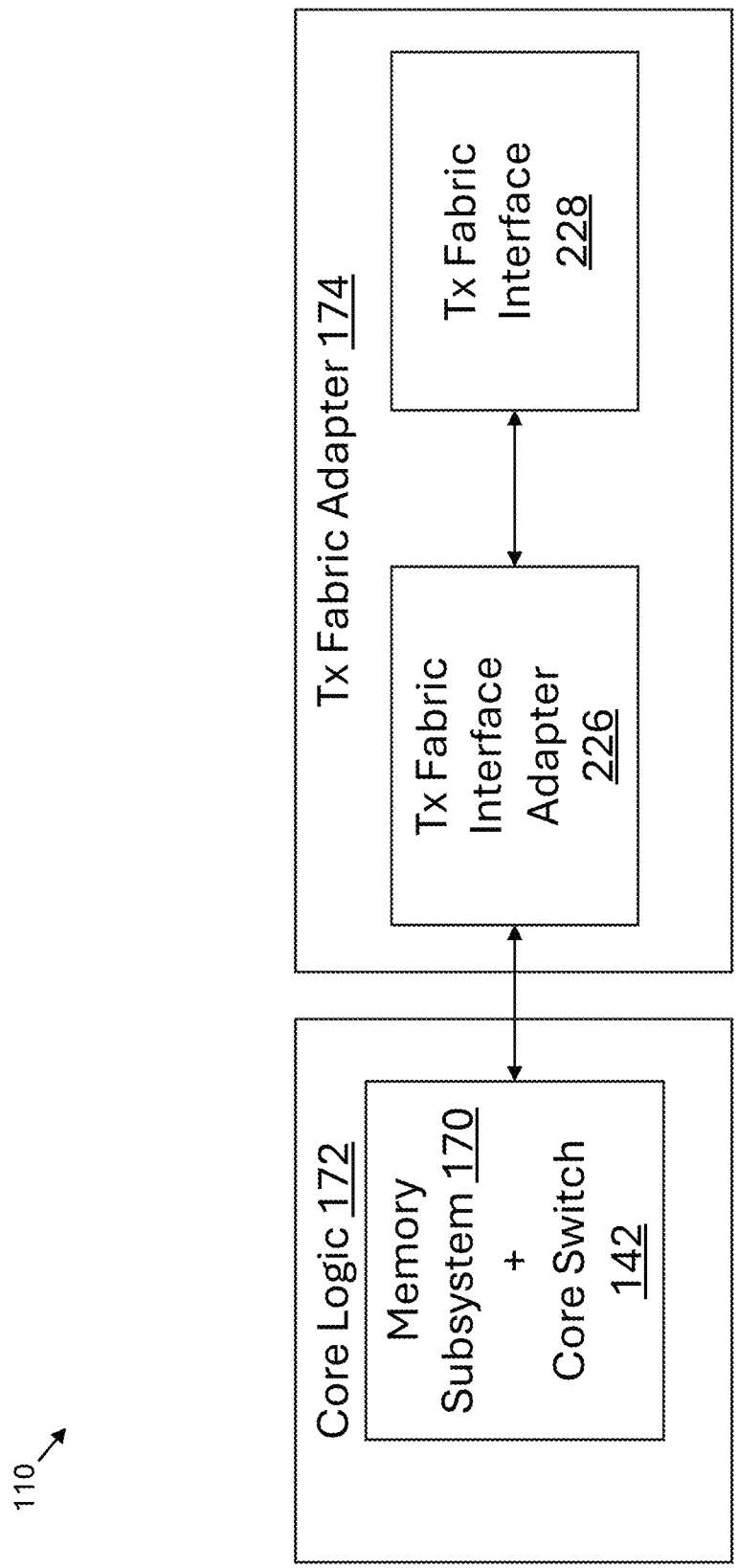
FIG. 14 depicts a block diagram of the transmit fabric adapter communicatively coupled to the core logic, in accordance with one embodiment of the invention.

FIG. 14 depicts a block diagram 110 of the transmit fabric adapter 174 (which may include the transmit fabric interface adapter 226 and the transmit fabric interface 228) communicatively coupled to the core logic 172. While not depicted in FIG. 14, the transmit fabric interface 228 may be communicatively coupled to a communication interface 130 (e.g., SerDes interface), which in turn may be communicatively coupled to a cell-based switch fabric 14.

Figure 16:
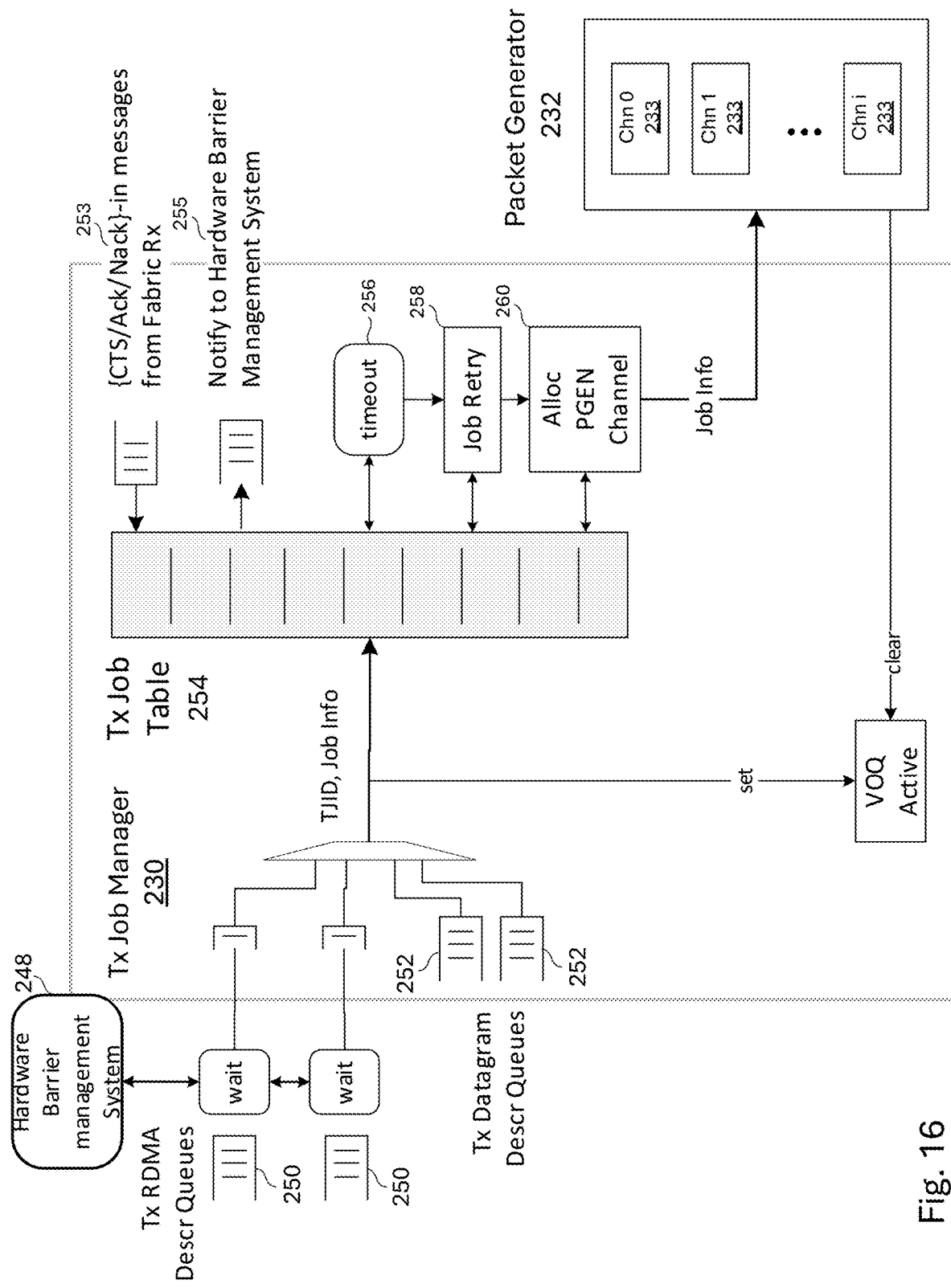
FIG. 16 depicts a schematic diagram of a transmit job manager, in accordance with one embodiment of the invention.

FIG. 15 depicts a first embodiment of the transmit fabric adapter 174. In the first embodiment, the transmit fabric interface adapter 226 may include the transmit job manager 230, the packet generator 232, packet table 234, the transmit DMA read engine 236, the packet header encapsulator 240, and the transmit cellifier 242; and the transmit fabric interface 228 may include a virtual output queue (VOQ) subsystem 244 and a fabric transmit data pipe 246. The operational flow through the first embodiment of the transmit fabric adapter 174 may be as follows:

In step 1, software may prepare RDMA Tx descriptors for each RDMA "job," which is a block of data (e.g., tensor data) to be transferred, and enqueue descriptors onto per-RDMA transmit engine descriptor queues 250 (see FIG. 16). The descriptors may include the destination VOQ number, total RDMA "job" size, as well as control information for the RDMA including transmit and receive RDMA Job IDs, and desired transfer packet size for dividing the large RDMA transfer into packets for transport over the cell-based switch fabric 14. Each RDMA job may be up to several megabytes. The transmit fabric adapter 174 may also support inter-chip packet transfers via CPU-managed "datagrams" which are a single packet of up to 16 KB. More specifically, datagrams may be unsolicited transfers, and may not use Job-ID semantics.

Each cluster 134 may have an independent job manager 230, with its own descriptor queues, for RDMA jobs in which data is sourced from that cluster's memory element 136. The job at the head of each transmit RDMA queue 250 may pass a hardware barrier wait, which ensures that any dependencies for the RDMA (on the transmit AI chip 112) have been satisfied, such that the source data has been produced and made available in the memory element 136.

Each cluster's transmit job manager 230 may also support datagram jobs, for data transmitted from the memory 136 in that cluster 134, in separate descriptor queues from the RDMA jobs. These datagram jobs may not need to wait for barriers to be cleared, since the CPU can resolve any dependencies before enqueueing each datagram descriptor to its descriptor queue.

In step 2, each RDMA job may wait for receipt of a ClearToSend (CTS) message from the receive AI chip 112. Once the CTS has been received, the RDMA job may then be dynamically assigned to a channel 233 (see FIG. 16) in the transmit packet generator (PGEN) 232, which divides the DMA transfers into packets of up to 16 KB for transmission. For datagram jobs, only a single packet may be generated. Each channel 233 may process one RDMA or datagram job. In one embodiment, 64 channels may be employed to support concurrent packet generation for 64 jobs per PGEN 232. In one embodiment, one PGEN 232 may be instantiated per source cluster 134.

The PGEN 232 may perform round-robin packet generation among the channels 233 (jobs) on a packet-by-packet basis. The output of the PGEN 232 may include the packet metadata, including the packet base address in the source cluster memory 136, packet length, and additional information needed for communication with the receive AI chip 112.

The channels 233 may be responsive to congestion-based flow control on their respective virtual output queues (VOQs) 124a-124d. Congestion monitoring may be necessary to regulate the number of packets enqueued to the system for any one VOQ 124a-124d and in aggregate, otherwise the entire job (which may be multiple MB's) could be enqueued in a short time, causing all internal packet management resources to be utilized. The PGEN 232 therefore may maintain outstanding packet counts for each VOQ 124a-124d, which may be incremented for each generated packet (just prior to enqueueing the packet to its VOQ 124a-124d), and decremented once the packet is dequeued from the VOQ 124a-124d. When this count for a particular VOQ 124a-124d reaches or exceeds a programmable threshold, the PGEN 232 may be inhibited from generating additional packets for that VOQ 124a-124d until the count decreases below the threshold. Each VOQ 124a-124d may also be assigned to a VOQ group, where each VOQ group maintains the aggregate outstanding packet counts for all VOQs 124a-124d that are members of the VOQ group, and may inhibit generating additional packets for all VOQs 124a-124d in the VOQ group when the aggregate count reaches a programmable threshold. The VOQ groups may maintain counts independently for packets sourced from each cluster, with per-cluster, per-VOQ group programmable thresholds. Similarly, the PGEN 232 may maintain an aggregate outstanding packet count for all packets sourced from each cluster 134, and inhibit generating additional packets when that count reaches a programmable threshold.

In step 3, a packet table entry may be created for each generated packet. The packet table (containing a plurality of packet table entries) may store the metadata for each packet outstanding in a VOQ 124a-124d in the fabric queueing system. In a multi-cluster system, the packet table may be shared by all clusters' RDMAs. The packet table may provide at least enough entries to represent the bandwidth-delay product of the fabric bandwidth*fabric round-trip-time, divided by the desired average packet size, in which the bandwidth-delay product represents the minimum number of packets which would be enqueued in the VOQ subsystem 244 in a steady-state at full throughput. As should be apparent VOQ subsystem 244 may include a plurality of virtual output queues 124a-124d, which were previously depicted in FIG. 2B.

Each packet table entry may include the source address of the data in the memory element 136 (e.g., AMEM), packet sequence number within the full RDMA job, and Job-ID fields for communicating with the remote AI chip 112. In one implementation, the packet table may include the packet length as well. The index of the packet table entry created may be returned as a "Packet ID" to the packet generator 232.

In step 4, the packet generator 232 may then issue an enqueue command to the VOQ subsystem 244 in the fabric interface 228. The enqueue command may include the PacketID, packet length, and target VOQ number. The VOQ subsystem 244 may maintain a queue of packet objects, including PacketID and packet length, for each VOQ 124a-124d. There may be thousands of VOQs 124a-124d, allowing any source AI chip 112 to reach any AI accelerator IC destination chip 112, with multiple class-of-service queues for each.

In step 5, the fabric interface 228 may then negotiate to transfer the packet to the receive AI chip 112 (i.e., Rx chip). In one embodiment, this negotiation may include issuing a request message for each packet (or group of packets) to the Rx chip 112 addressed by the VOQ 124a-124d. This request message may be relayed using the cell-based switch fabric 14 itself, such as by embedding the request into a cell relayed over the fabric 14. Subsequently, the Rx chip 112 may return a grant message (also relayed across the cell-based switch fabric 14) indicating that the transmit AI chip 112 (i.e., Tx chip) may send a packet. In another embodiment, the grant message may indicate a total number of bytes that may be sent by the Tx chip 112, which may allow for one or more packets to be transmitted in response to the grant message.

In step 6, the PacketID may be dequeued from the VOQ 124a-124d and a dequeue message may be signaled from the fabric interface 228 (to the packet table) by a fabric transmit data pipe 246. There may be N fabric transmit pipes 246, each responsible for transmitting a portion of the fabric bandwidth, which may be 100GBytes/sec per fabric transmit data pipe 246. In one embodiment, each fabric transmit data pipe 246 may be associated with the source cluster 134 from which the packet was enqueued to the VOQ 124a-124d. In another embodiment, the fabric transmit data pipes 246 may be assigned dynamically in a load-balanced manner such that there is no fixed affiliation between a fabric transmit data pipe 246 and a source cluster 134—packets from any cluster 134 can be processed by any fabric transmit data pipe 246.

The PacketID (from the dequeue message) may be used to index the packet table to retrieve the packet metadata, including the starting memory address and the source cluster ID. In one embodiment, the packet length may be provided with the dequeue message from the fabric interface 228. In another implementation, the packet length may not be provided with the dequeue message, and the packet length may instead be included in the packet table entry. The packet metadata (including packet length) may be relayed to a transmit DMA read engine 236 associated with the fabric transmit pipe 246. The packet table entry may be deallocated and made available for use by another packet at this point.

In step 7, a transmit DMA read operation may be initiated for each packet, to fetch the packet data from the source cluster memory element 136. In one embodiment, one transmit DMA read engine 236 may be assigned to each cluster 134, which can receive packet-transfer requests for any fabric transmit data pipe 246 from the memory 136 in that cluster 134. In another embodiment, there may be one transmit DMA read engine 236 for each fabric transmit data pipe 246, which can generate packet transfer requests targeted to any cluster's memory element 136.

In either implementation, the transmit DMA read engine 236 may generate the memory read operations for each flit (i.e., "flow control digit" or "flow control unit") in the packet. As known in the art, a flit may refer to a unit of data transfer between functional elements of an IC chip 112, which may be 128 bytes. For the sake of clarity, the terms "flit" and "word" generally refer to the same unit of data, although by conventional naming convention, a word typically refers to a memory access unit of data, whereas a flit typically refers to a unit of data that is being transferred.

The data for each packet may be retrieved from a contiguous region of the memory element 136. In one embodiment, the memory subsystem 170 and core switch 142 may return data to transmit buffer 238 in the flit-by-flit order in which data read operations were generated by transmit DMA read engine 236. In such embodiment, there is no need to reorder the flits. In another embodiment, the data may be returned in arbitrary order from the memory element 136. In such embodiment, the transmit DMA read engine 236 may also reserve space for the packet data in a transmit buffer 238. Each flit read request may include the memory address and a transmit buffer index number, which corresponds to a reserved location in the transmit buffer 238 for the flit. The transmit buffer index numbers may be assigned sequentially, based on the current transmit buffer write pointer which is maintained by the transmit DMA read engine 236. This write pointer may be initialized to zero, and incremented (modulo the transmit buffer size) after each flit read request. The transmit DMA read for a packet may not be started unless the transmit buffer 238 has enough space to receive the entire packet. This space may correspond to the difference between the transmit buffer write pointer and the transmit buffer read pointer (maintained by the control logic of the transmit buffer 238, described below in step 9).

In step 8, the memory subsystem 170 may perform the memory reads, and may return the data to the transmit fabric adapter 174 over multiple crossbar switches of the core switch 142 (or more generally, the data interconnect), selecting crossbar switches in a load-balanced manner. Flits for a particular packet may return from the crossbar switches out of order, and flits from multiple packets may return interleaved, due to independent arbitration of the resources in each crossbar switch.

In step 9, the transmit buffer 238 may capture and buffer the flits of one or more packets for each fabric transmit pipe 246. In the above-described embodiment in which the data is retrieved in the flit-by-flit order, the transmit DMA read does not need to allocate a full packet's worth of buffer space before commencing the data read, and the transmit buffer 238 would only require a minimum capacity of one memory round-trip-time (RTT)*memory access bandwidth, rather than that much plus one maximum size packet, for full efficiency. In the above-described embodiment in which the data is retrieved in the arbitrary order, each flit of data returned from the memory element 136, through the core switch 142 (or more generally, the data interconnect 142), may be marked with a transmit buffer index number which directs the flit to be stored in the correct location in the transmit buffer 238. The transmit buffer 238 may have capacity for at least the bandwidth-delay product of the memory RTT*memory access bandwidth, plus one maximum size packet. For example, if the memory RTT is 100 clock cycles, the memory access bandwidth is one flit per cycle, and the maximum packet size is 128 flits, then the minimum transmit buffer capacity would be 228 flits for full efficiency. The control logic of the transmit buffer 238 may keep track of the transmit buffer read pointer, which is the index of the next flit to be retrieved from the transmit buffer 238 in order to restore the proper ordering of the flits of each packet. The transmit buffer read pointer may be initialized to zero, and incremented (modulo the transmit buffer size) as each properly-ordered flit is removed from the transmit buffer 238.

In step 10, once the data is received and properly ordered, a packet header may be created and prepended to each packet's data by the packet header encapsulation module 240. In one embodiment, the packet header may be 16-bytes. This header may provide information needed by the destination AI acceleration IC chip 112 in order to process the packet, including the receive and transmit RDMA job identifiers that identify the specific RDMA transfer, the packet sequence number within the job (to help detect dropped packets), and a last-packet-in-job flag.

In step 11, the post-encapsulation packet data may then be "cellified," or segmented into small blocks of bytes compatible with the transmit fabric interface 228 for transmission. In one embodiment, each block may include 256 or fewer bytes. The segmentation of the post-encapsulation packet data may be performed by a transmit cellifier 242. The packet data may be received by the transmit cellifier 242 over a parallel bus of Np bytes per cycle, and emitted cell data may be transmitted over a parallel bus of Nc bytes per cycle to the transmit fabric interface 228, in which Nc may not equal Np. The larger of (Nc, Np) may not be an integer multiple of the smaller of (Nc, Np). The transmit cellifier 242 may convert the data bus width from Np to Nc.

In step 12, the fabric transmit pipe 246 may encapsulate the data for each cell for transmission over the cell-based switch fabric 14, and transmit the cells over a number of SerDes links. SerDes links may support bit-rates of 112 Gbits/see or more. In a typical embodiment, there are fabric connections from each fabric transmit pipe 246 to multiple fabric switching chips 18, with one or more SerDes links per connection. In a typical embodiment, the cells may be distributed across the links in a load-balanced manner, with one cell sent on the first link, the next cell on a second link, and so on, by each transmit pipe 246.

The transmit fabric interface adapter 226 may include the following modules, described in the following sub-sections:
Transmit Job Manager
Transmit Job Table
Transmit Packet Generator
Transmit Packet Table
Transmit DMA Read Engine
Transmit Packet Header Encapsulator
Transmit Cellifier Transmit Job Manager FIG. 16 depicts a schematic diagram of a transmit job manager 230. There may be one transmit job manager 230 instance per inference engine cluster 134, for RDMA and datagram data sourced from that cluster's memory element 136.

Transmit jobs may be enqueued to descriptor queues 250. In one embodiment, there may be a plurality of RDMA descriptor queues 250 and a plurality of datagram descriptor queues 252. The head entries of the respective RDMA descriptor queues 250 may undergo barrier-waits. The entries may then be moved into shallow FIFOs at the entrance to the transmit job manager 230. The barriers can be used to ensure that the RDMA-source data is ready to be sent, and may also ensure that the transmit job table entry is not currently in use.

The first step in job service may be to select a job from one of the descriptor queues, 250, 252. The selection may use a simple round-robin arbitration. The next step in job service may be to test and set a "VOQ Active" lock on the destination VOQ 124a-124d. This lock may be set as the job is accepted from a descriptor queue 250, 252, and released once the job is done generating (i.e., enqueueing) all of its packets to its destination VOQ 124a-124d. If an incoming job's VOQ 124a-124d is already active (for a prior job), the incoming job may be stalled at the head of the descriptor queue.

The VOQ-Active lock may be used to ensure that sequential RDMA jobs to the same destination are transmitted in order, which may be needed for efficiency. Specifically, a large RDMA transfer may be divided up into multiple smaller RDMA jobs, and the VOQ-Active lock may ensure that the later jobs do not compete with earlier jobs for transfer bandwidth. Similarly, sequential datagrams to the same VOQ 124a-124d may be forced to stay in order using this VOQ-Active lock mechanism.

Once an RDMA job has acquired the VOQ-Active lock, the RDMA job may be entered into the job table 254 using the Tx Job ID as the job table index. The job state is set to wait for a Clear-to-Send (CTS) message 253 to arrive from the Rx chip 112. In a typical case, the CTS message 253 will already have been received before the transmit job was entered, and the job table entries allow for the CTS message 253 to be received before or after a transmit job is established.

A CTS wait timer may also be started for the job on the Tx chip 112. The CTS wait timeout should allow for sufficient time for the receive fabric egress 196 (i.e., the Rx job manager 292 on the Rx chip 112) to have its own timeout waiting for expected data to arrive, so that the receiver fabric egress 196 may re-send the CTS message 253 if no data has been seen from the transmit. If the CTS wait timer expires without a received CTS message 253, this indicates a likely failure of the receive partner, and the job may be placed in a fail-state (described below).

Once the CTS message 253 is received (or in cases where the CTS message 253 has already been received), the job may then allocate a packet generator (PGEN) channel 233 (e.g., channel 0, . . . channel i). Multiple jobs may be pending to allocate a PGEN channel 233, so the job manager 230 may use a simple round-robin policy to select the next job (from the job table 254) for PGEN allocation.

The job may then enter a state waiting for all packets to be transmitted. During this phase, the packet generator 232 may divide the job into packets, enqueue all those packets to the fabric queueing system, and all of the packets will subsequently be dequeued for transmission. A Tx-wait timer may be set during this state. If the Tx-wait timer expires, this may mean that the job's VOQ 124a-124d was not making forward progress, which is a possibility in some cell-fabric failure cases. In such case, the VOQ 124a-124d may need to be flushed by the transmit fabric interface 174, and the job placed in the fail-state. Once all packets have been transmitted, the job may enter an Ack-Wait state waiting for an ACK or NACK message 253 from the receive chip 112. The job may also start another timer to wait for this ACK/NACK handshake.

A successful completion may trigger the job to advertise its notify list 255 to the hardware barrier management system 248. Since multiple jobs may complete in quick succession, there may be multiple jobs which concurrently need to send notifications. As such, a process may be employed to select jobs (from the job table 254) on a round-robin basis.

In the case of an Ack-wait timeout or received NACK message 253, the job may be placed into a retry state. If a retry has already failed (or is disabled), the job may be placed into the failed state and flushed as described below. The retry may cause the job to (re) allocate a channel 233 in the PGEN 232, which may cause the entire job to be retransmitted. Retry jobs may have higher priority than new jobs from the same descriptor queue 250, 252. Once the retry-job has been entered in PGEN 232, the packet-generation timer may be started again, and the process may repeat once. Retry jobs may not need to wait for a CTS message 253 to be received, since that condition has already been satisfied.

A job-fail state is described as follows. In the case of a CTS-wait timeout 256 or repeated NACK or ACK-timeouts, the job can be determined to have failed, and may be flushed out to allow the AI chip 112 to make forward progress. The job may be marked as done (so it will signal its completion barrier-notifications) and the job identifier and other relevant information may be captured in a register and an interrupt may be signaled to the CPU.

The operation of the transmit job manager 230 for datagram service is described as follows. For datagrams, the job may consist of a single packet without reliable-transport. A datagram job may not use a job table entry. The transmit job manager 230 may simply forward the "job" from the descriptor queue 252 to the packet generator 232 and is (nearly) done. When the packet data is subsequently read from the memory element 136 of a cluster 134 and forwarded to the cell-based switch fabric 14, the TxQ head-pointer may be incremented (by hardware), effectively freeing the buffers used by that descriptor. The TxQ ring buffer mechanism was previously described above with respect to FIG. 12.

Regarding TxQ completion ordering, the datagram transmit jobs sent to different VOQs 124a-124d can be completed out of order, but the TxQ mechanism may advance the queue head-pointers in FIFO order to allow software to re-use the associated packet buffers. The transmit job manager 230 may provide a reorder mechanism for this, which can keep track of, for example, up to 64 outstanding datagram packets (per TxQ) from the time they are entered into the PGEN 232 until the transmit buffer 238 has received the data from the memory element 136. As each datagram job is admitted, the transmit job manager 230 may assign the next available transmitter queue reorder identifier (TxQ Reorder ID) from the pool of 64 (per datagram TxQ) and relay this to the PGEN 232 which may record the TxQ Reorder ID (and also the associated TxQ number) in the packet table entry, which may then be enqueued to the VOQ 124a-124d.

When the packet is subsequently dequeued for transmission, the transmit queue identifier (TxQ ID) and TxQ Reorder ID may be retrieved from the packet table 234 along with the memory element source address, etc. Once each transmit datagram packet has been completely fetched from memory element 136 into the transmit buffer 238, the TxQ ID and TxQ reorder ID may be sent back to the transmit job manager 230, which sets the "done" bit for that reorder context.

When the head entry in the reorder structure is "done" (per TxQ), the transmit job manager 230 can signal the TxQ to advance the associated (software-visible) head-pointer. This effectively signals to software that the TxQ entry, and its associated memory element buffer resources, are free to be re-used.

Transmit Job Table

There may be one transmit job table 254 (Tx Job Table) associated with each (source) inference engine cluster 134. Each Tx Job Table 254 may support up to 256 concurrently active RDMA jobs, and may be indexed by a transmit Job ID (Tx Job ID), which may be specified with the job descriptors set up by software. The Tx Job Table contents are shown in the table below.

| Field | Description |
| --- | --- |
| RJID | Rx Job ID to link to the remote Rx Job Table |
| Dest VOQ | Target VOQ, identifies target chip, cluster and traffic class |
| Memory element base address | Memory element base address in source cluster. |
| Total Size | RDMA transfer length. |
| Packet Size | Number of words per packet transmitted over the fabric. All transmitted packets, except possibly the last packet, will use this size. |
| Notify list | Barrier completion-notification list (copied from job descriptor) |
| The following fields define the overall state of the job | |
| Tx Vld | Tx job is valid for this job table entry |
| CTS received | Rx job is valid (CTS has been received) |
| State | A state that is part of an FSM which tracks the overall state of the job. Possible states include Idle, CTS_Wait, Packet_transmit_active, Ack_wait, Notify_pending. |
| CTS_wait/ TransmitActive/ Ack_wait timers | Hardware timeout-timer for initiating job retry or abandonment |
| Retry Count | Initialized to zero at job creation, and is incremented when a job is retried due to ACK timeout or received NACK |

Transmit Packet Generator

Figure 17:
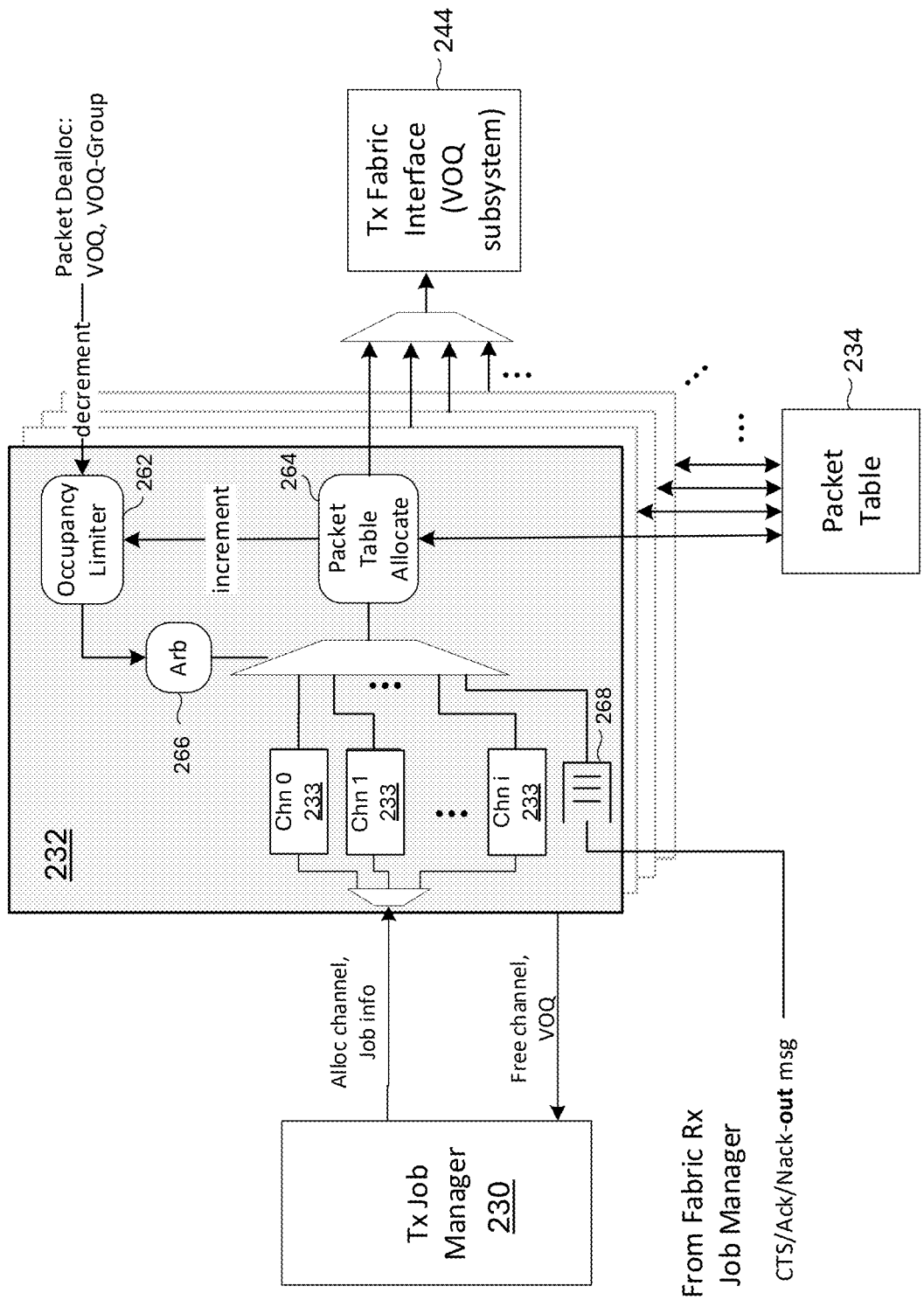
FIG. 17 depicts a schematic diagram of a transmit packet generator, in accordance with one embodiment of the invention.

FIG. 17 depicts a schematic diagram of a transmit packet generator 232. There may be one instance of a transmit packet generator 232 per inference engine cluster 134, each instance associated with the cluster's job manager 230. The transmit packet generator 232 may be channelized, or in other words, may be a packet-at-a-time generator, where each channel 233 generates one packet a time for all packets of one job. Channels 233 may be assigned dynamically when loaded by the transmit job manager 230.

The transmit packet generator 232 may generate packets based on the job's configured packet size and total size to be transferred. Sizes may be in units of "words," in which a word refers to the access width of each of the memory elements 136. The transmit packet generator 232 may keep track of the number of words sent so far (compared to total job size) and identify the last packet and number of words in the last packet, which may be less than the configured packet size.

The arbitration module 266 of transmit packet generator 232 may perform round-robin arbitration across channels 233 per cluster 134. A selected channel 233 may generate the next packet for that job. After a packet entry is allocated, the transmit packet generator 232 may relay the packet table entry index as the packet handle to the VOQ subsystem 244 in the transmit fabric interface 228. The arbitration module 266 may also select queue 268 to generate the next packet for a job, the queue 268 storing CTS/Ack/Nack-out messages.

The packet table allocate module 264 of the transmit packet generator 232 may relay an allocation request to the packet table 234. This request may provide the packet control information, including the page size, starting address of the data in the memory, and fields needed for eventually creating the packet header. These fields may include the packet type, which may indicate RDMA data type, datagram data type or message type (e.g., CTS message type, ACK message type or NACK message type). For creating hardware message packets (such as CTS message packets, ACK message packets or NACK message packets), the source memory address may not be meaningful and the transmit buffer 238 may be unused, but the message type may be provided directly with this allocation request. More specifically, the transmit packet generator 232 may send a "packet type" indicator as part of the packet-table allocation request. The packet type is an enumerated type with values from the set {RDMA data type, datagram data type, CTS message type, ACK message type, NACK message type}. If the packet type is one of the message types (e.g., CTS message type, ACK message type or NACK message type), the downstream Tx Fabric interface adapter blocks (starting from packet table 234) can infer that the address is not meaningful, and there is no data to fetch from the memory element 136.

The packet table allocate module 264 then waits for the response from the packet table 234, which provides the allocated packet table entry index to the packet table allocate module 264.

The transmit packet generator 232 may include a transmit packet occupancy limiter 262 to keep track of the outstanding packets per VOQ 124a-124d to avoid any one congested fabric-facing VOQ 124a-124d from growing without bound. More specifically, the transmit packet occupancy limiter 262 may limit the outstanding packets per VOQ 124a-124d to avoid any one congested fabric-facing VOQ 124a-124d from growing without bound. The outstanding packet count may be incremented/decremented as each packet is generated or retired. The accelerator IC chip 112 may not allow (nor require) extremely deep fabric-facing VOQs 124a-124d, and in case of congestion, one job could consume all of the packet entries available if there were no occupancy limits.

The transmit packet occupancy limiter 262 may be closely aligned with the transmit packet generator 232. When an occupancy limit is reached, this inhibits further packet generation for the VOQ 124a-124d, even if the transmit packet generator 232 is in the middle of a large job for that VOQ 124a-124d.

Occupancy may be tracked (and limited) at three levels. At a first level, each VOQ 124a-124d may be configured with one of a small number of occupancy-management profiles which specify the queue limit. There may be eight total VOQ occupancy profiles, which effectively allows for eight different VOQ rates. The outstanding packet count required for a VOQ 124a-124d may be roughly equal to the (fabric round trip time)*(VOQ desired bandwidth)/(average packet size). Each VOQ 124a-124d also may maintain its outstanding packet count. When the count reaches the profile limit, the packet generator 232 may be inhibited from generating additional packets for that VOQ 124a-124d. This count may be maintained separately for each source cluster 134 (i.e., per instance of packet generator 232).

At a second level, each VOQ 124a-124d may also be assigned to one of several occupancy-tracking groups, where each group may represent a class of service. There may be four occupancy-tracking groups per source-cluster. When the aggregate packet count for a group exceeds its limit, all VOQs 124a-124d which are members of that group may be inhibited from generating additional packets. The grouping scheme may allow for the per-VOQ limits to oversubscribe the total packet resources, by limiting the aggregate packet resources used by lower-priority queues to preserve some packets for higher priority queues. Therefore, in the case of congestion, the higher priority queues may still make forward progress. The occupancy-tracking groups may be managed independently for each source cluster 134.

At a third level, the total packet occupancy count per source cluster 134 may be limited to a configurable maximum value. This condition ensures that each cluster's packet utilization is limited to a configurable fair share of the total packets.

Transmit Packet Table

The transmit packet table 234 may be a free-pool based structure for tracking outstanding packets in the VOQ subsystem 244. In one embodiment, the transmit packet table 234 may be sized to support enough packets in the VOQs 124a-124d to support the occupancy limits needed for all active VOQs 124a-124d at the same time. The minimum size of the packet table 234 may be roughly calculated as the (fabric round trip time)*(fabric bandwidth)/(average packet size). The minimum size is that multiplied by a scale-up factor to support multiple congested queues pending for each receiver AI chip 112 and cluster 134 to obtain the actual size of the packet table 234. For example, if the fabric round trip time were 10 µs, the fabric bandwidth were 400 GB/s, the average packet size were 16 kBytes, and the scale-up factor were 4, the transmit packet table 234 may have approximately 1000 total packets.

Entries of the transmit packet table 234 may include all information needed to construct the packet, including:
 a. The memory element source address and cluster
 b. Packet size in words of the memory element 136
 c. Tx Job ID, Rx Job ID, last-packet fields to be added to packet header
 d. Datagram RxQ index to be added to packet header
 e. TxQ reorder pointer for datagrams (to mark the descriptor as complete when the packet is eventually transmitted)
 f. VOQ number for occupancy tracking (optional)
 g. VOQ-group for occupancy tracking The transmit packet table 234 may allocate entries on demand from the packet generator 232, and return the allocated packet index. The transmit packet table 234 may deallocate entries when a dequeue message is signaled from the VOQ subsystem 244 (in the transmit fabric interface 228). The transmit packet table 234 may then signal the transmit DMA read engine 236 with the packet information.

Transmit DMA Read Engine

The transmit DMA read engine 236 (see FIG. 15) may initiate a DMA read operation for each packet, to fetch the packet data from the source cluster memory element 136. In one embodiment, one transmit DMA read engine 236 may be assigned for each cluster 134, which can receive packet-transfer requests for any fabric transmit data pipe 246 from the memory 136 in that cluster 134. In another embodiment, there may be one transmit DMA read engine 236 for each fabric transmit data pipe 246, which can generate packet transfer requests targeted to any cluster's memory element 136. In either implementation, the transmit DMA read engine 236 may generate the memory read operations for each flit (e.g., a flit being 128 bytes of data) in the packet. The data for each packet may be retrieved from a contiguous region of the memory element 136. The transmit DMA read engine 236 may also reserve space for the packet data in the transmit buffer 238. Each flit read request may include the memory address and a transmit buffer index number, which corresponds to a reserved location in the transmit buffer 238 for the flit. The transmit buffer index numbers may be assigned sequentially, based on the current transmit buffer write pointer which is maintained by the transmit DMA read engine 236. This write pointer may be initialized to zero, and incremented (modulo the transmit buffer size) after each flit read request. The transmit DMA read for a packet may not be started unless the transmit buffer 238 has enough space to receive the entire packet. This space may correspond to the difference between the transmit buffer write pointer and the transmit buffer read pointer.

Transmit Packet Header Encapsulator

One transmit packet header encapsulator 240 may be instantiated per 100 GB/s pipe 246. The transmit packet header encapsulator 240 may perform packet-header encapsulation. The packet header may be 16-Bytes, prepended to each packet. The transmit packet header encapsulator 240 may receive metadata to build the packet header from the transmit DMA read engine 236, in packet-FIFO order. The transmit packet header encapsulator 240 may construct the packet header, including a CRC32 string as an integrity check for the eventual receiver. The transmit packet header encapsulator 240 may receive flits from the transmit buffer 238 in the same order as the headers, and insert the constructed packet header at the start of each packet, and forward the data to the transmit cellifier 242. This action may require a simple residue buffer to keep the excess 16-Byte from each flit. At the "End of Packet," the transmit packet header encapsulator 240 can emit one final flit with the remaining (excess) bytes. For hardware-generated RDMA messages, there may be no data from the memory element 136, only the header.

Transmit Cellifier

One transmit cellifier 242 may be instantiated per 100 GB/s pipe. The transmit cellifier 242 may receive flits at up to Np bytes per cycle from the packet header encapsulator 240, to form cells of size C bytes, and then transfer the cells at Nc bytes per cycle for S transfer cycles per cell, where S*Nc=C, to conform to the cell transmission requirements of the transmit fabric interface 228. If the number of bytes in the packet (including prepended packet header) is not an integer multiple of C, the transmit cellifier 242 may add padding bytes so that the total packet size is a multiple of C. In one embodiment, the transmit cellifier 242 may pad up the packet to an integral multiple of Nc bytes.

In one embodiment, the transmit fabric interface 228 may accept variable sized cells, with a minimum of Cmin and maximum of Cmax bytes per cell. More specifically, the transmit cellifier 242 may transmit Cmax byte cells for each cell of a packet, up until the end of the packet, in which the final cell may have fewer than Cmax bytes. However, if the final cell were to have fewer than Cmin bytes, the transmit cellifier 242 may transmit Cmax bytes for all but the final two cells of a packet, and divide the remaining bytes into the last two cells with at least Cmin bytes and no more than Cmax bytes. In this embodiment with variable sized cells, the transmit cellifier 242 may send data to the transmit fabric interface 228 at Nc bytes per cycle for up to S transfer cycles per cell, where S*Nc=Cmax, and pad the packet up to an integral multiple of Nc bytes.

Figure 18:
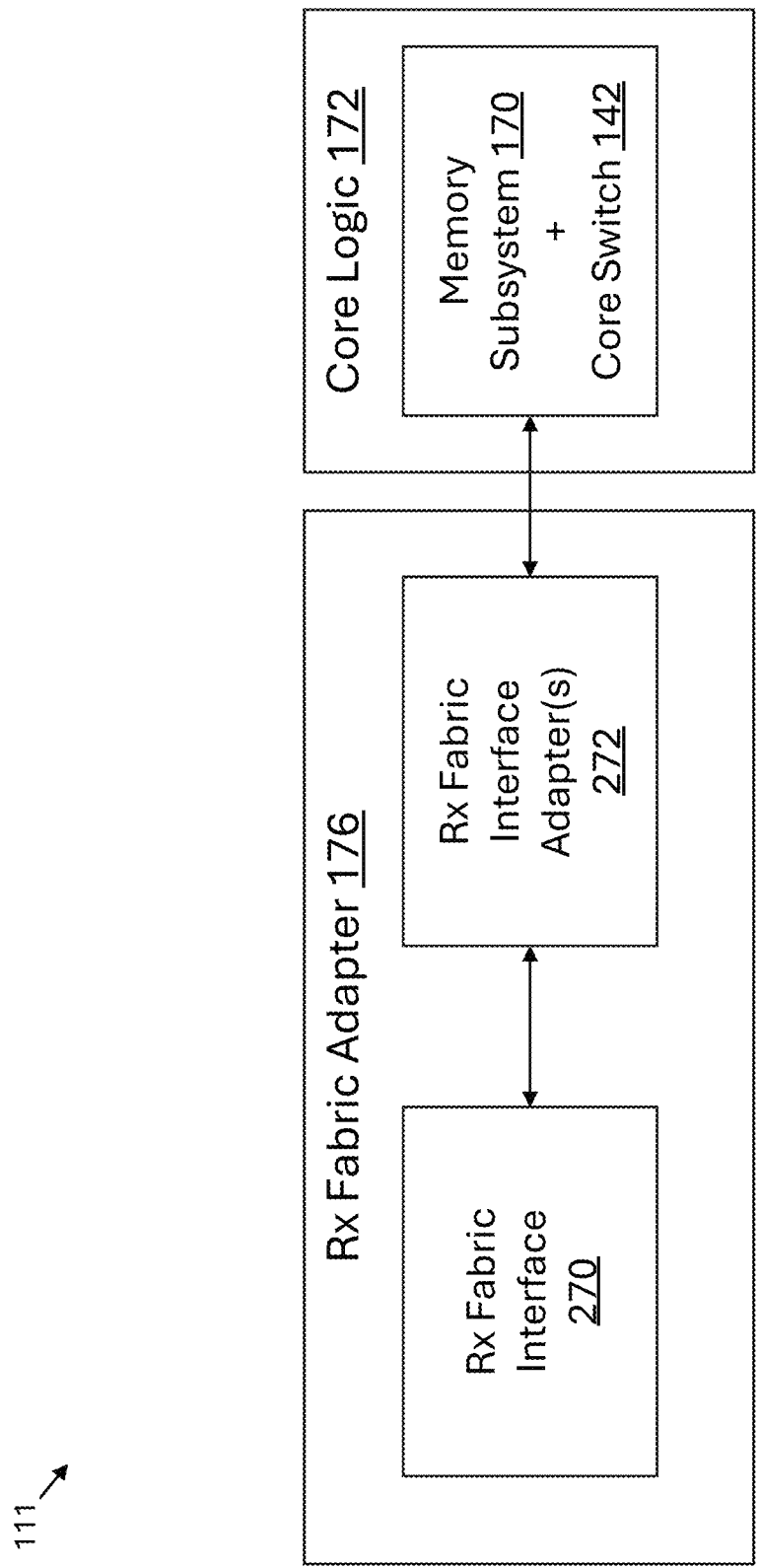
FIG. 18 depicts a block diagram of the receive fabric adapter communicatively coupled to the core logic, in accordance with one embodiment of the invention.

FIG. 18 depicts a block diagram 111 of the receive fabric adapter 176 (which may include the receive fabric interface 270, the receive fabric interface adapter 272) communicatively coupled to the core logic 172.

Figure 19:
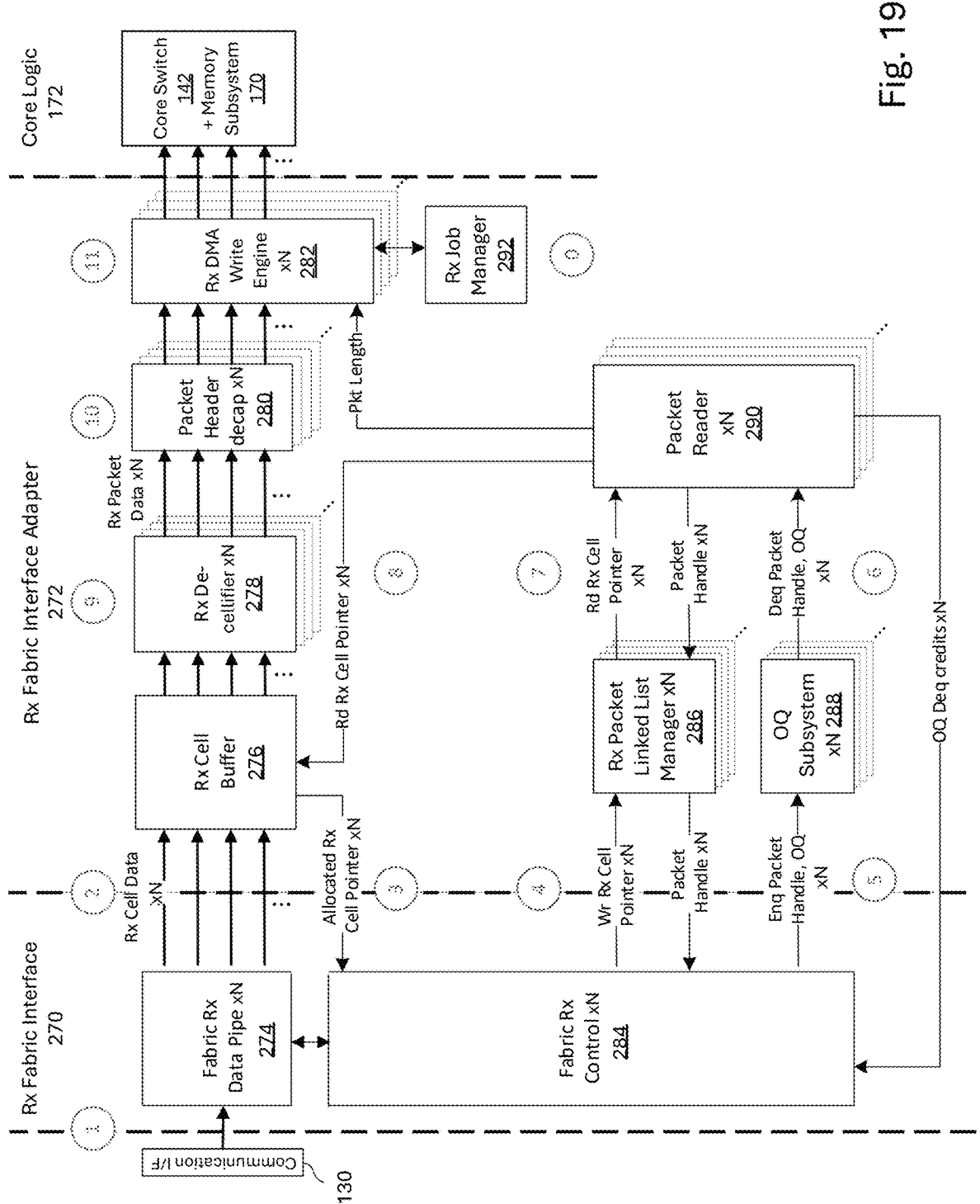
FIG. 19 depicts a block diagram of a first embodiment of the receive fabric adapter, in accordance with one embodiment of the invention.

FIG. 19 depicts a first embodiment of the receive fabric adapter 176. In the first embodiment, the receive fabric interface 270 may include the fabric receive data pipe 274 and fabric receive control 284; the receive fabric interface adapter 272 may include the receive cell buffer 276, receive decellifier 278, packet header decapsulator 280, receive DMA write engine 282, receive packet linked list manager 286, output queue (OQ) subsystem 288 and packet reader 290. The operational flow through the first embodiment of the receive fabric adapter 176 may be as follows:

In step 0, software may prepare RDMA receive descriptors for each "job," which is a block of data to be transferred, and enqueue descriptors onto per-cluster RDMA receive engine descriptor queues. The descriptors may include the total RDMA job size, receive memory buffer address to receive the data, as well as control information for the RDMA including transmit and receive RDMA job IDs. Each RDMA job may be up to several megabytes.

Each cluster 134 may have an independent receive job manager 292, with its own descriptor queues, for RDMA jobs in which data is targeted to that cluster's memory 136. The job at the head of each Rx RDMA descriptor queue may pass a hardware barrier wait, which ensures that any dependencies for the RDMA (on the receive chip 112) have been satisfied, such that the receive buffer memory has been allocated and is ready to receive data.

Once the RDMA job barriers are cleared, a receive job table entry may be created for the indicated Rx Job-ID and destination cluster 134. The job table entry may record the state of the RDMA transfer job. When the job table entry is initiated, this also may trigger hardware to send a Clear-ToSend message 303 (see FIG. 20) to the source AI chip 112 (i.e., source chip) to enable the RDMA transfer.

The receive fabric adapter 176 may also support inter-chip packet transfer via CPU-managed "datagrams" which are a single packet of up to 16 KB. More specifically, datagrams may be unsolicited transfers, and do not use the Job-IDs.

Each cluster's receive job manager 292 may also support datagrams (to be received at that cluster's memory 134) in separate descriptor queues from the RDMA jobs. The receipt of these datagrams do not need to wait for barriers to be cleared, since the CPU can resolve any dependencies before enqueueing each datagram descriptor to its descriptor queue 300 (see FIG. 20).

In step 1, the source transmit AI chip 112 (Tx chip) may begin transmitting cellified data over the cell-based switch fabric 14. In one embodiment, the transmit chip's fabric interface 228 may implement a handshaking protocol with the fabric interface 270 of the receive AI chip 112 (Rx chip). In this protocol, the Tx chip 112 may send a request to the Rx chip 112, indicating the length of the packet it wishes to transmit, and the desired destination output queue 128*a*-128*d* (and cluster 134) on the Rx chip 112. The Rx chip 112 may send a grant back to the Tx chip 112 when there is available buffer space and according to a scheduling policy, which enables the Tx chip 112 to then send the packet. The packet may be cellified by the Tx chip 112 and transmitted over multiple communication links to the cell-based switch fabric 14.

In one embodiment, there be may multiple communication links (e.g., SerDes links) on the Rx chip 112 connecting to cell-fabric switch chips 18, and cells may be received by the receive fabric interface 270 over multiple links. Each cell may be received in its entirety on one link, but multiple cells may be distributed over multiple links, and may arrive out of order at the Rx chip 112.

In one embodiment, the SerDes links may be divided into four groups, with each group supporting approximately 100GBytes/sec of fabric packet throughput. Each group may be processed by an associated receive data pipe 274 in the receive fabric interface 270. The cells for any packet may arrive on any SerDes link, hence any group (and associated receive data pipe 274), regardless of the targeted cluster, and as noted above, the cells may arrive out of order within or across the pipes 274.

In step 2, each receive data pipe 274 may write the received data cells into a receive cell buffer 276, which buffers the cells until they are properly re-ordered back into packets. This buffer 276 may also be used to provide credits for the fabric handshaking protocols, which may issue a fabric grant message only when it has sufficient capacity to receive all granted cells in the receive cell buffer memory 276. In one embodiment, this buffer 276 may have capacity for at least the (bandwidth*elay) product of the cell based switch fabric 14, plus the maximum tolerated mis-ordering of cells which may be introduced by the cell based switch fabric 14. This capacity ensures that the fabric request-to-grant handshaking protocols can maintain the full fabric (SerDes) link throughput. For each received cell, the receive cell buffer 276 may allocate a cell-buffer memory location from a pool of available locations, and write the cell data to that location.

In step 3, the receive cell buffer 276 may return the allocated "cell pointer" to the receive fabric interface 270. Control logic 284 in the receive fabric interface 270 can then properly re-order the cells for each received packet. This reordering may be performed using sequence numbers attached to each cell.

In step 4, after the cells are reordered, the cell-pointers may be sent from the receive fabric interface 270 to a packet linked list manager (PLLM) 286, which assembles a linked list of the cell-pointers for each received packet, and stores the linked lists into a memory structure. There may be one PLLM 286 per receive cluster 134, responsible for linking cell pointers into packets targeted to that cluster 134.

As each packet is fully assembled into a linked list, the PLLM 286 may return the "packet handle" to the receive fabric interface 270. The packet handle is a pointer into the linked list memory structure in the PLLM 286, to locate the assembled linked list of cell pointers for that packet.

In step 5, the receive fabric interface 270 may then determine the appropriate output queue (OQ) 128a-128d for the received packet, and signals the OQ number, packet length and packet handle in an OQ enqueue message to the OQ subsystem 288 in the receive fabric interface adapter 272. There may be one OQ subsystem 288 per receive cluster 134, which is responsible for the OQs 128a-128d targeting that cluster 134. As should be apparent, each of the OQ subsystems 288 may include a plurality of output queues 128a-128d, which were previously depicted in FIG. 2B.

In step 6, the OQ subsystem 288 may maintain queues of packets which have been received and reassembled into linked lists of cells, for packets targeted to one cluster 134. The entries on each OQ may store the received packet metadata including packet length and packet handle. In one embodiment, there may be four OQs 128a-128d per cluster 134.

When one or more OQs 128a-128d are non-empty, the OQ subsystem 288 may dequeue the packets, employing a scheduling policy to select a packet from one of the OQs 128a-128d. This OQ scheduling policy can be round-robin or weighted round-robin, a strict priority policy, or a combination of these policies depending on implementation. For each dequeued packet, the packet handle and packet length may be relayed to the associated packet reader 290.

In step 7, the packet reader 290 may signal the PLLM 286 to "unstitch" the cell pointers for the packet, causing a stream of individual cell pointers to be sent to the packet reader 290.

In step 8, the packet reader 290 may then issue cell-read commands to the receive cell buffer 276, along with the "unstitched" cell pointers, for all cells of a packet.

With each cell-read command, the packet reader 290 may also signal an OQ dequeue "credit" for one cell to the receive fabric interface 270. This credit signal may include the OQ number. The credit signal may allow the receive fabric interface 270 to keep track of the number of cells which have been granted for each OQ 128a-128d, until the time they are dequeued and removed from the receive cell buffer 276. The packet reader 290 may also send the packet length information to the receive DMA write engine 282 for later use.

In step 9, the receive cell buffer 276 may read the requested cells and forward the cell data to a receive decellifier 278. The cell pointer may also be returned to a free-pool for later re-allocation. There may be one decellifier 278 per cluster 134. The decellifier 278 may convert the stream of received cells into a contiguous byte stream. In one embodiment, the cells may be variable sized and the decellifier 278 may append only the valid bytes to the outgoing receive packet data stream. The cell data sent to the decellifier 278 may arrive over a parallel bus of Nc bytes per cycle, in which the cell size is an integer multiple of Nc. The packet data emitted from the decellifier 278 may be transmitted over a parallel bus of Np bytes per cycle, where Nc may not equal Np. The larger of (Nc, Np) may not be an integer multiple of the smaller of (Nc, Np). The decellifier 278 may convert the data bus width from Nc to Np.

In step 10, after the decellifier block 278, the packet header decapsulation block 280 may extract the packet header which was inserted on the transmit side. This packet header may be 16 bytes, prepended to the packet data, and include the receive and transmit RDMA Job IDs which identify the specific RDMA transfer, the packet sequence number within the job (to help detect dropped packets), and a last-packet-in-job flag. The packet header may also include the packet type in order to indicate whether the packet contains RDMA data, datagram data, or a hardware message (e.g., CTS, ACK or NACK). For datagrams, the packet header may include the RxQ ID.

The packet header information may be sent to the receive DMA write engine 282. The packet data (with header removed) may also be transmitted to the receive DMA write engine 282 on a separate interface. There may be one decellifier block 278 per cluster 134.

In step 11, the receive DMA write engine 282 may send the receive RDMA Job ID, packet sequence number and packet length (received from the packet reader) to the receive job manager 292, to index the RDMA job tables to validate the received packet. The receive job manager 292 may keep track of the state of each RDMA job, including the total number of received bytes, and next expected packet sequence number. A packet may be discarded if there is a skip (or gap) in the received packet sequence number, or any mismatch between the packet header and expected values based on the current job state.

The receive job manager 292 may calculate the base address in memory 136 to which the packet should be written, based on the RDMA job's starting buffer address in memory 136 and the total bytes received so far for this job.

The receive job manager 292 may also update the job state in the job table to record the next expected sequence number and total byte count received. The receive job manager 292 may return the packet base address to the receive DMA write engine 282, with an indication of whether the packet should be accepted (written to memory) or discarded.

If accepted, the receive DMA write engine 282 may then send the packet data to the core switch 142 (or more generally, the data interconnect) to be routed to the memory element 136 for this cluster 134, as a series of write operations for each flit of the packet. The receive DMA write engine 282 may calculate the memory address (to write) for each flit as an offset from the packet's base address in the memory element 136. The receive DMA write engine 282 may tag each flit with its targeted memory address, and relay the flit and address to the core switch 142.

The core switch 142 (or more generally, the data interconnect) may route the flit over one of several crossbar switches, to the cluster memory element 136, which initiated the write of this data flit into the memory element 136.

If the receive job manager 292 signals to drop the packet, then the receive DMA write engine 282 may discard all of the packet data received from the decellifier 278.

The receive DMA write engine 282 may also signal to the receive job manager 292 when the last packet of an entire RDMA job has been fully written to the memory 136, which signals the receive job manager 292 that the RDMA job is complete. The receive job manager 292 may then relax hardware barriers to enable other engines to use the received data.

The receive fabric adapter 176 may include the following sub-modules, described in more detail in the following sections:
  Receive Job Manager
  Receive Job Table
  Receive Cell Buffer (Rx CBUF)
  Receive Packet Linked List Manager (PLLM)
  Receive Decellifier
  Receive Output Queue Subsystem
  Receive Packet Reader
  Receive Packet-Header Decapsulator
  Receive DMA Write Engine Receive Job Manager FIG. 20 depicts a schematic diagram of a receive job manager 292. One receive job manager 292 may be instantiated per interface engine cluster 134 to manage jobs associated with RDMA and datagram data received by that cluster's memory element 136. The receive job manager's operation for RDMA is described as follows: Receive job descriptors may be enqueued to descriptor queues 298, 300. In one embodiment, there may be two RDMA receive descriptor queues 298. The head entries of the respective queues may undergo barrier-waits (in the trip manager). Then, the entries may be moved into shallow FIFOs at the entrance to the receive job manager 292. The barriers can be used to ensure that the RDMA-destination memory locations are ready to receive data, and also to ensure that the receive job table entry is not currently in use.

The first step in the job service may be to write the receive job table entry (for RDMA, but not for datagram). This may trigger the job table to send a "Clear To Send" (CTS) message 303 to the remote (Tx) AI chip 112. The message 303 may be actually sent to the transmit fabric adapter 174 (which subsequently sends the message 303 to the remote AI chip), so there may be a FIFO queue 302 which links the receive CTS-out message 303 from the receive fabric adapter 176 to the transmit fabric adapter 174. The receive job manager 292 may send the CTS-out message 303 based on a state in the receive job table 294, with a process which selects the next job for CTS-out service with a round-robin selection.

Once the job is active (and CTS-out message 303 has been sent), the job may enter a state waiting for data to arrive from the transmit side. A wait timer may also be set. If no data is received within a timeout period, this may indicate a lost CTS-out message 303, and if so, the receive job manager 292 may re-send the CTS-out message 303 once. If the wait timer expires a second time, this event may indicate a likely failure of the transmit partner, and the job may be placed in a fail-state (described below).

Once (any) data is received, a job-completion timer may be started to monitor for the complete receipt of the expected data for the job. As data is received, packet-by-packet, the receive DMA write engine 282 may query the job table 294 of the receive job manager 292 to validate the received packet and determine the target memory element address for the received data. The job table 294 may provide the expected Tx Job ID corresponding to each Rx Job ID, memory-element base address and expected total transfer size, as well as the state of the job including the number of packets received so far. From this information, the next memory element address may be calculated for each received packet. When all the packets have been successfully received, the job is complete, which may trigger an ACK-out message 305 to be sent to the (Tx) AI accelerated IC chip partner 112. The message 305 may actually be sent by the transmit fabric adapter 174, so a FIFO queue 304 may be employed to link the ACK-out message 305 from the receive fabric adapter 176 to the transmit fabric adapter 174. The job completion also may trigger the job manager 282 to advertise its notify list to the barrier table(s). In the case that multiple jobs have concurrent barrier-notifications pending, a process may select the next job to perform the notifications in a round-robin manner.

In one embodiment, to-be-sent completion notifications 307 may be first buffered in FIFO queue 306 before the completion notifications 307 are sent from the receive job manager 292 to the hardware barrier management subsystem 296. In one embodiment, the notify list may effectively signal that the job table entry (and its Rx Job ID) are free to be re-used, by relaxing the barrier for a job waiting to re-use the same Rx Job ID.

If an error occurs while receiving the data, such as a lost packet or a packet marked with error by the receive fabric interface 270, this error may trigger a NACK message 305 to be sent to the (Tx) AI chip 112 partner at the end of the job. This NACK message 305 may cause the (Tx) AI chip 112 to retry the entire job. The job state (e.g., NumPacketsRcvd) may also be reset to restart the entire job, which may include resetting the number of packets received and received byte count, but may not rewind the job all the way to re-sending the CTS-out message 303.

However, if a second job has an error again, the job may be placed in a failed state. If the job completion timer expires, this event may also indicate a failure of the (Tx) AI chip partner 112 since the (Tx) AI chip 112 would have retried even if the ACK or NACK message 305 were lost. The job may then be placed in a failed state. In one embodiment, the job-completion timer is generous to allow for the transmit side's retry timer to expire and retry to be attempted before the receive job completion timer would expire.

A job-fail state is described as follows: In case of second timeout of the initial-data-receive timer (indicating a lost CTS message 303) or timeout of the job-completion timer, or retried job with a receive-error, the job can be determined to have failed, and may be flushed out to allow the AI chip 112 to make forward progress. The job may be marked as done (so it will signal its completion barrier-notifications) and the Job ID and other relevant information may be captured in a register and an interrupt may be signaled to the CPU.

The operation of the receive job manager 292 for datagram service is described as follows. For receive datagrams, each "job" may consist of a single packet without reliable-transport. The operation of the receive job manager 292 may not use the hardware barriers mechanism, and may not employ a job table entry. The receive job manager 292 may simply wait for the next receive datagram packet to arrive, and retrieve the receive memory element buffer address from the head of the receive queue (RxQ) 300 indicated with the received packet (in the packet header). In one embodiment, there may be at least two RxQs 300 for received datagrams, to provide two classes of service. High-priority RxQs 300 may also use smaller memory element buffer sizes, while low priority RxQ 300 may use larger buffers for bulk data transfer. When the data has been successfully written to the memory element 136, the RxQ tail-pointer may be incremented (by hardware) effectively making the queue entry (packet) visible to the CPU. One embodiment of the RxQ as a RxQ ring buffer 218 (also called the receive queue descriptor ring) was described above with respect to FIG. 13. If the RxQ 300 is empty when a packet is received, (specifically, if there are no prefetched RxQ descriptors available), the received packet may be dropped. This condition may occur when there are no memory element buffers available for that RxQ 300. The packet may also be dropped if the packet size is larger than the configured buffer size for the RxQ 300. Hardware may maintain counts of accepted and dropped packets/packets per RxQ 300.

Receive Job Table

One receive job table 294 (as depicted as part of the receive job manager 292 in FIG. 20) may be associated with each inference engine cluster 134. Each receive job table 294 may support up to 256 concurrently active RDMA jobs, and may be indexed by the Rx Job ID (RJID), which may be specified with the job descriptors set up by software. The receive job table contents may include the fields shown in the following table.

| Field | Description |
| --- | --- |
| Tx Job ID | Tx Job ID to link to the remote Tx Job Table |
| Memory Element Base Addr | Memory Element base address in target cluster. Word aligned. |
| Total Size | RDMA transfer length. |
| Msg VOQ | VOQ pointing to the Tx chip, for sending CTS and ACK/NACK messages |
| Notify list | Barrier completion-notification list (copied from job descriptor) |
| The following fields define the overall state of the job | |
| State | FSM which track the overall state of the job |
| WordsReceived | State which tracks the number of words received so far. |
| CTS/ Ack Timer | Hardware timeout-timer for initiating message retry or abandonment |

Receive Cell Buffer (Rx CBUF)

As depicted in FIG. 19, one instance of a receive cell buffer 276 may be shared by all fabric receive data pipes 274 and all receive clusters 134. A receive cell buffer 276 may receive data from each of n fabric receive data pipes 274 (e.g., n=4). Each fabric receive data pipe 274 can send Ncmax/S bytes per cycle, where Ncmax is the maximum cell size (e.g., 256 bytes), and S (segments) is a small integer such as 1, 2 or 4. The receive cell buffer 276 may store the cell data in a freepool-based cell buffer structure. Each receive cell buffer cell storage entry may be up to Ncmax bytes. The receive cell buffer 276 may return the allocated cell pointers (CPTRs) at up to one CPTR per cycle per fabric receive data pipe 274. The cells may be stitched together later after reordering. The cells may be subsequently read out once the full packet has been assembled and ready to be relayed to the memory element 136.

Receive Packet Linked List Manager (PLLM)

As depicted in FIG. 19, one receive PLLM 286 may be instantiated per cluster 134. The receive PLLM 286 may receive properly-ordered cell pointers from the receive fabric interface 270, and "stitch" these pointers into a linked list of cells per packet. The cell pointers (and associated cells) received may be interleaved from multiple source (Tx) AI chips 112, but they will be in-order from each source chip 112. As such, the receive PLLM 286 may maintain packet assembly contexts for multiple partially-stitched packets, with one packet assembly context per source (Tx) AI chip 112. To stitch the pointers, the receive PLLM 286 may receive the cell pointer, assembly context ID (which may be the ID of the Tx AI chip 112) and first-cell-in packet and last-cell-in-packet indications with each cell pointer.

The receive PLLM 286 may maintain a data structure to implement these linked lists of cells. In one embodiment, this may be a "link memory" with one entry per cell to link (point) to the next cell for that packet. Receiving a first-cell-in-packet may "open" a packet assembly context, and the receive PLLM 286 may save the first cell pointer as the packet handle for the context. Subsequent cells may be stitched by writing the incoming cell pointer into the link memory location of the prior cell in the packet. Once the final cell of each packet is received, the receive PLLM 286 may return the packet handle to the receive fabric interface 270, and close the packet assembly context.

Subsequently, the receive PLLM 286 may unstitch the linked list for each packet, when receiving a packet handle and packet length (in cells) to be unstitched from the packet reader 290. In one embodiment, this packet handle may be a pointer to the start of the linked list in a link memory. The receive PLLM 286 may read the entry from the link memory which returns the pointer to the second cell of the packet, and that link memory location may be read to locate the third cell, and so on for all cells of the packet. The receive PLLM 286 may return the unstitched cell pointers as a stream of cell pointers to the packet reader 290.

Receive Decellifier

As depicted in FIG. 19, one decellifier 278 may be instantiated per cluster 134. The decellifier 278 may convert the stream of received cells into a contiguous byte stream. In one embodiment, the cells may be variable sized and the decellifier 278 may append only the valid bytes to the outgoing receive packet data stream. The cell data sent to the decellifier 278 may arrive over a parallel bus of Nc bytes per cycle, where the cell size is an integer multiple of Nc. The packet data emitted from the decellifier 278 may be transmitted over a parallel bus of Np bytes per cycle, where Nc does not equal Np. The larger of (Nc, Np) may not be an integer multiple of the smaller of (Nc, Np). The decellifier 278 may convert the data bus width from Nc to Np.

Receive Output Queue Subsystem

As depicted in FIG. 19, one receive output queue (OQ) subsystem 288 may be instantiated per receive cluster 134. The receive output queue subsystem 288 may maintain a plurality of output queues 128a-128d per cluster 134 for received, assembled packets which are waiting to be moved into the memory element 136. A total of n output queues 128a-128d per cluster 134 may allow for two types of traffic (RDMA/datagram) and two classes of service each. The receive output queue subsystem 288 may receive packet handles from the receive fabric interface 270 with OQ-number and packet length, and may enqueue to simple FIFO queues.

The receive output queue subsystem 288 may include a simple priority and round-robin scheduler to dequeue the head packet from one of the n output queues 128a-128d per cluster 134, and may present the dequeued packet information to the receive packet reader 290. The output queues 128a-128d may support enough packets for all the data in the receive cell buffer 276.

Receive Packet Reader

As depicted in FIG. 19, one receive packet reader 290 may be instantiated per receive cluster 134. The receive packet reader 290 may assemble data for each packet into a byte stream and then segment this byte stream into flits of a fixed width (such as 128 bytes) to be transferred to the memory element 136. The incoming data may include a (scattered) linked list of receive cell buffer (Rx CBUF) cells which need to be gathered. The receive packet reader 290 may receive a packet-handle from the receive output queue subsystem 288, along with the number of cells in the packet. For a single-cell packet, the packet-handle may be the Rx CBUF cellpointer. For larger packets, the packet-handle may be a pointer to a linked-list structure maintained by the receive packet linked list manager (PLLM) 286. For each packet, the receive packet reader 290 may issue packet-read requests to the receive PLLM 286, including the number of cells in the packet. The receive PLLM 286 may unstitch and return the full list of cell pointers. The receive packet reader 290 may then issue a series of Rx CBUF cell-read requests for the duration of the packet. The receive packet reader 290 may also send the packet-size to the receive DMA write engine 282.

Receive Packet-Header Decapsulator

As depicted in FIG. 19, one receive packet-header decapsulator 280 may be instantiated per receive cluster 134. The receive packet-header decapsulator 280 may receive a series of flits from the receive de-cellifier 278, with start of packet and end of packet (SOP/EOP) markings to identify the start and end of each packet, respectively. The receive packet-header decapsulator 280 may extract the 16-Byte packet header and re-assemble the remaining data back into flits. The header may include a cyclic redundancy check (CRC) string which is checked for integrity. The header fields may be sent as metadata to the receive DMA write engine 282.

Receive DMA Write Engine

As depicted in FIG. 19, one receive DMA write engine 282 may be instantiated per receive cluster 134. The receive DMA write engine 282 may receive the packet length from the receive packet reader 290, and subsequently, receive the header information from the receive packet-header decapsulator 280, and the series of flits (post decapsulation). The packet type field, extracted from the packet header, may indicate whether the packet is a RDMA, a datagram, or a hardware-generated message type. The header may provide the information needed to route the received packet to the memory element 136. This information may include the packet type (message, RDMA or datagram). For a RDMA, the header may provide the Rx Job ID/Tx Job ID which may be relayed to the receive job manager 292 to access the receive job table 294. For a datagram, the header may include the receive queue identifier (Rx QID), which may be used to retrieve a receive datagram (buffer) descriptor.

For RDMA data packets, the processing may include the following: First, the Rx DMA write engine 282 may signal the receive job manager 292 to perform integrity checks between the received packet and the receive job state. The integrity checks may include the following steps: If the Rx Job ID/Tx Job ID of a job do not match the Rx Job ID/Tx Job ID for an active job, this job may be determined to be a stale/old job and the packet may be dropped. For the last packet (in the job), if the packet size (in words) plus a previously received count is less than the total expected job size (in words), this condition may indicate a lost (dropped or skipped) packet during the transmission, and the receive job state may be updated to indicate the error. This condition may also trigger a NACK message. For any packet, if the packet size plus a previously received count exceeds the total expected job size, this condition may indicate an unusual error indicating corruption. Consequently, the packet may be dropped, and the receive job state may be updated to indicate an error and send a NACK. If the packet header has a CRC error, this condition may indicate a corrupted packet, and the Rx Job ID/Tx Job ID and other fields cannot be used, triggering the packet to be dropped.

If the integrity checks pass, the receive job manager 292 may compute the packet's starting memory address from the job table's memory base address and number of words received so far. The sum of these quantities may yield the starting write address for this packet in the memory element 136, which may be returned to the receive DMA write engine 282. The receive job manager 292 may update the receive job table entry for the received word count for the packet, and signal the receive DMA write engine 282 to transfer the packet to the memory element 136. Otherwise, the receive DMA write engine 282 may be signaled to drop the packet. The receive DMA write engine 282 may then send each flit to the core switch 142 (or more generally, the data interconnect) to be routed to memory element 136, and may provide the memory address per flit, incrementing the address by one memory word with each flit. However, if the receive job manager 292 signaled to drop the packet, then the Rx DMA write engine 282 may simply discard all of the packet flits received from the receive packet-header decapsulator 280.

For received hardware-generated RDMA messages conveying CTS, ACK or NACK, the entire message information may be contained in the packet header, and no data needs to be forwarded. The packet type (message or data transfer) may be encoded in the packet header. For these cases, the message contents may be relayed directly to the transmit job manager 230 (within the transmit fabric adapter 174). Any additional data beyond the packet header may be considered garbage, and may be dropped by the receive DMA write engine 282.

Outstanding writes per packet may be tracked using a write-completion tracking identifier (tracking-ID). Each receive DMA packet transfer may allocate a tracking-ID from a set of IDs. The memory element 136 may use the tracking-ID to indicate when the writes have been fully committed to the memory element 136. If no tracking-IDs are available, the receive DMA write engine 282 may be stalled. When the last packet of an RDMA job is successfully transferred to the memory element 136 (and all pending writes are complete as indicated by the write-completion tracker), the receive job may be updated and subsequently trigger the receive job manager 292 to issue the completion notifications to the hardware barrier management system 296.

For datagram packets, the processing may include the following: The receive queue (RxQ) 300 may be determined by a field in the packet header (extracted by the receive packet-header decapsulator). The receive DMA write engine 282 can perform an integrity check between the received packet-length (as indicated by the receive packet reader 290) and the length indicated in the packet header. If these lengths do not match (with appropriate chunk level granularity), the packet may be dropped. The receive DMA write engine 282 may check the selected RxQ's descriptor queue for the appropriate memory buffer pointer. The receive DMA write engine 282 may provide a shallow FIFO of prefetched descriptors per RxQ 300, and the descriptor prefetch engine may normally attempt to keep these FIFOs topped-up with available descriptors. If the FIFO is empty, the packet may be dropped. If the received packet is larger than the buffer size indicated in the RxQ descriptor (selected from the FIFO), the packet may be dropped. Otherwise, the packet may be transferred to the memory element 136 in a similar manner to an RDMA write. The receive descriptor (in memory) may also be updated with the received packet length, which was extracted from the packet header (with byte-granularity). The receive DMA write engine 282 may then send each flit to the core switch 142 (or more generally, the data interconnect) to be routed to the memory element 136, and may provide the memory address per flit, incrementing the memory address by one memory word with each flit. Outstanding writes per packet may be tracked using a write-completion tracking identifier as described above for RDMA processing. Once the transfer to the memory element 136 is complete, all pending writes are complete as indicated by the write-completion tracker, and the descriptor has been updated, the receive DMA write engine 282 may request the descriptor prefetch engine to increment the RxQ hardware pointer. This action may make the received packet visible to software.

For hardware generated messages, processing may include the following: The message type, and any associated fields (Tx Job ID, Rx Job ID) may be fully included in the packet header, and thus may be provided from the receive packet-header decapsulator 280. These received messages are actually intended to be used by the transmit job manager 230 (within the transmit fabric adapter 174) so the receive DMA write engine 282 may forward the message metadata to the transmit job manager 230. The receive packet-header decapsulator 280 may send the remaining bytes as one flit in the datapath to the receive DMA write engine 282. These remaining bytes may just be pad bytes, so the receive DMA write engine 282 may discard them.

Core Switch

As depicted in FIG. 19, the core switch 142 may provide buffering, arbitration, and a datapath to accept flits from the a plurality of RDMA transfer threads (one per memory cluster 134) and may "spray" these flits over the N crossbar switches to be written to the memory element 136 at the target clusters 134. Associated logic may also keep track of outstanding (pending) writes from each RDMA receive job, so that completion notifications are not issued before the data has been fully written to the memory element 136.

Figure 21:
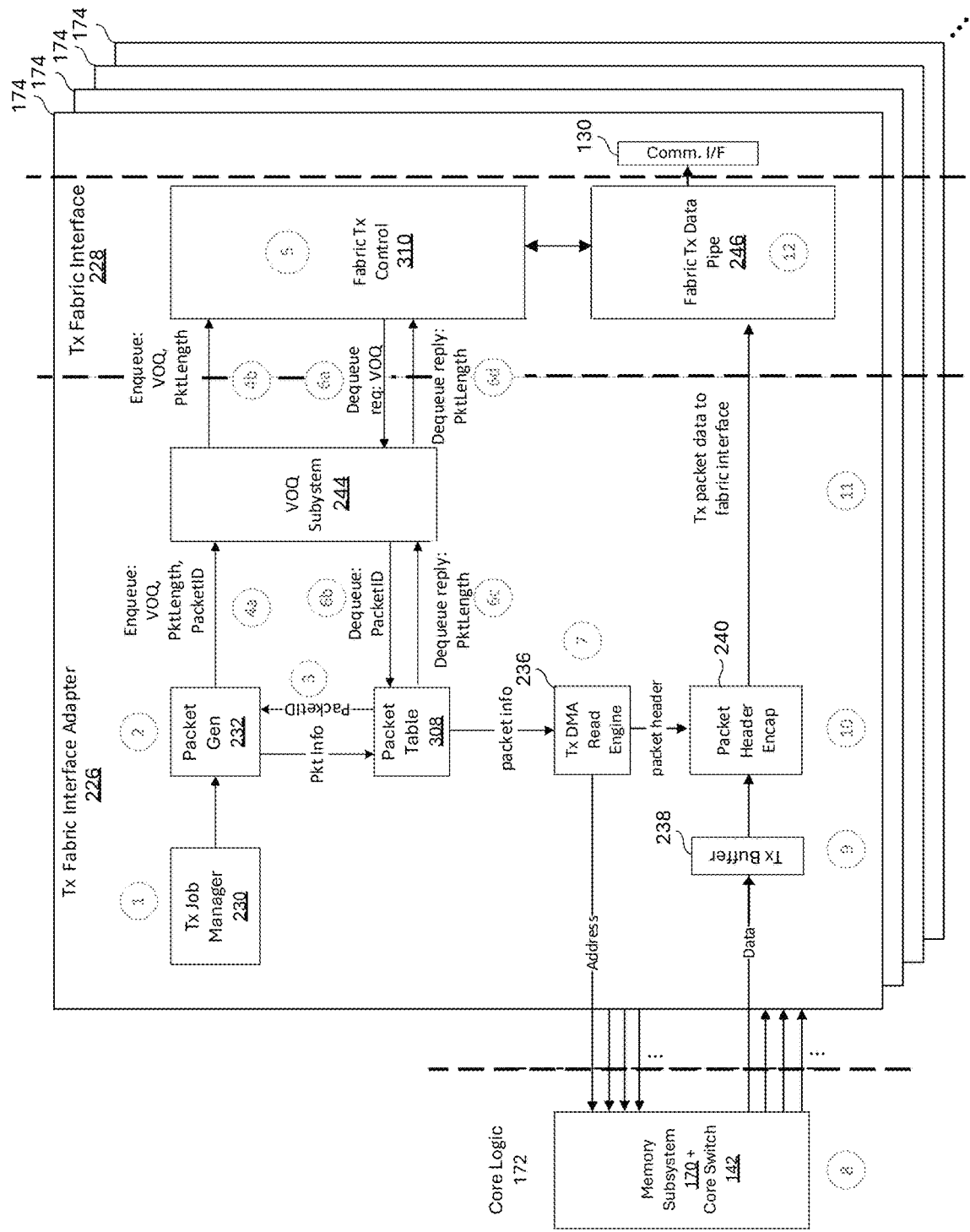
FIG. 21 depicts a second embodiment of the transmit fabric adapter, in accordance with one embodiment of the invention.

FIG. 21 depicts a second embodiment of the transmit fabric adapter 174. In the second embodiment, the transmit fabric interface adapter 226 may include the transmit job manager 230, packet generator 232, packet table 308, transmit DMA read module 236, transmit buffer 238, packet header encapsulator module 240, and virtual output queue (VOQ) subsystem 244; and the transmit fabric interface 228 may include the fabric transmit control 310 and fabric transmit data pipe 246. A plurality of the transmit fabric adapters 174 may be instantiated on a single AI chip 112 (as shown by the stacked depiction of the transmit fabric adapters 174) in order to accommodate a desired transmit bandwidth.

The second embodiment of the transmit fabric adapter 174 may differ from the first embodiment in the following ways: First, the VOQ queueing subsystem 244 may not be included in the transmit fabric interface 228. The transmit fabric interface 228 may only keep track of the aggregate depth of each VOQ 124a-124d, so it can negotiate the "request/grant" with the receive AI chip 112. Therefore, in the second embodiment of the transmit fabric adapter 174, the transmit fabric interface adapter 226 may need to include a VOQ subsystem 244. Second, the transmit fabric interface 228 may be a packet-based interface, so the transmit fabric interface 228 may take care of "cellfication." The operational flow through the second embodiment of the transmit fabric adapter 174 may be as follows:

In step 1 (identical to the first embodiment), software may prepare RDMA Tx descriptors for each RDMA "job," which is a block of data to be transferred, and enqueue descriptors onto per-RDMA transmit engine descriptor queues. The descriptors may include the destination VOQ number, total RDMA "job" size, as well as control information for the RDMA including transmit and receive RDMA Job IDs, and desired transfer packet size for dividing the large RDMA transfer into packets for transport over the cell fabric. Each RDMA job may be up to several megabytes. The transmit fabric adapter 174 may also support inter-chip packet transfers via CPU-managed "datagrams" which are a single packet of up to 16 KB. Specifically, datagrams may be unsolicited transfers, and may not use Job-ID semantics.

Each cluster 134 may have an independent job manager 230, with its own descriptor queues, for RDMA jobs in which data is sourced from that cluster's memory element 136. The job at the head of each transmit RDMA queue may pass a hardware barrier wait, which ensures that any dependencies for the RDMA (on the transmit AI chip 112) have been satisfied, such that the source data has been produced and made available in the memory element 136.

Each cluster's transmit job manager 230 may also support datagram jobs, for data transmitted from the memory 136 in that cluster 134, in separate descriptor queues from the RDMA jobs. These datagram jobs may not need to wait for barriers to be cleared, since the CPU can resolve any dependencies before enqueueing each datagram descriptor to its descriptor queue.

In step 2 (identical to the first embodiment), each RDMA job may then be dynamically assigned to a channel in the transmit packet generator (PGEN) 232, which divides the DMA transfers into packets of up to 16 KB for transmission. For datagram jobs, only a single packet may be generated. Each channel may process one RDMA or datagram job. In one embodiment, 64 channels may be employed to support concurrent packet generation for 64 jobs per PGEN 232. One PGEN 232 may be instantiated per source cluster 134.

The PGEN 232 may perform round-robin packet generation among the channels (jobs) on a packet-by-packet basis. The output of the PGEN 232 may include the packet metadata, including packet base address in the source cluster memory 136, packet length, and additional information needed for communication with the receive AI chip 112.

The channels may be responsive to congestion-based flow control on their respective virtual output queues (VOQs) 124a-124d. Congestion monitoring may be necessary to regulate the number of packets enqueued to the VOQ subsystem 244 for any one VOQ 124a-124d and in aggregate, otherwise the entire job (which may be multiple MB's) could be enqueued in a short time, causing all internal packet management resources to be utilized. The PGEN 232 therefore may maintain outstanding packet counts for each VOQ 124a-124d, which may be incremented for each generated packet (just prior to enqueueing the packet to its VOQ 124a-124d), and decremented once the packet is dequeued from the VOQ 124a-124d. When this count for a particular VOQ 124a-124d reaches or exceeds a programmable threshold, the PGEN 232 may be inhibited from generating additional packets for that VOQ 124a-124d until the count decreases below the threshold. Similarly, the PGEN 232 may maintain an aggregate outstanding packet count for all packets sourced from each cluster 134, and inhibit generating additional packets when that count reaches a programmable threshold.

In step 3 (identical to the first embodiment), a packet table entry may be created for each generated packet. The packet table (containing a plurality of packet table entries) may store the metadata for each packet outstanding in a VOQ 124a-124d in the VOQ subsystem 244. In a multi-cluster system, the packet table 308 may be shared by all clusters' RDMAs. The packet table 308 may provide at least enough entries to represent the bandwidth-delay product of the fabric bandwidth*fabric round-trip-time, divided by the desired average packet size. The bandwidth-delay product represents the minimum number of packets which would be enqueued in the VOQ subsystem 244 in a steady-state at full throughput.

Each packet table entry may include the source address of the data in the memory element 136 (e.g., AMEM), packet sequence number within the full RDMA job, and Job-ID fields for communicating with the remote AI chip 112. In one embodiment, the packet table 308 may include the packet length as well. The index of the packet table entry created may be returned as a "Packet ID" to the packet generator 232.

In step 4a, PGEN 232 may issue a packet enqueue command to the VOQ subsystem 244, which maintains queues of packet table entries (per VOQ 124a-124d). In step 4b, the VOQ subsystem 244 may then relay the enqueue command to the fabric transmit control 310 of the transmit fabric interface 228 to indicate the packet length. The fabric transmit control 310 can then maintain a count of pending (enqueued) bytes per VOQ 124a-124d, and handshakes with the receive AI chip 112 (Rx chip) to receive grants to support the total enqueued bytes per VOQ 124a-124d.

In step 5, the fabric transmit control 310 may then negotiate to transfer the packet to the Rx chip 112. In one embodiment, this negotiation may include issuing a request message for each packet (or group of packets) to the Rx chip 112 addressed by the VOQ 124a-124d. This request message may be relayed using the cell-based switch fabric 14 itself, such as by embedding the request into a cell relayed over the fabric 14. Subsequently, the Rx chip 112 may return a grant message (also relayed across the cell-based switch fabric 14) indicating that the transmit AI chip 112 (i.e., Tx chip) may send a packet. In another embodiment, the grant message may indicate a total number of bytes which may be sent (by the Tx chip 112) which may allow for one or more packets to be transmitted in response to the grant message.

In step 6a, when a grant message is received, the fabric transmit control 310 may issue a dequeue command to the VOQ subsystem 244, indicating the maximum number of bytes which may be transmitted based on the grant received, hereinafter referred to as the "grant size." In a typical case, the grant size might be up to 16K bytes. The VOQ subsystem 244 may then dequeue at least one packet from the VOQ 124a-124d.

In step 6b, the VOQ subsystem 244 may send the dequeued PacketID to the packet table 308. The packet table 308 may read the packet table entry which includes the packet length.

In step 6c, the dequeued packet length may be returned from the packet table 308 to VOQ subsystem 244 as a dequeue reply.

In step 6d, the VOQ subsystem 244 may relay the dequeue reply, including the VOQ number and packet length, to the transmit fabric interface 228, in order to keep track of the remaining total enqueued bytes in the VOQ 124a-124d. Also, if the packet length is less than the grant size, the VOQ subsystem 244 may dequeue another packet, and repeat steps 6b-6d as long as the total dequeued packets' length total is less than the grant size. In some embodiments, the last packet dequeued in this sequence may be allowed even if the total dequeued packets' length exceeds the grant size.

In step 7 (identical to the first embodiment), a transmit DMA read operation may be initiated for each packet, to fetch the packet data from the source cluster memory element 136. In one embodiment, one transmit DMA read engine 236 may be assigned for each cluster 134, which can receive packet-transfer requests for any fabric transmit pipe 246 from the memory 136 in that cluster 134. In another embodiment, there may be one transmit DMA read engine 236 for each fabric transmit pipe 246, which can generate packet transfer requests targeted to any cluster's memory 136.

In either implementation, the transmit DMA read engine 236 may generate the memory read operations for each flit (e.g., a flit being 128 bytes of data) in the packet. The data for each packet may be retrieved from a contiguous region of the memory element 136. In one embodiment, the memory subsystem 170 and core switch 142 may return data to transmit buffer 238 in the flit-by-flit order in which data read operations were generated by transmit DMA read engine 236. In such embodiment, there is no need to reorder the flits. In another embodiment, the data may be returned in arbitrary order from the memory element 136. In such embodiment, the transmit DMA read engine 236 may also reserve space for the packet data in a transmit buffer 238. Each flit read request may include the memory address and a transmit buffer index number, which corresponds to a reserved location in the transmit buffer 238 for the flit. The transmit buffer index numbers may be assigned sequentially, based on the current transmit buffer write pointer which is maintained by the transmit DMA read engine 236. This write pointer may be initialized to zero, and incremented (modulo the transmit buffer size) after each flit read request. The transmit DMA read for a packet may not be started unless the transmit buffer 238 has enough space to receive the entire packet. This space may correspond to the difference between the transmit buffer write pointer and the transmit buffer read pointer (maintained by the control logic of the transmit buffer 238, described below in step 9).

In step 8 (identical to the first embodiment), the memory subsystem 170 may perform the memory reads, and may return the data to the transmit fabric adapter 174 over multiple crossbar switches of the core switch 142 (or more generally, the data interconnect), selecting crossbar switches in a load-balanced manner. Flits for a particular packet may return from the crossbar switches out of order, and flits from multiple packets may return interleaved, due to independent arbitration of the resources in each crossbar switch.

In step 9, the transmit buffer 238 may capture and buffer the flits of one or more packets for each fabric transmit pipe 246. In the above-described embodiment in which the data is retrieved in the flit-by-flit order, the transmit DMA read does not need to allocate a full packet's worth of buffer space before commencing the data read, and the transmit buffer 238 would only require a minimum capacity of one memory round-trip-time (RTT)*memory access bandwidth, rather than that much plus one maximum size packet, for full efficiency. In the above-described embodiment in which the data is retrieved in the arbitrary order, each flit of data returned from the memory element 136, through the core switch 142 (or more generally, the data interconnect 142), may be marked with a transmit buffer index number which directs the flit to be stored in the correct location in the transmit buffer 238. The transmit buffer 238 may have capacity for at least the bandwidth-delay product of the memory RTT*memory access bandwidth, plus one maximum size packet. The control logic of the transmit buffer 238 may keep track of the transmit buffer read pointer, which is the index of the next flit to be retrieved from the transmit buffer 238 in order to restore the proper ordering of the flits of each packet. The transmit buffer read pointer may be initialized to zero, and incremented (modulo the transmit buffer size) as each properly-ordered flit is removed from the transmit buffer 238.

In step 10, a 16-byte packet header may be created and prepended to each packet's data by the packet header encapsulation module 240. This packet header may provide information needed by the destination AI acceleration IC chip 112 in order to process the packet, including the receive and transmit RDMA job identifiers that identify the specific RDMA transfer, the packet sequence number within the job (to help detect dropped packets), and a last-packet-in-job flag.

In step 11, the post-encapsulation packet data may be sent to the fabric transmit data pipe 246 of the transmit fabric interface 228. The fabric transmit data pipe 246 may cellify the data for transmission on the cell-based switch fabric 14. When the fabric interface adapter 226 signals an "enqueue," this action increments the total enqueued bytes count for that VOQ 124a-124d in the fabric interface 228. It is noted that the second embodiment of the transmit fabric adapter 174 may be replicated as many times as necessary to support a higher transmit bandwidth (e.g., four replicas are shown in the example of FIG. 21).

In step 12, the fabric transmit pipe 246 may encapsulate the data for each cell for transmission over the cell-based switch fabric 14, and transmit the cells over a number of SerDes (or other high speed) links. SerDes links may support bit-rates of 112 Gbits/sec or more. In a typical embodiment, there may be fabric connections from each fabric transmit pipe 246 to multiple cell-fabric switch chips 18, with one or more SerDes links per connection. In a typical embodiment, the cells may be distributed across the links in a load-balanced manner, with one cell sent on the first link, the next cell on a second link, and so on, by each transmit pipe 246.

Figure 22:
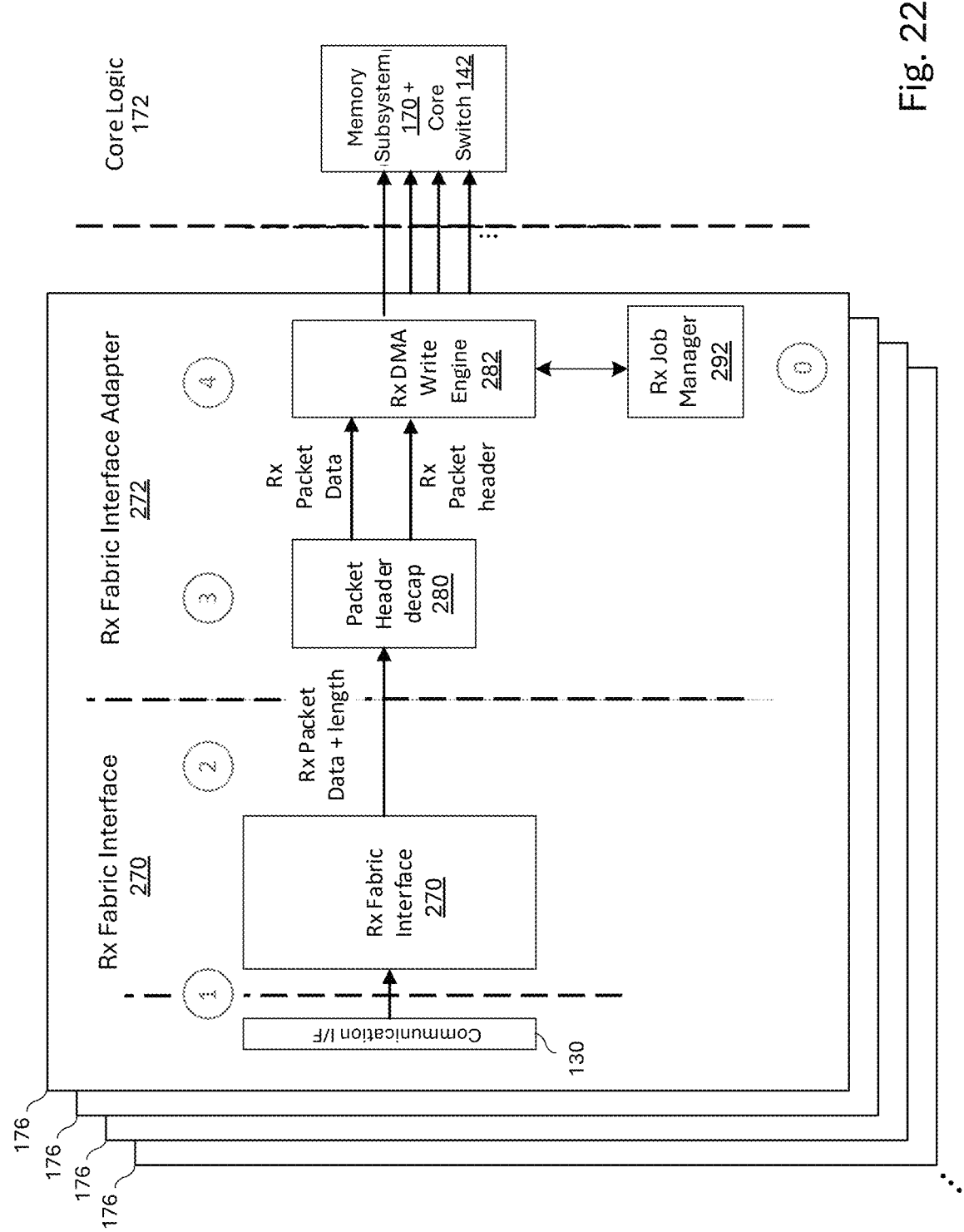
FIG. 22 depicts a second embodiment of the receive fabric adapter, in accordance with one embodiment of the invention.

FIG. 22 depicts a second embodiment of the receive fabric adapter 176. The second embodiment of the receive fabric adapter 176 may differ from the first embodiment of the receive fabric adapter 176 in that the receive fabric interface 270 of second embodiment may include complete termination of the fabric cell protocol, effectively containing the receive cell buffer and decellification, linked list manager and OQ subsystem within the receive fabric interface 270. Therefore, the receive fabric interface 270 may deliver completed packets to the rest of the receive fabric adapter 176. A plurality of the receive fabric adapters 176 may be instantiated on a single AI chip 112 (as shown by the stacked depiction of the receive fabric adapters) in order to accommodate a desired receive bandwidth.

In step 0 (which is identical to the first embodiment), software may prepare RDMA receive descriptors for each "job," which is a block of data to be transferred, and enqueue descriptors onto per-cluster RDMA receive engine descriptor queues. The descriptors may include the total RDMA job size, receive memory buffer address to receive the data, as well as control information for the RDMA including transmit and receive RDMA Job IDs. Each RDMA job may be up to several megabytes.

Each cluster 134 may have an independent receive job manager 292, with its own descriptor queues, for RDMA jobs in which data is targeted to the memory 136 of that cluster 134. The job at the head of each Rx RDMA descriptor queue may pass a hardware barrier wait, which ensures that any dependencies for the RDMA (on the receive chip 112) have been satisfied, such that the receive buffer memory has been allocated and is ready to receive data.

Once the RDMA job barriers are cleared, a receive job table entry may be created for the indicated Rx Job-ID and destination cluster 134. The job table entry may record the state of the RDMA transfer job. When the job table entry is initiated, this also may trigger hardware to send a Clear-ToSend message to the source chip 112 to enable the RDMA transfer.

The receive fabric adapter 176 may also support inter-chip packet transfer via CPU-managed "datagrams" which are a single packet of up to 16 KB packet. Datagrams may be unsolicited transfers, and do not use the Job-IDs.

Each cluster's receive job manager 292 also may support datagrams (to be received at that cluster's memory element 136) in separate descriptor queues from the RDMA jobs. The receipt of these datagrams do not need to wait for barriers to be cleared, since the CPU can resolve any dependencies before enqueueing each datagram descriptor to its descriptor queue.

In step 1 (similar but not identical to the first embodiment), the source transmit AI chip 112 (Tx chip) may begin transmitting cellified data over the cell-based switch fabric 14. In one embodiment, the transmit chip's fabric interface 228 may implement a handshaking protocol with the fabric interface 270 of the receive AI chip 112 (Rx chip). In this protocol, the Tx chip 112 may send a request to the Rx chip 112, indicating the length of the packet it wishes to transmit, and the desired destination output queue 128a-128d (and cluster 134) on the Rx chip 112. The Rx chip 112 may send a grant back to the Tx chip 112 when there is available buffer space and according to a scheduling policy, which enables the Tx chip 112 to then send the packet. The packet may be cellified by the Tx chip 112 and transmitted over multiple SerDes links to the cell-based switch fabric 14.

In one embodiment, there may be multiple SerDes (or other high speed) links on the Rx chip 112 connecting to fabric switch chips 18, and cells may be received by the receive fabric interface 270 over multiple links. Each cell may be received in its entirety on one link, but multiple cells may be distributed over multiple links, and may arrive out of order at the Rx chip 112.

In one embodiment, the SerDes links may be divided into four groups, with each group supporting approximately 100GBytes/sec of fabric packet throughput. Each group may be processed by an associated receive data pipe 274 in the receive fabric interface 270. In this embodiment, the fabric connections may be constrained to the target cluster 134. The cells for any packet may arrive on any SerDes link attached to the target cluster's fabric adapter 174, and as noted above, the cells may arrive out of order within the receive data pipes 274.

In step 2, the receive fabric interface 270 may buffer, reorder, and reassemble the cells of each received packet, and enqueue the received packets into an OQ 128a-128d. There may be several OQs 128a-128d per receive cluster 134, supporting multiple classes of service. The receive fabric interface 270 may further implement a scheduling policy to select the next OQ 128a-128d to be dequeued (in case multiple OQs 128a-128d have packets pending for the cluster). After the packet is dequeued, the packet length and packet data may be sent to the packet header decapsulation block 280 of the receive fabric interface adapter 272.

In step 3, the packet header decapsulation block 280 may extract the packet header which was inserted on the transmit side. This header may be 16 bytes, prepended to the packet data, and including the receive and transmit RDMA Job IDs which identify the specific RDMA transfer, the packet sequence number within the job (to help detect dropped packets), and a last-packet-in-job flag.

The packet header information may be sent to the receive DMA write engine 282. The packet data (with header removed) may also be transmitted to the receive DMA write engine 282 on a separate interface.

In step 4 (identical to step 11 of the first embodiment), the receive DMA write engine 282 may send the receive RDMA Job ID, packet sequence number and packet length (received from the packet reader) to the receive job manager 292, to index the RDMA job tables to validate the received packet. The receive job manager 292 may keep track of the state of each RDMA job, including the total number of received bytes, and next expected packet sequence number. A packet may be discarded if there is a skip (or gap) in the received packet sequence number, or any mismatch between the packet header and expected values based on the current job state.

The receive job manager 292 may calculate the base address in memory to which the packet should be written, based on the RDMA job's starting buffer address in memory and the total bytes received so far for this job. The receive job manager 292 may also update the job state in the job table to record the next expected sequence number and total byte count received). The receive job manager 292 may return the packet base address to the receive DMA write engine 282, with an indication of whether the packet should be accepted (written to memory 136) or discarded.

If accepted, the receive DMA write engine 282 may then send the packet data to the core switch 142 (or more generally, the data interconnect 142) to be routed to the memory 136 for this cluster 134, as a series of write operations for each flit of the packet. The receive DMA write engine 282 may calculate the memory address (to write) for each flit as an offset from the packet's base address in memory 136. The receive DMA write engine 282 may tag each flit with its targeted memory address, and relay the flit and address to the core switch 142. The core switch 142 (or more generally, the data interconnect 142) may route the flit over one of several crossbar switches, to the cluster memory 136 that initiated the write of this data flit into the cluster element 136. If the receive job manager 292 signals to drop the packet, then the receive DMA write engine 282 may discard all of the packet data received from the decellifier 278. The receive DMA write engine 282 may also signal to the receive job manager 292 when the last packet of an entire RDMA job has been fully written to the memory element 136, which signals the receive job manager 292 that the RDMA job is complete. The receive job manager 292 may then relax hardware barriers to enable other engines to use the received data.

Having described two embodiments of the transmit fabric adapter 174 and two embodiments of the receive fabric adapter 176, an extension upon these embodiments is noted. In a further embodiment, it is possible for the (above-described) first embodiment of the transmit fabric adapter 174 to communicate with the (above-described) second embodiment of the receive fabric adapter 176. Likewise, in a further embodiment, it is possible for the (above-described) second embodiment of the transmit fabric adapter 174 to communicate with the (above-described) first embodiment of the receive fabric adapter 176.

Figure 23:
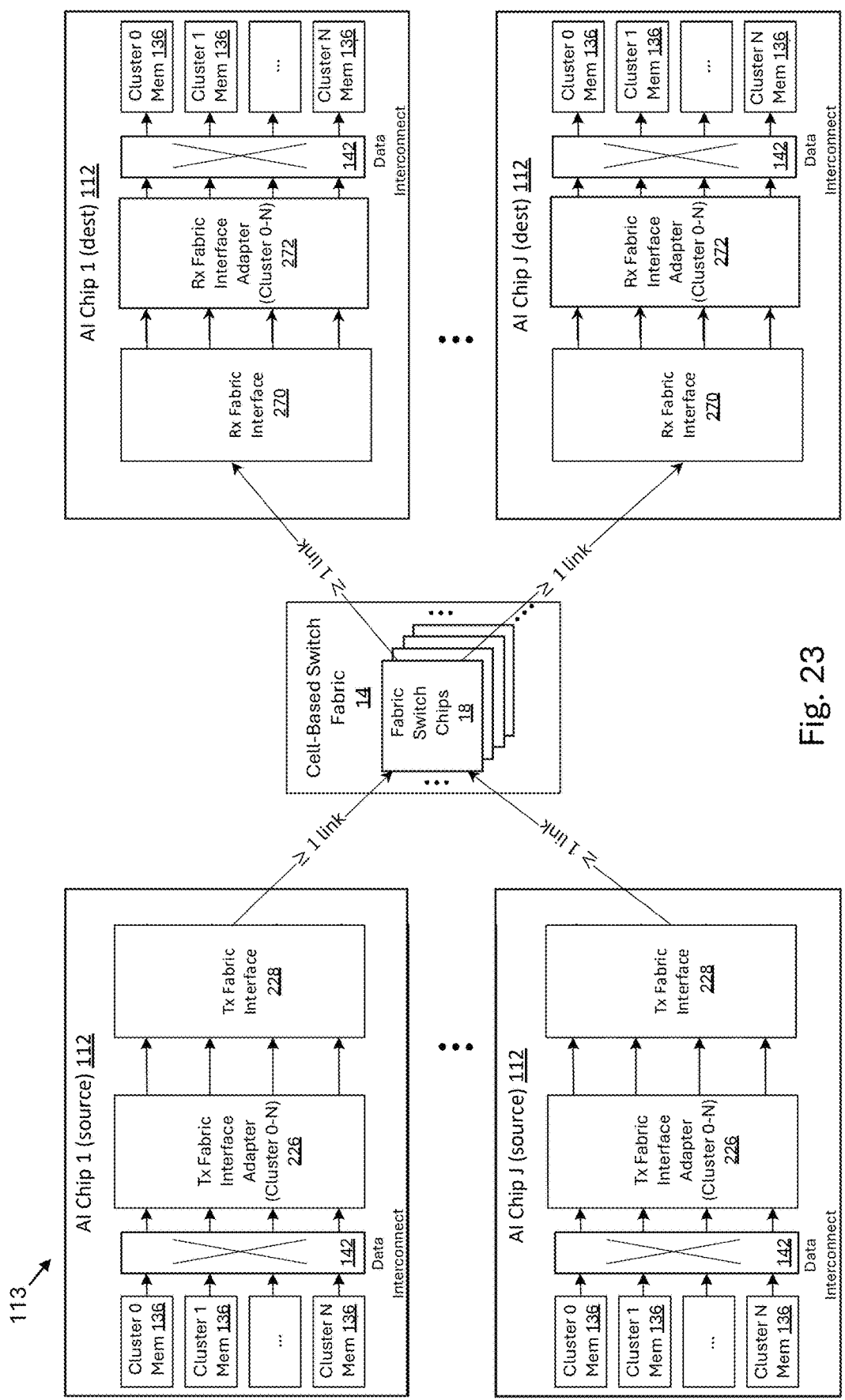
FIG. 23 depicts a system diagram in which a plurality of AI chips (each with a transmit and receive fabric adapter that is shared between multiple UIE clusters) are communicatively coupled to one another via a plurality of fabric switch chips, in accordance with one embodiment of the invention.

FIG. 23 depicts a system diagram 113 in which a plurality of AI chips 112 (each with a transmit and receive fabric adapter that is shared between multiple UIE clusters) may be communicatively coupled to one another via a plurality of fabric switch chips 18 of the cell-based switch fabric 14. In the diagram 113, the source AI chips 112 are depicted on the left hand side (e.g., AI chip 1 (112), ..., AI chip J (112)) and the destination AI chips 112 are depicted on the right hand side (e.g., AI chip 1, ..., AI chip J). While two instances of AI chip 1 (112) are depicted in FIG. 23 (i.e., one on the left and one on the right), it is intended that these two instances may correspond to the same physical instance of AI chip 1 (112), as AI chip 1 (112) can function both as the source and the destination. The same observation holds true for the two instances of AI chip J (112). In the embodiment of FIG. 23, one transmit fabric adaptor 174 (which includes the transmit fabric interface adapter 226 and transmit fabric interface 228) may be shared by the memory elements 136 from multiple UIE clusters (e.g., clusters 0-N), and the data interconnect 142 may enable this sharing functionality. Such embodiment may be similar to the embodiment previously described in FIG. 7. Further, in the embodiment of FIG. 23, the receive fabric adapter 176 (which includes the receive fabric interface 270 and the receive fabric interface adapter 272) may be shared by the memory elements 136 of multiple UIE clusters (e.g., clusters 0-N). One or more links may communicatively couple each of the transmit fabric interfaces 228 to one or more of the fabric switch chips 18. Similarly, one or more links may communicatively couple each of the fabric switch chips 18 to each of the receive fabric interfaces 270. While not depicted in FIG. 23, it is understood that each fabric adapter (whether the transmit fabric adapter 174 or receive fabric adapter 176) may be communicatively coupled to the cell-based switch fabric 14 via a SerDes (or other high speed) interface. Further, it is noted that each transmit fabric interface 228 may include a VOQ subsystem 244 (as depicted in FIG. 15), and each receive fabric interface adapter 272 may include an OQ subsystem 288 (as depicted in FIG. 19).

Figure 24:
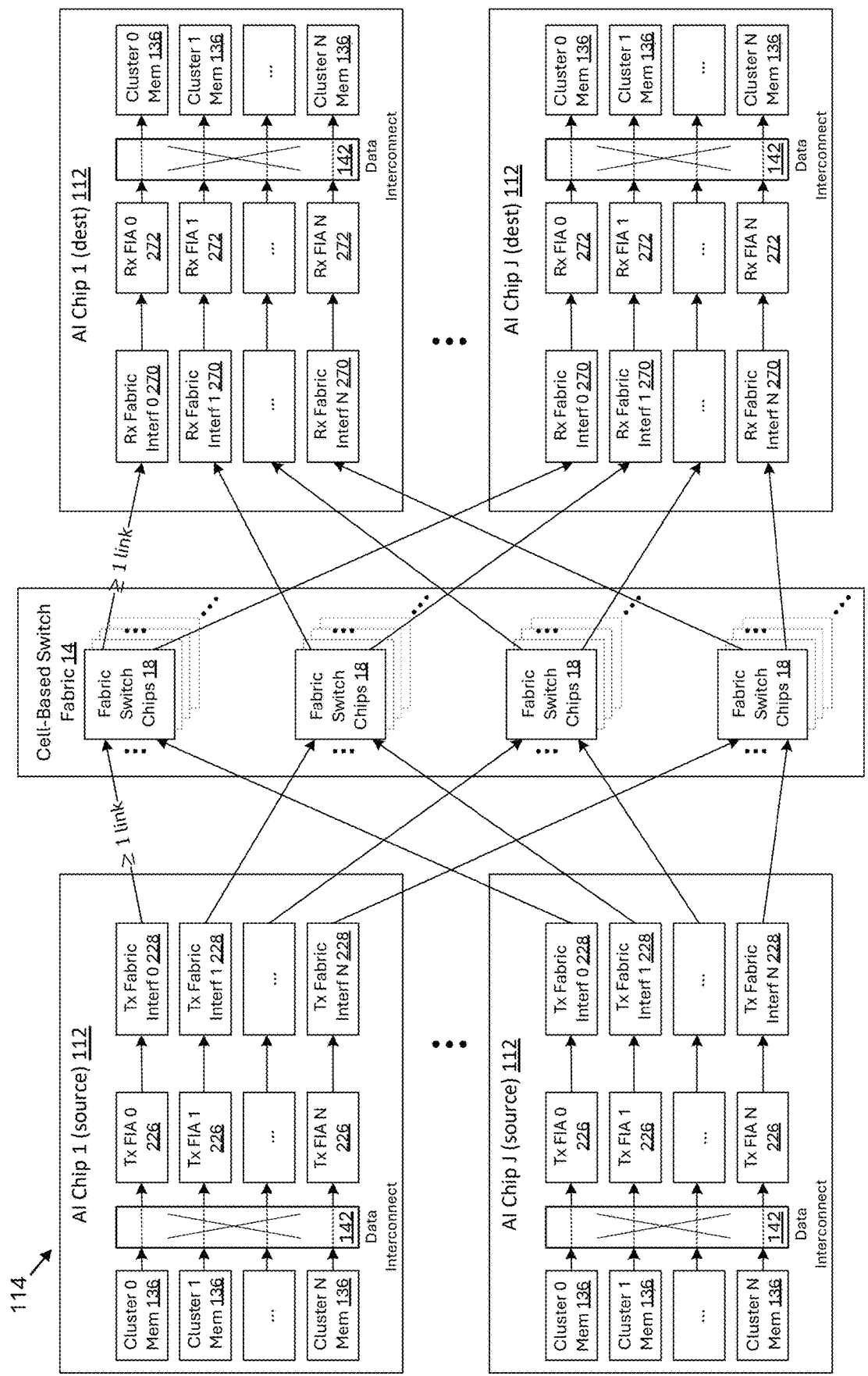
FIG. 24 depicts a system diagram in which a plurality of AI chips (each with a per-cluster transmit and receive fabric adapter) are communicatively coupled to one another via a plurality of fabric switch chips, in accordance with one embodiment of the invention.

FIG. 24 depicts a system diagram 114 in which a plurality of AI chips 112 (each with a per-cluster transmit and receive fabric adapter) may be communicatively coupled to one another via a plurality of fabric switch chips 18 of the cell-based switch fabric 14. In the embodiment of FIG. 24, each source AI chip 112 may include multiple instances of the transmit fabric interface adaptor 226 and the transmit fabric interface 228, each dedicated to one of the cluster memories 136 (e.g., transmit fabric interface adaptor 0 and transmit fabric interface 0 dedicated to the memory of cluster 0, . . . , transmit fabric interface adaptor N and transmit fabric interface N dedicated to the memory of cluster N). Likewise, each destination AI chip 112 may include multiple instances of the receive fabric interface adaptor 270 and the receive fabric interface 272, each dedicated to one of the cluster memories 136 (e.g., receive fabric interface adaptor 0 and receive fabric interface 0 dedicated to the memory of cluster 0, . . . , receive fabric interface adaptor N and receive fabric interface N dedicated to the memory of cluster N). In the embodiment of FIG. 24, the data interconnect 124 may provide the functionality of pass-through wires (as shown by the dotted lines through the data interconnect). As such, the core switches may not be necessary and could be replaced by pass-through wires. While not depicted in FIG. 24, it is understood that each fabric adapter (whether the transmit fabric adapter 174 or receive fabric adapter 176) may be communicatively coupled to the cell-based switch fabric 14 via a SerDes interface.

Further, it is noted that a dedicated set of links and fabric switch chips 18 may be used to carry the data between like-clusters of the AI chips 112. For instance, a first set of links and fabric switch chips 18 may be used to carry the data between cluster 0 of AI chip 1, . . . , AI chip J; a second set of links and fabric switch chips 18 may be used to carry the data between cluster 1 of AI chip 1, . . . , AI chip J; and so on. Similar to the embodiment of FIG. 23, one or more links may communicatively couple each of the transmit fabric interfaces 228 to one or more of the fabric switch chips 18. Similarly, one or more links may communicatively couple each of the fabric switch chips 18 to each of the receive fabric interfaces 270. Further, it is noted that each transmit fabric interface 228 may include a VOQ subsystem 244 (as depicted in FIG. 15), and each receive fabric interface adapter 272 may include an OQ subsystem 288 (as depicted in FIG. 19).

Figure 25:
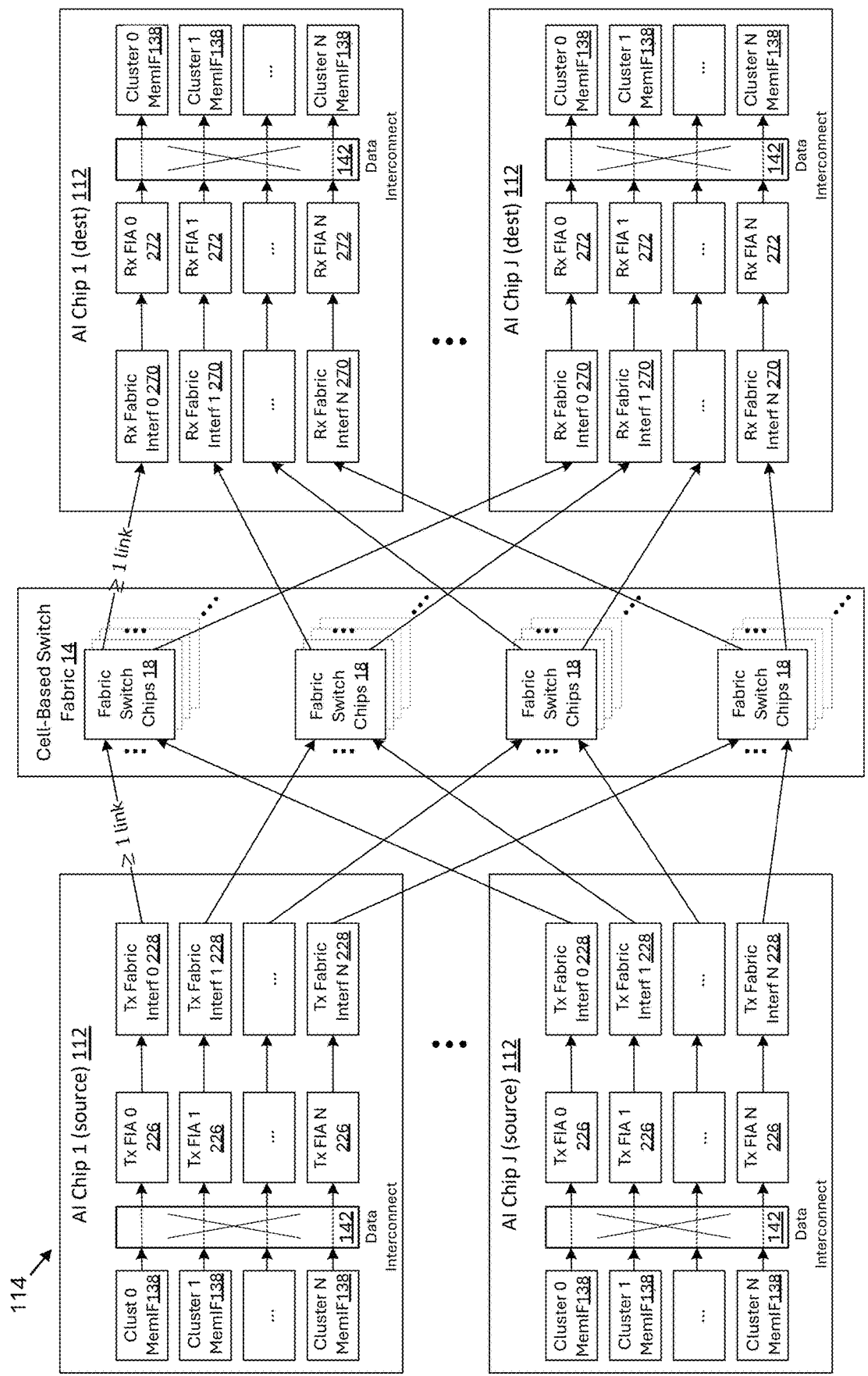
FIG. 25 depicts a system diagram in which a plurality of AI chips (each with a per-cluster transmit and receive fabric adapter) are communicatively coupled to one another via a plurality of fabric switch chips, in accordance with one embodiment of the invention.

FIG. 25 depicts a variant of FIG. 24 in which each of the cluster memories 136 has been replaced with a memory interface 138 configured to interface the AI chip 112 with one or more off-chip memory elements (e.g., HBM chip 148).

Thus, an AI chip 112 with an integrated cell-based fabric adapter 132 has been described. It is to be understood that the above-description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. An integrated circuit formed on (i) a single semiconductor die or (ii) a plurality semiconductor dies that are integrated into a single package, the integrated circuit comprising:
a communication interface;
a fabric adapter communicatively coupled to the communication interface;
a plurality of inference engine clusters, each inference engine cluster including a respective memory element; and
a data interconnect communicatively coupling each respective memory element of the plurality of inference engine clusters to the fabric adapter, wherein the fabric adapter is configured to facilitate remote direct memory access (RDMA) read and write services over a cell-based switch fabric to and from the respective memory elements of the plurality of inference engine clusters via the data interconnect, wherein the cell-based switch fabric comprises a plurality of cell-fabric switch chips that are disposed external to the integrated circuit, and wherein the fabric adapter comprises a virtual output queue (VOQ) subsystem.

2. The integrated circuit of claim 1, wherein the fabric adapter comprises a transmit fabric adapter configured to transmit data to the cell-based switch fabric and a receive fabric adapter configured to receive data from the cell-based switch fabric.

3. The integrated circuit of claim 2, wherein the transmit fabric adapter comprises a transmit fabric interface adapter and a transmit fabric interface.

4. The integrated circuit of claim 2, wherein the receive fabric adapter comprises a receive fabric interface and a receive fabric interface adapter.

5. The integrated circuit of claim 3, wherein the transmit fabric interface adapter comprises a packet generator, a packet table, a transmit direct memory access (DMA) read engine, a transmit buffer, a packet header encapsulator, and a transmit cellifier.

6. The integrated circuit of claim 3, wherein the transmit fabric interface comprises the VOQ subsystem and a fabric transmit data pipe.

7. The integrated circuit of claim 4, wherein the receive fabric interface comprises a fabric receive data pipe and a fabric receive control.

8. The integrated circuit of claim 4, wherein the receive fabric interface adapter comprises a receive cell buffer, a receive decellifier, a packet header decapsulator, a receive direct memory access (DMA) write engine, a receive packet linked list manager, an output queue (OQ) subsystem and a packet reader.

9. The integrated circuit of claim 3, wherein the transmit fabric interface adapter comprises a transmit job manager, a packet generator, a packet table, a transmit direct memory access (DMA) read engine, a transmit buffer, a packet header encapsulator module, and the VOQ subsystem.

10. The integrated circuit of claim 3, wherein the transmit fabric interface comprises a fabric transmit control and a fabric transmit data pipe.

11. The integrated circuit of claim 4, wherein the receive fabric interface is configured to deliver completed packets to the receive fabric interface adapter.

12. The integrated circuit of claim 4, wherein the receive fabric interface adapter comprises a packet header decapsulator, a receive direct memory access (DMA) write engine and a receive job manager.

13. The integrated circuit of claim 1, wherein each inference engine cluster includes a plurality of inference engines, each of the inference engines configured to execute neural networks, including one or more of convolutional neural networks (CNN), recurrent neural network (RNN), transformers, or large language models.

14. The integrated circuit of claim 1, wherein the data interconnect comprises one or more of a crossbar switch, a ring, a torus interconnect or a mesh.

15. An integrated circuit formed on (i) a single semiconductor die or (ii) a plurality semiconductor dies that are integrated into a single package, the integrated circuit comprising:
- a communication interface;
- a fabric adapter communicatively coupled to the communication interface;
- a plurality of inference engine clusters, each inference engine cluster including a respective memory interface; and
- a data interconnect communicatively coupling each respective memory interface of the plurality of inference engine clusters to the fabric adapter,
- wherein the fabric adapter is configured to facilitate remote direct memory access (RDMA) read and write services over a cell-based switch fabric to and from the respective memory interfaces of the plurality of inference engine clusters via the data interconnect,
- wherein the cell-based switch fabric comprises a plurality of cell-fabric switch chips that are disposed external to the integrated circuit, and
- wherein the fabric adapter comprises a virtual output queue (VOQ) subsystem.

16. The integrated circuit of claim 15, wherein the memory interface comprises a dynamic random access memory (DRAM) interface and controller.

17. The integrated circuit of claim 15, wherein each of the inference engine clusters includes a memory cache.

18. The integrated circuit of claim 15, wherein the fabric adapter comprises a transmit fabric adapter configured to transmit data to the cell-based switch fabric and a receive fabric adapter configured to receive data from the cell-based switch fabric.

19. The integrated circuit of claim 18, wherein the transmit fabric adapter comprises a transmit fabric interface adapter and a transmit fabric interface.

20. The integrated circuit of claim 18, wherein the receive fabric adapter comprises a receive fabric interface and a receive fabric interface adapter.

* * * * *